(12) United States Patent
Piunova et al.

(10) Patent No.: US 12,479,979 B1
(45) Date of Patent: Nov. 25, 2025

(54) BIOBASED, BIODEGRADABLE COMPOSITIONS FOR MAKING ARTICLES

(71) Applicant: Loliware, Inc., Beacon, NY (US)

(72) Inventors: Victoria A Piunova, Brookdale, CA (US); Kayla Barker, Santa Clara, CA (US); Ali Dashti, West Hollywood, CA (US); Jose F Andrade, Tracy, CA (US)

(73) Assignee: Loliware, Inc., Beacon, NY (US)

( * ) Notice: Subject to any disclaimer, the term of this patent is extended or adjusted under 35 U.S.C. 154(b) by 0 days.

(21) Appl. No.: 19/178,039

(22) Filed: Apr. 14, 2025

Related U.S. Application Data

(60) Provisional application No. 63/724,776, filed on Nov. 25, 2024.

(51) Int. Cl.
*C08L 5/08* (2006.01)
*B29C 45/00* (2006.01)
(Continued)

(52) U.S. Cl.
CPC .......... *C08L 5/08* (2013.01); *B29C 45/0013* (2013.01); *B29C 45/7207* (2013.01); *B29K 2005/00* (2013.01); *B29K 2105/0032* (2013.01); *B29K 2105/0088* (2013.01); *B29K 2509/02* (2013.01); *B29K 2995/006* (2013.01);
(Continued)

(58) Field of Classification Search
CPC .... C08L 5/08; C08L 2201/06; B29C 45/0013; B29C 45/7207; B29K 2005/00; B29K 2105/0032; B29K 2105/0088; B29K 2509/02; B29K 2995/006; B29K 2995/0077
See application file for complete search history.

(56) References Cited

U.S. PATENT DOCUMENTS 3,541,587 A   11/1970   Washburn
4,205,093 A    5/1980   Blake
(Continued)

FOREIGN PATENT DOCUMENTS

CA   2757662 A1   10/2010
CN   1149547 A     5/1997
(Continued)

OTHER PUBLICATIONS

Zhou et al., Preparation and Characterization of K-Carrageenan Modified with Maleic Anhydride and Its Application in Films; Mar. Drugs 2021, 19, 486, pp. 1-16 (Year: 2021).*
(Continued)

*Primary Examiner* — Jeffrey M Wollschlager
(74) *Attorney, Agent, or Firm* — HelixIP LLP

(57) ABSTRACT

Disclosed herein are compositions for injection molding and articles made therefrom, the compositions and articles comprising at least one hydrocolloid, at least one plasticizer, at least one filler, at least one CAN crosslinker, and optionally at least one flowing agent. Typically, the components are derived from biological sources, such as seaweed, plants, or animals. Typically, the components are made from biodegradable materials, making the compositions and articles compostable. The compositions are used to form the articles by injection molding, such as single-use food service industry products, and the articles have desirable flexibility, tensile strength, and water resistance.

8 Claims, 1 Drawing Sheet

(51) Int. Cl.
    *B29C 45/72* (2006.01)
    *B29K 105/00* (2006.01)
    *B29K 509/02* (2006.01)

(52) U.S. Cl.
    CPC ... *B29K 2995/0077* (2013.01); *C08L 2201/06* (2013.01); *C08L 2312/00* (2013.01)

(56) References Cited

U.S. PATENT DOCUMENTS

| | | |
|---|---|---|
| 4,313,964 A | 2/1982 | Dembecki |
| 4,390,553 A | 6/1983 | Rubenstein et al. |
| 4,472,440 A | 9/1984 | Bank |
| 4,505,220 A | 3/1985 | Bank et al. |
| 4,603,051 A | 7/1986 | Rubenstein et al. |
| 4,795,652 A | 1/1989 | Cooper |
| 4,830,868 A | 5/1989 | Wade et al. |
| 4,853,236 A | 8/1989 | Langler |
| 5,162,126 A | 11/1992 | Thorner et al. |
| 5,188,861 A | 2/1993 | Mazin et al. |
| 5,223,286 A | 6/1993 | Selbak |
| 5,320,669 A * | 6/1994 | Lim .......... C08L 3/00 127/29 |
| 5,336,511 A | 8/1994 | Der Beek |
| 5,400,698 A | 3/1995 | Savage |
| 5,840,354 A | 11/1998 | Baumann et al. |
| 5,948,313 A | 9/1999 | Cahen |
| 6,068,866 A | 5/2000 | Petrini et al. |
| 6,235,326 B1 | 5/2001 | Kronenberger |
| 6,423,357 B1 | 7/2002 | Woods et al. |
| 6,586,590 B1 | 7/2003 | Renn et al. |
| 6,780,453 B1 | 8/2004 | Smith |
| 6,783,790 B1 | 8/2004 | Emsing et al. |
| 6,902,783 B1 | 6/2005 | Hammer et al. |
| 7,008,655 B1 | 3/2006 | Asianis |
| 7,211,283 B2 | 5/2007 | Jones et al. |
| 7,488,503 B1 | 2/2009 | Porzio et al. |
| 7,618,485 B2 | 11/2009 | Renn |
| 7,790,699 B2 | 9/2010 | Melvik et al. |
| 8,003,152 B1 | 8/2011 | Xiong |
| 8,382,888 B2 | 2/2013 | Dellinger et al. |
| 8,540,926 B2 | 9/2013 | Crawley et al. |
| 8,563,702 B2 | 10/2013 | Miraftab et al. |
| 9,339,979 B2 | 5/2016 | Crawley |
| 9,795,990 B2 | 10/2017 | Edwards et al. |
| 10,179,856 B2 | 1/2019 | Karrer et al. |
| 10,575,536 B2 | 3/2020 | Briganti et al. |
| 11,912,856 B2 | 2/2024 | Piunova et al. |
| 12,157,811 B2 | 12/2024 | Piunova et al. |
| 2001/0036499 A1 | 11/2001 | Ong |
| 2002/0076478 A1 | 6/2002 | Grazela et al. |
| 2003/0219514 A1 | 11/2003 | Jones |
| 2004/0013772 A1 | 1/2004 | Weiss et al. |
| 2004/0052839 A1 | 3/2004 | Archibald |
| 2004/0109932 A1 | 6/2004 | Chen et al. |
| 2004/0156794 A1 | 8/2004 | Barkalow |
| 2004/0219271 A1 | 11/2004 | Belknap |
| 2005/0118326 A1 | 6/2005 | Anfinsen |
| 2005/0172835 A1 | 8/2005 | LaMaster |
| 2005/0260304 A1 | 11/2005 | Schaffer et al. |
| 2005/0260329 A1 | 11/2005 | Yusuf et al. |
| 2006/0013940 A1 | 1/2006 | Mueller |
| 2006/0024425 A1 | 2/2006 | Barkalow et al. |
| 2006/0034976 A1 | 2/2006 | Cotten et al. |
| 2006/0083841 A1 | 4/2006 | Casper |
| 2006/0159823 A1 | 7/2006 | Melvik |
| 2006/0182867 A1 | 8/2006 | Hill et al. |
| 2006/0198930 A1 | 9/2006 | Royo et al. |
| 2006/0286214 A1 | 12/2006 | Weiss et al. |
| 2007/0098868 A1 | 5/2007 | Venables |
| 2007/0178140 A1 | 8/2007 | Aimutis |
| 2007/0287777 A1 | 12/2007 | Kawamura et al. |
| 2007/0292643 A1 | 12/2007 | Renn |
| 2009/0162492 A1 | 6/2009 | Conway |
| 2009/0170971 A1 * | 7/2009 | Lee .......... C08J 9/125 127/65 |
| 2009/0283608 A1 | 11/2009 | Crawley |
| 2010/0068350 A1 | 3/2010 | Shen et al. |
| 2010/0209569 A1 | 8/2010 | Pasini |
| 2010/0266744 A1 | 10/2010 | Dwivedi |
| 2010/0272863 A1 | 10/2010 | Griebel |
| 2010/0303997 A1 | 12/2010 | Fulton |
| 2011/0159154 A1 | 6/2011 | Ang |
| 2011/0159267 A1 * | 6/2011 | Lee .......... C08B 31/04 524/53 |
| 2011/0217432 A1 | 9/2011 | Krnic et al. |
| 2012/0294997 A1 | 11/2012 | Lange |
| 2013/0022711 A1 | 1/2013 | Ichihara |
| 2013/0045246 A1 | 2/2013 | Edwards |
| 2014/0057024 A1 | 2/2014 | Briganti et al. |
| 2014/0113034 A1 | 4/2014 | Bartkowska et al. |
| 2014/0161944 A1 | 6/2014 | Briganti et al. |
| 2014/0170203 A1 | 6/2014 | Edwards |
| 2015/0030775 A1 | 1/2015 | Edwards |
| 2015/0147435 A1 | 5/2015 | Rettey |
| 2015/0216216 A1 | 8/2015 | Marga |
| 2016/0149452 A1 | 5/2016 | Garmon et al. |
| 2016/0324207 A1 | 11/2016 | Briganti et al. |
| 2017/0142996 A1 | 5/2017 | Costello |
| 2017/0181458 A1 | 6/2017 | Mantius |
| 2017/0223982 A1 | 8/2017 | Yamabe |
| 2018/0133108 A1 | 5/2018 | Palazzi |
| 2018/0192803 A1 | 7/2018 | Juvina et al. |
| 2018/0317682 A1 | 11/2018 | Nguyen |
| 2019/0248989 A1 | 8/2019 | Raszewski |
| 2020/0113193 A1 | 4/2020 | Kong |
| 2020/0214484 A1 | 7/2020 | Briganti et al. |
| 2021/0369027 A1 | 12/2021 | Briganti et al. |
| 2022/0050002 A1 * | 2/2022 | Wagner Salvini .... G01L 19/003 |
| 2022/0275201 A1 * | 9/2022 | Dong .......... C08L 67/02 |
| 2022/0289999 A1 | 9/2022 | Brown |
| 2023/0128323 A1 * | 4/2023 | Piunova .......... A23P 30/25 428/334 |
| 2023/0383051 A1 * | 11/2023 | Hsu .......... B29B 9/12 |
| 2024/0286114 A1 * | 8/2024 | Ham .......... C08K 5/1539 |

FOREIGN PATENT DOCUMENTS

| | | |
|---|---|---|
| CN | 101838405 A | 9/2010 |
| CN | 103087356 A | 5/2013 |
| CN | 110272628 A | 9/2019 |
| CN | 111875853 A | 11/2020 |
| EP | 790777 B1 | 8/1994 |
| ES | 2545830 | 9/2015 |
| WO | WO 96/20604 | 7/1996 |
| WO | WO 98/42214 | 10/1998 |
| WO | WO 03/035026 | 5/2003 |
| WO | WO 2006/044342 | 4/2006 |
| WO | WO 2007/149452 | 12/2007 |
| WO | WO 2008/044586 | 4/2008 |
| WO | WO 2011/103594 | 8/2011 |
| WO | WO 2012/175266 | 12/2012 |
| WO | WO 2014/028654 | 2/2014 |
| WO | WO 2016/168421 | 10/2016 |
| WO | WO 2018/187782 | 10/2018 |
| WO | WO 2019/046789 | 3/2019 |
| WO | WO 2020/174234 | 9/2020 |
| WO | WO 2021/019524 | 2/2021 |
| WO | WO 2021/019525 | 2/2021 |
| WO | WO 2021/028555 | 2/2021 |
| WO | WO 2021/046041 | 3/2021 |
| WO | WO 2021/105722 | 6/2021 |
| WO | WO 2021/108756 | 6/2021 |
| WO | WO2022271496 | 12/2022 |
| WO | WO2024137457 | 6/2024 |

OTHER PUBLICATIONS

Gahruie et al., Physiochemical and Enzymatic Modification of Gums, Chapter 2, 2021, pp. 33-57 (Year: 2021).*
Oxford Dictionary, definition of cup, 2021.
Saha et al., Hydrocolloids as thickening agents and gelling agents in food: a critical review, 2010, J Food Sci Technol vol. 47, pp. 587-597.

(56) References Cited

OTHER PUBLICATIONS

Porto, S., Agargel Structure, Wayback machine—https://web.archive.org/web/20090106162904/http://www.agargel.com.br/agar-tec-en.html.

Porto, S., Agargel Carrageenan, Wayback machine—https://web.archive.org/web/20081121213041/http://www.agargel.com.br/carrageenan.html.

FMC BioPolymer: Carrageenan/Disperse and Solubilize, Wayback Machine https://web.archive.org/web/20100221020746https://www.fmcbiopolymer.com:80/Food/ingredients/carrageenan.

Herbstreith & Fox, Techniques for the addition of pectin into the product batch, 1999, Technical Application Laboratory Herbstreith & Fox Corporate Group.

The British Larder, How to use Agar Agar, 2023, https://britishlarder.co.uk/how-to-use-agar-agar/.

Karo, KaroSyrup, http://web.archive.org/web/20080919064628/http://www.karosyrup.com/faq.html.

Kendall, P. et al., Fruit Leather, 2012, Leathers and Jerkies, Food Nutrition Series, Fact Sheet No. 9.311.

Lan et al., Preparation and properties of sodium carboxymethyl cellulose-sodium alginate-chitosan composite film, 2018, Coatings vol. 8, 291.

Malik et al., Robotic extrusion of algae-laden hydrogels for large-scale applications, 2020, Global Challenges vol. 4, 1900064.

Morby, Ari Jonsson uses algae to create biodegradable water bottles, 2016, https://dezeen.com/2016/03/20/ari-jonsson-algae-biodegradable-water-bottles-iceland/.

U.S. Appl. No. 18/935,259, filed Nov. 1, 2024. Bio-based, Biodegradable Compositions and Articles Made Therefrom.

\* cited by examiner

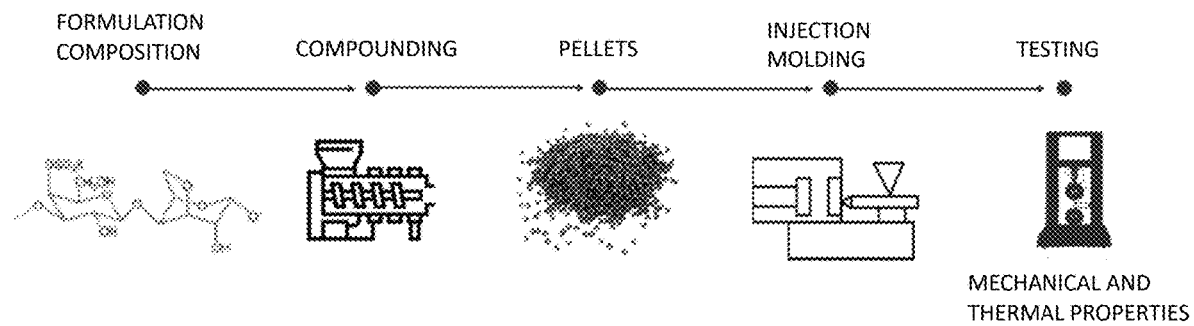

BIOBASED, BIODEGRADABLE COMPOSITIONS FOR MAKING ARTICLES

This application claims priority to U.S. provisional application Ser. No. 63/724,776 filed Nov. 25, 2024.

BACKGROUND

Single-use plastics represent one of the largest sources of wasted energy and resources, as well as a significant contributor to environmental pollution, making it one of the greatest challenges of our time. While plastics are among the most important synthetic materials in modern society, they are often discarded into landfills and the environment. With less than 10% of plastics being recycled, over 14.5 million tons of single-use containers, tableware, and packaging are thrown away annually. As a result, plastics are commonly discarded after a single use, wasting valuable resources. Plastic waste derived from takeout orders and food packaging alone account for approximately 20 million metric tons of plastic waste generated annually. Roughly 560 billion individual plastic utensils are used every year by Americans alone.

Food service industry articles (cutlery, cups and straws) made of bioplastic and bioplastic composites, are gaining popularity. Corn derived polylactic acid (PLA) and poly propylene (PP) are the main constituents in these formulations. To reduce the cost and improve biodegradability of these materials, PLA and PP are commonly blended with natural fibers and starches. Despite the improved barrier properties, compared to paper goods, these materials still exhibit an array of shortcomings. PLA and PP will not degrade on their own in the natural environment and require commercial composting facilities for degradation. Moreover, the use of corn as a raw material and agricultural resources like fresh water and fertilizers to produce these biorenewable monomers promotes monocropping and competition with human food sources. In addition, the mechanical properties and cost of these materials requires improvement.

There are multiple reports demonstrating the use of starches, cellulosic fibers, and chitosan (crustacean and insect exoskeleton-derived amino polysaccharide) as alternatives to plastic packaging and single use food service industry articles. While promising, these technologies are yet to be scaled and streamlined to be economically viable.

Alternatively, LOLIWARE Inc., a seaweed-based materials technology company, uses biopolymers (specifically alginates and carrageenans) generated by brown and red seaweed. Both types of seaweed rapidly grow in the ocean and use little to no agricultural resources or fresh water, hence presenting an ideal renewable and abundant natural resource to replace petroleum derived plastics and the corresponding parts used in the food service industry at scale. Moreover, the energy expenditure for the extraction of alginate (1 kg) from kelp is negated by 2.2 kg of sequestered $CO_2$ in the form of blue carbon, meaning that seaweed-derived biopolymers not only reduce the consumption of fresh water and fertilizers for farming but also reduce $CO_2$ in the atmosphere and absorption of CO2 from the ocean water. Additionally, alginate and carrageenan containing formulations can be processed on conventional plastic processing equipment, specifically twin and single screw extruders, as well as injection molding machinery.

Typically, carrageenan and carrageenan-based formulations are used in the food and cosmetics industries as gelling and thickening agents and in biotechnology for wound dressing and tissue regeneration. Another use of carrageenan-based formulations, according to the present invention, is their utility as a plastic alternative in the manufacturing of single-use food service industry products via injection molding. Specifically, the production of utensils, take-out containers, trays, and other single use food service items. The discarded injection-molded parts can be composted under industrial or home composting conditions to produce soil additives (humus and humus substances) or can be used to produce animal/fish feed.

The present invention covers flexible, strong, biodegradable compositions with improved mechanical and water-barrier properties. These compositions are comprised of ingredients obtained from bio renewable sources and provide a sustainable and inexpensive solution to the single-use plastic pollution problem, specifically a solution to the single use plastic utensils and plastic food packaging problem.

SUMMARY

The disclosure relates to formulations for making biodegradable and/or compostable, disposable articles that are substitutes for disposable articles derived from petroleum (e.g., plastic utensils, plastic cups, Styrofoam cups, etc.) In order to be an effective substitute for such disposable articles, such as cups, take-out containers, trays, utensils, or other vessels, the articles of the present disclosure need structural integrity and versatility comparable to plastic products which can hold or be in contact with liquids and food products having different temperatures, particularly for extended periods. The disclosure provides a seaweed-based, flexible and biodegradable composition, where hydrocolloids are the main components of the composition. The hydrocolloid compositions disclosed herein include, for example, plasticizers (glycerol, mannitol, and others), cellulosic fibers (MCC, Ethocell, etc), fillers such as $CaCO_3$, talcum and others, or cross linkers for making ionic networks or covalent adaptable networks (CANs).

The moldable compositions disclosed herein include low molecular weight additives that form covalent adaptable networks with the hydrocolloid polymers (e.g., seaweed-based polysaccharides). In some aspects, the biodegradable and/or compostable article with covalent adaptable networks demonstrate moderate to high tensile strength and Young's modulus sufficient to be used as, for example, a single-use utensil, take-out container, trays, cup, and other food service industry products. The moldable compositions described herein can make articles containing dynamic covalent cross-links, resulting in materials that combine the re-processability of thermoplastics with the excellent mechanical properties and solvent resistance of thermosets. Exemplary compositions are made from seaweed-based covalent adaptable networks (CAN) produced with dynamic covalent linkages to form injection mold grade resins. Upon extrusion of mixtures of seaweed-based polysaccharides and additives, seaweed-based CANs are produced with dynamic, degradable linkages and can be processed via injection molding processes. Compatible dynamic covalent linkages can be made with hydrocolloid polymers using additives including, for example, phosphate esters (e.g., sodium trimetaphosphate-STMP), silyl ethers (e.g., alkoxy silane), esters, imines, vinylogous urethanes, anhydrides (e.g., Succinic anhydride (SA); Octenyl succinic anhydride (OSA); Itaconic anhydride (IA); Maleic anhydride (MA)), vinylogous ureas, Dialdehyde starch (DAS); tBu-3-oxobutanoate (t-BAA); Diketene acetone adduct (TMDO), and 1,2-bis (triethoxysilyl) ethane.

In an aspect, the hydrocolloid (e.g., seaweed-based polymers) CANs have improved stability in aqueous environments at both ambient and elevated temperatures and improved mechanical properties in comparison to seaweed resins without dynamic covalent crosslinks. Cross linkers that can be used to form CANs include, for example, phosphate esters (e.g., sodium trimetaphosphate-STMP), silyl ethers (e.g., alkoxy silane), esters, imines, vinylogous urethanes, anhydrides (e.g., Succinic anhydride (SA); Octenyl succinic anhydride (OSA); Itaconic anhydride (IA); Maleic anhydride (MA)), vinylogous ureas, Dialdehyde starch (DAS); tBu-3-oxobutanoate (t-BAA); Diketene acetone adduct (TMDO), and 1,2-bis(triethoxysilyl) ethane.

In an aspect, the present disclosure relates to methods for making disposable articles that are biodegradable and/or compostable. These disposable articles are substitutes for plastic articles such as plastic cups, plastic utensils and plastic containers. In an aspect the disclosure also relates to articles, pellets, or pre-process mixtures comprising at least one hydrocolloid, at least one plasticizer, at least one filler, at least one cross-linker, and water.

The methods disclosed herein can include a process to make a biodegradable article, the process comprising: combining (i) at least one hydrocolloid, (ii) at least one plasticizer, (iii) at least one filler, and (iv) at least one cross-linker, and (v) water, so as to make a pre-process mixture; optionally, blending the pre-process mixture; optionally, compounding the pre-process mixture into a pellet; forming the pre-process mixture or pellet into a shape; and drying the shape to form the article, wherein the at least one hydrocolloid, the at least one plasticizer, the at least one filler, and the at least one cross-linker as disclosed below.

In some aspects, disclosed herein are biodegradable articles, vessels, or utensils, that comprise at least one hydrocolloid such as alginate, chitosan, agar, kappa-carrageenan, iota-carrageenan, konjac gum, guar gum, locust bean gum, or any combination thereof, typically in combination with other components, such as at least one plasticizer, at least one filler, at least one polycation and/or cross-linking agent, at least one flowing agent, and/or water, as well as optional additional ingredients including one or more sweeteners (e.g., non-sugar, sugar, honey, etc.), flavoring agents, coloring agents, active ingredients, edible oils, and preservatives (e.g., natural preservatives). The article may also be coated with an optionally edible coating, for example, to enhance waterproofing, improve shelf life, and/or reduce the stickiness of the article, or to provide flavor, color or graphics to the article. The articles may hold or be in contact with liquids or foods (e.g., moist foods) for an extended period of time, preferably more than about one hour. The article may be in the form of a utensil, vessel, cup, drinking straw, stirrer, take-out container, tray, cap, or any other suitable form. In some aspects, the article is biodegradable, compostable, or a combination thereof.

In some aspects, disclosed herein are flexible, strong, bio-based and/or biodegradable articles with improved water-barrier properties, as well as the compositions (e.g., pre-process mixtures) or pellets used to make such articles. These articles, pellets, and compositions comprise ingredients obtained from biorenewable sources, such as seaweed, plants, animals, or a combination thereof, and provide a sustainable and cost-effective solution to problems relating to single-use plastic pollution, specifically single-use plastic utensils or other articles. In some aspects, such compositions are used as a replacement for plastic (e.g., plastic derived from petroleum) in the manufacturing of single-use food service industry items. In some aspects, the composition (e.g., pre-process mixture) is blended by mixing selected components of the composition for a selected time to achieve a desired consistency suitable for compounding by extrusion and/or further processing by injection molding. In some aspects, the composition is in the form of pellets for processing by injection molding. In some aspects, the pellets are formed by compounding using extrusion processes. In some aspects, the pellets are of a selected shape, size and weight suitable for further processing by injection molding.

In some aspects, such compositions comprise hydrocolloids, which can be biopolymers, (e.g., alginates or carrageenan) derived from seaweed, such as kelp or red algae. Seaweed grows unattended in the ocean (e.g., kelp growing several meters per day) and requires little to no agricultural resources or fresh water, hence presenting an ideal renewable and abundant natural resource to replace plastic in single use items in the food industry. However, hydrocolloids (or biopolymers) other than or in addition to alginates or carrageenan can also be employed, as described elsewhere herein. Additionally, in some aspects, compositions comprising a hydrocolloid or biopolymer, such as alginate or carrageenan, can be processed on conventional plastic processing equipment, such as twin or single screw cold or hot-melt extruders, depending on the composition, enabling the use of existing manufacturing technology (e.g., equipment intended for processing petroleum-derived plastics). For example, compositions (pre-process mixtures) comprising alginates or dried and milled brown seaweed as the main component (excluding water) can be produced using cold extrusion, whereas compositions (pre-process mixtures) comprising kappa-carrageenan or dried and milled red seaweed, even in minor amounts (and also including alginate in some aspects), can be produced using hot-melt extrusion. Articles, such as vessels or utensils, can be produced from such formulations in a scalable and economically feasible manner.

In some aspects, disclosed is an alginate-based flexible, injection-moldable, and biodegradable composition and articles made therefrom, in which alginate (e.g., sodium alginate) and other bio-derived polysaccharides (e.g., chitin, chitosan, starch, cellulose) are included in the composition, and in some aspects are the main components of the composition. In some aspects, alginate is the main component of the composition and/or article (excluding water). In some aspects, the alginate-based article is compounded to form a pellet using at least one step of cold extrusion.

In some aspects, disclosed herein are carrageenan-based flexible, injection-moldable, and biodegradable compositions and articles made therefrom, in which carrageenan, particularly kappa-carrageenan and mixture of kappa-carrageenan with other carrageenans, and other bio-derived polysaccharides (e.g., chitosan or alginate) are included in the composition, and in some aspects are the main components of the composition. In some aspects, carrageenan, which can be a mixture of carrageenans, is the main component of the composition and/or article (excluding water). In some aspects, disclosed is an article comprising kappa-carrageenan, which article is flexible, strong, and biodegradable with an extended shelf life (e.g., 6 month or more under ambient conditions without any packaging). In some aspects, the carrageenan-based article is compounded to form a pellet using at least one step of hot-melt extrusion. In some aspects, the carrageenan-based article is not compounded using cold extrusion. In some aspects, the kappacarrageenan-based article is compounded to form a pellet using at least one step of hot-melt extrusion. In some aspects, the kappa-carrageenan-based article is not compounded using cold extrusion.

In some aspects, single-use food service industry products, such as take-out containers, which consist exclusively of food-grade ingredients, are provided, and such features make the products biodegradable and/or compostable. In some aspects, discarded products such as take-out containers, and/or discarded injection-molded parts, can be collected and used as fertilizer (e.g., due to the high organic content of the formulation) or as a potential feed for animals, fish, or microorganisms. In some aspects, unused injection-molded parts, such as melted, but unincorporated, pellets, may be remolded and reincorporated in the injection molding process.

The compositions disclosed herein may be used for producing food service items, such as take-out containers, by injection molding. In some aspects, the resulting products, such as take-out containers, display a moderate to high tensile strength (MPa) and compressive strength (MPa), as well as improved barrier properties, enabling the articles to remain flexible even in environments with low relative humidity, and to resist swelling (under 60% by weight) in aqueous solutions. Supporting evidence demonstrating the improved barrier properties, flexibility, resistance to swelling in aqueous solutions, and other mechanical and thermal properties of the components of the compositions presently disclosed herein can be found in the international application, PCT/US2022/033527, filed Jun. 15, 2022, hereby incorporated by reference in its entirety.

The compositions disclosed herein, particularly those comprising kappa-carrageenan, may be used for producing food service items, such as utensils, in which the composition is used as a resin in an injection molding process to prepare single-use food service industry products, which are sustainable bio-renewable materials. In some aspects, such compositions consist exclusively of food-grade ingredients, making them biodegradable, optionally edible, and appropriate for food service settings. In some aspects, the resulting products, such as utensils comprising kappa-carrageenan, display a moderate tensile strength (e.g., 10-60 MPa) and moderate compressive strength (e.g., 10-13 MPa), as well as barrier properties sufficient to maintaining flexibility and structural integrity for an extended period of time (e.g., over 6 months) under ambient conditions without any packaging (e.g., air- and/or moisture-barrier packaging). In some aspects, the resulting products, such as take-out containers, comprising kappa-carrageenan, exhibit reduced water absorption (in comparison to paper analogs), with swelling under 50% by weight in aqueous solutions after 1 hour at room temperature, and with swelling under 30% in aqueous solution after 1 hour at 0° C.

In an embodiment, some compositions disclosed herein are characterized by a strain at maximum force selected from the range of 2-15%. In an embodiment, some compositions disclosed herein are characterized by a tensile strength equal to or greater than 10 MPa. In an embodiment, some compositions disclosed herein are characterized by a Young's modulus equal to or greater than 2000 MPa, optionally selected from the range of 2000 MPa to 20000 MPa.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1 is a flow chart of an exemplary process of the present disclosure for making articles from injection-moldable formulations.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

While certain components of a composition, pre-process mixture, pellet, or article are described herein as having a given function (e.g., hydrocolloid, plasticizer, etc.), such components may in reality serve entirely different functions or multiple functions. As a result, the functions of a given component are described as currently understood, but such functions are a working theory. For example, chitosan is believed to function as a hydrocolloid in the articles and pre-process mixtures disclosed herein, but may also serve alternative or additional functions in a pre-process mixture, pellet, and/or article.

As used herein, the term "about" means that, with respect to compositions, slight variations from a stated value may be used to achieve substantially the same results as the stated value, or, with respect to properties, slight variations from a stated value are acceptable (i.e., non-detrimental) to the stated value relative to a given property. In circumstances where this definition cannot be applied or is exceedingly difficult to apply, then the term "about" means a 10% deviation (plus or minus) from the stated value. In any event, for any individual number or number in a range, it will be appreciated that some variation in the specific value can be accommodated without loss of significant benefit or without significant detriment. In this regard, such a non-detrimental variation allowed for a given number or range is typically 10% or less of the stated number or range. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

As used herein, the term "sugar-free" means that the pre-process mixture or article is substantially free of dietary sugars, such as glucose, sucrose and fructose. As used herein, the term "low-sugar" refers to edible compositions, particularly in their post-processing form, that have less than 10% by weight of a dietary sugar, and preferably less than about 5% by weight. In some aspects, articles and pre-process mixtures herein are sugar-free. In some aspects, articles, pellets, and pre-process mixtures herein are low-sugar.

As used herein, the percent of components in an article, pellet, or pre-process mixture is the weight percent, unless otherwise specified. Moreover, all weight percent values are based on the total weight of the relevant composition, pre-process mixture, pellet, or article, unless specified otherwise. For example, when a pre-process mixture is disclosed to have 10 wt. % plasticizer, the 10 wt. % is based on the total weight (100 wt. %) of the pre-process mixture including water and other components. In some aspects, a composition, pre-process mixture, pellet, or article consists of only dry matter, such as a powdered mixture, wherein the wt. % is measured on a dry-weight basis. For example, if water is not listed as a component of a composition, and the sum of the wt. % of the listed components is 100 wt. %, the associated wt. % values are based on the total dry wt. % of the relevant composition. Moreover, when "an article, pellet, or pre-process mixture" is disclosed to have a certain amount of a component "as appropriate" or "as the case may be," such terminology means that any of, or all of, the article, pellet, or pre-process mixture can have the specified amount of a given component.

As used herein, the term "edible" refers to an item that may be consumed safely by the consumer, but may or may not be palatable or readily consumed.

As used herein, the term "biopolymer" means a polymer derived from a biological source, such as a plant, fungus, or animal, and includes polysaccharides derived from such sources. A particularly useful source of biopolymer is seaweed, including brown, red, or green algae as well as green yellow or golden algae.

As used herein, the term "biodegradable" refers to an item that is capable of being broken down into innocuous products by the action of living things (such as microorganisms) under typical environmental conditions. In some aspects, an article is biodegradable if it can be broken down to innocuous products, as noted above, within a timeframe of about 3 to about 6 months.

As used herein the term "chitin" is a long polymer of N-acetylglucosamine which is derived from a biological source, such as the exoskeletons of arthropods, such as crustaceans (e.g., crab shell) and insects, or cell walls of fungi. Chitin may occur as a composite in the natural source, e.g., as a composite with calcium carbonate in the shells of crustaceans. Pure chitin rather than composite chitin is presently preferred for use in this disclosure. In some aspects, the chitin has a viscosity average molecular weight (kDa) of 100, 150, 200, 250, 300, 350, 400, 450, 500, 550, 600, 650, 700, 750, 800, 850, 900, 950, or 1000. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the chitin can have a viscosity average molecular weight (kDa) of 250, about 250, 200 to 300, about 300, 750, about 750, 500 to 800, or less than 350.

As used herein, the term "chitosan" is the deacetylated form of chitin generally having randomly distributed beta-(1-4)-linked D-glucosamine and N-acetyl-D-glucosamine. Chitin is typically deacetylated by treatment with a base, such as sodium hydroxide. Commercially available chitosan can be characterized by degree of deacetylation (% DD, typically ranging from 60 to 100%) and viscosity average molecular weight, generally ranging from 3800 to 800,000 daltons). In some aspect, chitosan having viscosity average molecular weight ranging from 50,000 to 400,000 daltons is employed. In some aspects, "low molecular weight chitosan" or "low MW chitosan" is employed and refers to chitosan having a viscosity average molecular weight of 50,000 daltons to 190,000 daltons. Ultra low molecular weight chitosan (e.g., chitin having a molecular weight of 20,000 daltons or less) is not preferred for use in the compositions and methods herein. In some aspects, chitosan having % DD of 75% or higher is employed. In some aspects, chitosan having % DD of 75%-85% is employed.

As used herein, the term "compostable" refers to an item that is capable of being broken down under natural composting conditions into innocuous natural products. Accordingly, a material is referred to as compostable when it can biodegrade in a composting process, and preferably through the action of naturally occurring microorganisms under naturally occurring composting conditions and do so to a high extent within a specified timeframe. In some aspects, a material that is compostable is degraded under natural (home) composting conditions to an extent of at least about 60%, or at least about 80% or at least about 90%, in less than a year, and, in some aspects, in less than about 6 months.

In some aspects, materials are determined to be "biodegradable" and "compostable" according to the definitions as provided in EN-13432. According to EN-13432, biodegradability is the capacity of a material to be converted into $CO_2$ by the action of microorganisms. This property may be measured with the laboratory standard test method EN-14046 (also published as ISO 14855: biodegradability under controlled composting conditions). In order to show complete biodegradability, a biodegradation level of at least 90% is reached in 6 months or less.

In some aspects, the pre-process mixtures, pellets, and/or articles described herein also show high disintegrability, i.e., the fragmentation and loss of visibility in the final compost (absence of visible pollution). Disintegration may be measured using a pilot scale composting test (EN 14045), in which specimens of the test material are composted with biowaste for 3 months and the final compost is screened with a 2 mm sieve. The mass of test material residues with dimensions greater than 2 mm should be less than 10% of the original mass of the test material.

As used herein, "continuous" indicates a process which is uninterrupted for its duration, or interrupted, paused or suspended only momentarily relative to the duration of the process. A hot-melt extrusion process is "continuous" when pre-process mixture or pellets are fed into a hot-melt extruder without interruption or without a substantial interruption, or such hot-melt extrusion or pre-process mixture or pellets is not performed in a batch process.

As used herein, the term "carrageenan" refers to a linear sulfated polysaccharide derived, typically by extraction, from certain species of seaweed (e.g., Irish moss). The polysaccharide comprises repeating galactose units. Carrageenan typically functions as a hydrocolloid in aqueous environments. Different classes of carrageenan exist and are defined by the sulfate content. As used herein, the term "kappa-carrageenan" refers to carrageenan having one sulfate group per disaccharide, the term "iota-carrageenan" refers to carrageenan having two sulfate groups per disaccharide, and the term "lambda-carrageenan" refers to carrageenan having three sulfate groups per disaccharide. Carrageenan can contain a mixture of polymers containing on average 1-3 sulfate groups per disaccharide, including the kappa, iota and lambda forms noted above, as well as forms with an intermediate average number of sulfate groups per disaccharide (e.g., between 1 and 2 or between 2 and 3, exclusive). Preferred carrageenan for use herein has on average between 1 and 2, inclusive, sulfate groups per disaccharide. Useful carrageenan is a mixture of kappa-carrageenan and iota-carrageenan. More useful carrageenan comprises kappa-carrageenan with less than 10 wt. % other carrageenans. Most useful carrageenan is kappa-carrageenan.

As used herein, the terms "crosslinker," "cross-linker," or "crosslinking" carry their normal meaning in its broadest sense, as readily used by a person of skill in the polymer or biochemical arts. It typically refers to formation of a covalent or other bond (e.g., hydrogen bond) between two molecules, typically between two oligomers, macromers, or polymers. In some aspects, article, pre-process mixture, or pellet comprises an organic cross-linker. In further aspects, the article, pre-process mixture, or pellet comprises an organic acid cross-linker, such as tannic acid.

As used herein, the term "flowing agent" or "anti-caking agent" refers to anhydrous compounds that prevent particles of dry materials from aggregating and "caking" together. In some aspects, the flowing agent comprises functional properties appropriate for facilitating the flow of a pre-process mixture during the injection molding process. In some aspects, the flowing agent comprises a compound or a mixture of compounds that are biocompatible with the pre-process mixture, such as calcium stearate.

As used herein, the term "hydrocolloid" refers to a hydrophilic polymer that swells in an aqueous environment by absorbing water. A hydrocolloid affects the rheology of a composition, typically resulting in increased viscosity. Adding a hydrocolloid to an aqueous composition typically forms a gelled network with the polymer chains of hydrocolloids interacting with other polymer chains of the hydrocolloids directly and/or mediated via water, ions, or combinations thereof. Hydrocolloids can be derived from a number of sources, including plants, animals, or microorganisms, or chemically modified versions thereof. Hydrocolloids can also be prepared synthetically. A hydrocolloid derived from a natural source, such as an animal or plant, whether or not chemically modified, is termed a "hydrocolloid biopolymer" herein.

As used herein, the term "pre-process mixture" refers to the composition that is molded, extruded, or otherwise formed into an article or pellet. Upon compounding, injection molding, subsequent drying, or a combination thereof, the amounts of components in the article may differ from the amounts of components in the pre-process mixture as a result of leaching (e.g., leaching of a hydrophilic plasticizer during cross-linking and/or rinsing, thereby resulting in a reduced amount of hydrophilic plasticizer in the article relative to the pre-process mixture) and/or drying (e.g., evaporation or other loss of water content, thereby resulting in a reduced amount of water in the article relative to the pre-process mixture). Typically, the relative weight ratio of certain components in the article to other components in the article is the same as in the pre-process mixture, such as the weight ratio of hydrocolloid(s) to hydrophobic additives, and other hydrophobic components (e.g., hydrophobic plasticizer such as glycerol trioctanoate, or hydrophobic additive such as carnauba wax, lignin powder, etc.), whereas the weight ratio of other components (such as water and hydrophilic plasticizer, e.g., glycerol) to other components in the article is different between the pre-process mixture and the article for the reasons described above. Typically, in aspects where the pre-process mixture is formed (e.g. cold extruded) into an article that is subjected to a cross-linking bath followed by rinsing and drying, the water content of the dried article is about one-third the water content of the pre-process mixture (e.g., 85-95 wt. % compared to 28-35 wt. %), and the hydrophilic plasticizer (e.g., glycerol) content in the cross-linked and rinsed article is also about one-third of the hydrophilic plasticizer content of the pre-process mixture (e.g., about 25-36 wt. % compared to about 8-12 wt. %). Typically, in aspects where the pre-process mixture is compounded (e.g., hot-melt extrusion) into a pellet that is not subjected to a cross-linking bath, rinsing, nor drying, such pellet has the same or substantially similar (e.g., within 10% of the values) composition and amounts thereof of the pre-process mixture. Typically, in aspects where the pellet is formed (e.g., injection molded) into an article that is not subjected to a cross-linking bath nor rinsed, and such article is dried, the water content of the dried article typically is the same as, or up to about half of, the water content of the pellet (e.g., 35-50 wt. % water in the pellet versus 25-35 wt. % water in the dried article), and other components of the article (e.g., hydrophilic plasticizer, hydrophobic plasticizer, filler, hydrophobic additive, etc.) are the same as in the pellet.

As used herein, the term "hydrophobic" in relation to a plasticizer or additive means a compound having a hydrophobic character, which typically includes compounds that comprise alkyl, ester, or aryl groups, and typically have little to no polar groups present, such as hydroxyl or amino functionalities. By way of example, alkylated compounds, esterified compounds, waxes, oils, polymers containing alkyl, ester, and/or aryl groups, and other similar compounds are hydrophobic. Hydrophobic plasticizer or additive includes plasticizers or additives that are water-insoluble or only slightly water-soluble as is understood in the art. Examples of hydrophobic plasticizers include among others, citrate esters, phthalate esters, adipate esters, and glycerol esters, including alkyl esters and esters of fatty acids. Examples of hydrophobic additives include among others palm stearin, carnauba wax, zein, and lignin.

As used herein, the term "hydrophilic" in relation to a plasticizer or additive means a compound having a hydrophilic character, which typically includes compounds that comprise polar groups, such as hydroxyl and/or amino functionalities. By way of example, compounds such as glycerol, sugar alcohols, and similar compounds are hydrophilic. Hydrophilic plasticizer or additive includes plasticizers or additives that are water-soluble as is understood in the art.

The terms "glycerin" and "glycerol" are used interchangeably herein and refer to the same chemical compound.

The term "composition" is used herein in some aspects to refer to a pre-process mixture, and in some aspects to refer to an article or pellet, as will be clear from context.

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least,' 'at least about,' 'less than,' or 'less than about,' and any of the foregoing numbers can be used singly to describe a single point or an open-ended range, or can be used in combination to describe multiple single points or a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "at least" (e.g., at least 10), prefaced with the phrase "less than" (e.g., less than 1), prefaced with the phrase "less than about" (e.g., less than about 7), or used in any combination with or without any of the prefatory words or phrases to define a range (e.g., 2 to 9, about 1 to 4, at least 3, 8 to about 9, 8 to less than 10, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

In an aspect, a composition or compound disclosed herein, such as a hydrocolloid or plasticizer, is isolated or substantially purified. In an aspect, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The present invention provides a seaweed-based flexible and biodegradable composition, where kappa-, iota- and lambda-carrageenans are components of the composition. Currently available biodegradable injection-moldable formulations are comprised primarily of thermoplastic starch or corn-derived PLA or PHA obtained from the cytoplasm of certain bacteria. While processable, they demonstrate poor mechanical (low compression strength, brittleness) properties. Commonly employed techniques to address these shortcomings include the addition of plasticizers (glycerol, mannitol, and others) as well as reinforcement with cellulosic fibers (MCC, Ethocell, etc) and fillers ($CaCO_3$, talc, $BaSO_4$, $Na_2SO_4$ and others), addition of cross linkers (ionic and covalent).

Scaled commercial injection molding processes and equipment. Such compositions can be tough, stiff, hard and strong after the molding process. Pre-injection compositions can have good lubricity, elasticity, and can be slippery. Many plastic formulations are suitable for injection molding, and the flexible and biodegradable compositions herein can have properties pre-injection and after the molding process similar to the standard plastic compositions.

Compared to extrusion processes, injection molding requires high material flow index, especially for thin-walled products and large parts. Extrusion has less stringent material flow requirements because plastic extrusion is open-ended and does not have the huge resistance of die reversal. Therefore, extrusion generally compatible with low melt flow index (MFI) resins, while high MFI is generally needed for injection molding of geometrically demanding parts. Injection molding generally does not have strict requirements for exit expansion. The exit expansion of extrusion molding is difficult to handle. Therefore, the control of viscoelasticity of injection molding and extrusion materials will also be different.

Extrusion products lack the complexity that can be obtained with injection molding, and this lack of complexity limits the number of use-cases for extrusion compared to plastic injection molding.

It was surprisingly found that the addition of a covalent cross linker improved the properties of the resin formulation so that it was compatible with injection molding using commercially available injection molding systems. The resin formulations without the covalent cross linker had a lower melt flow index (MFI) and the injection molding products made were brittle. Surprisingly, the addition of a covalent cross linker to the resin increased (MFI) so that the resin had improved flow properties and general processability needed for the more demanding flow path of injection molding versus extrusion. Surprisingly, the amount of a covalent cross linker added to the resin changed the water stability of the product, with about 1.5-3.5% of anhydride crosslinker producing a product with good stability to prolonged exposure to aqueous solutions. As the amount of cross linker was increased above 3%, the flexibility of the product increased. A resin with 1.5-3.5% anhydride crosslinker had a good MFI (suitable for injection molding), and produced product that was stable to prolonged exposure to hot or room temperature aqueous liquids.

When the cross linker forms a covalent adaptable network (CAN) the formulations produced disposable articles that were stable with hot liquids or room temperature water for extended periods of time. These articles also had reduced swelling when exposed to aqueous solutions for extended periods compared to other formulations without cross linkers, or made with ionic cross linkers. The formulations which produced resins with CANs balanced these improved properties with aqueous solutions (e.g., hot or room temperature) with the ability of the articles made from the resin to biodegrade and/or be compostable. These properties (stability with aqueous solutions versus biodegradation and/or composability) are opposed to each other and both correlate with the ability of the article to wet and swell with water.

An advantageous property of covalent adaptable networks (CANs) formed in the resins is the ability of the covalent bonds in the CAN to break and reform under standard processing conditions for making articles from the resins. For example, when a resin is formed from hot-melt extrusion, a CAN forms in the resin when it cools. When the resin pellets are "melted" covalent bonds in the CAN break and the resin forms a composition with flow properties useful for injection molding. After the melted resin is injected into a mold, it cools and covalent bonds reform to make the disposable article. Also, the disposable article is composted and/or biodegraded the covalent bonds in the CAN are broken and the hydrocolloids in the article are degraded.

Without being bound by theory, the formulations described herein can utilize carrageenan as a polyanion, establishing a robust network through electrostatic interactions with partially protonated chitosan, acting as a polycation. The introduction of a covalent adaptable network (CAN) to the carrageenan and chitosan network improves the processability of the composition and the stability of the composition in aqueous solutions at both ambient and elevated temperatures.

These flexible formulations are preferably made of about 30 to 50% wt. of hydrocolloid, about 5 to 25% wt. plasticizer, about 10 to 20% wt. filler, about 40-60% wt. water, about 0.5 to 5% wt. cross-linker (e.g., Sodium trimetaphosphate (STMP); 1,2-bis(triethoxysilyl) ethane; Octenyl succinic anhydride (OSA); (SA); Itaconic anhydride (IA); Maleic anhydride (MA); Dialdehyde starch (DAS); tBu-3-oxobutanoate (t-BAA); Diketene acetone adduct (TMDO)), about 15-30% filler (such as $CaCO_3$ or $Na_2SO_4$) and other desired additives, such as coloring agents and preservatives. The formulations can have 10-40% wt. hydrocolloid, 5-20% wt. plasticizer, 5-20% wt. filler, 1-10% wt. crosslinker, and 10-79% wt. water. The formulations can have 15-35% wt. hydrocolloid, 5-20% wt. plasticizer, 5-20% wt. filler, 1-10% wt. crosslinker, and 15-74% wt. water. The formulations can have 20-35% wt. hydrocolloid, 10-20% wt. plasticizer, 5-20% wt. filler, 1-10% wt. crosslinker, and 15-64% wt. water. The formulations can have 20-35% wt. hydrocolloid, 5-20% wt. plasticizer, 10-20% wt. filler, 1-10% wt. crosslinker, and 15-64% wt. water. The formulations can have 20-35% wt. hydrocolloid, 10-20% wt. plasticizer, 10-20% wt. filler, 1-10% wt. crosslinker, and 15-59% wt. water. In an aspect, the crosslinker can be an anhydride such as succinic anhydride, octenyl succinic anhydride, maleic anhydride or itaconic anhydride (collectively anhydride crosslinkers), present in the formulations, e.g., at 0.5-5%, 1-5%, 2-5%, 3-5%, 4-5%, 0.5-4%, 1-4%, 2-4%, 3-4%, 0.5-3%, 1-3%, 2-3%, 0.1%, 0.5%, 1%, 2%, 3%, 4% or 5% wt.

Flexible formulations made with anhydride crosslinkers made disposable articles that could withstand aqueous liquids with elevated temperature (e.g., 70° C.) for an hour, and which disposable articles had reduced swelling when exposed to aqueous solutions. At elevated temperatures the flexible formulations with anhydride crosslinkers showed moderate to little or no disintegration after one hour. The flexible formulations with anhydride crosslinkers also showed less than 20%, less than 15%, 10-20%, 11-20%, 12-20%, 13-20%, 14-20%, 15-20%, 10%, 11%, 12%, 13%, 14%, 15%, 16%, 17%, 18%, 19%, or 20% swelling (measured as weight percent of water absorbed) in one hour at room temperature.

The compositions are preferably blended, then compounded using a twin screw extruder with co-rotating screws and injection molded using a 50-150 ton thermoplastic injection molding machine. In some aspects, the plasticizer is a mixture of hydrophilic and hydrophobic plasticizer. In some aspects, the plasticizer comprises 5-40 wt. % hydrophilic plasticizer and 0.5 to 2 wt. % hydrophobic plasticizer. In some aspects, the filler represents 5-40 wt. % of the pre-process mixture. In some aspects, the filler comprises an organic filler, an inorganic filler, a mineral salt filler, or any hydrate thereof. In some aspects, the filler comprises a metal hydroxide or hydrate thereof. In some aspects, the filler comprises a carbonate (e.g., calcium carbonate). In some aspects, the filler (or strength modifier) comprises MCC and/or citrus fiber. In some aspects, the filler also functions as a humectant.

In some aspects, the hydrocolloid is a mixture of carrageenan, particularly carrageenan comprising kappa-carrageenan, and at least one of alginate, chitin or chitosan. In some aspects, the hydrocolloid is a mixture of kappa-carrageenan and at least one of alginate, chitin or chitosan, optionally additionally including at least one natural gum, such as guar gum, gum arabic, locust bean gum, konjac gum, or xanthan gum. In some aspects, the hydrocolloid contains 20-60 wt. % kappa-carrageenan and 1-30 wt. % chitin. In some aspects, the hydrocolloid contains 30-50 wt. % kappa carrageenan and 1-25 wt. % chitosan. In some aspects, the hydrocolloid contains 10-20 wt. % kappa carrageenan and chitin and/or chitosan in a total amount of 1-10 wt. %. In some aspects, the hydrocolloid contains konjac gum, e.g., in an amount of 0-3 wt. %, 0-5 wt. %, or 0-10 wt. %.

In an aspect, the flexible formulation is made with 10-20% wt. carrageenan, 10-20% wt. chitosan, 5-20% glycerol (hydrophilic plus hydrophobic), 5-20% calcium carbonate, 1-10% crosslinker, and 10-69% water. In an aspect, the flexible formulation is made with 10-20% wt. carrageenan, 10-20% wt. chitosan, 5-20% glycerol (hydrophilic plus hydrophobic), 5-20% calcium carbonate, 1-10% succinic anhydride, and 10-69% water. In an aspect, the flexible formulation is made with 10-20% wt. carrageenan, 10-20% wt. chitosan, 5-20% glycerol (hydrophilic plus hydrophobic), 5-20% calcium carbonate, 1-5% crosslinker, and 15-69% water. In an aspect, the flexible formulation is made with 10-20% wt. carrageenan, 10-20% wt. chitosan, 5-20% glycerol (hydrophilic plus hydrophobic), 5-20% calcium carbonate, 1-5% succinic anhydride, and 15-69% water. In an aspect, the flexible formulation is made with 10-20% wt. carrageenan, 10-20% wt. chitosan, 5-20% glycerol (hydrophilic plus hydrophobic), 5-20% calcium carbonate, 1.6-3.5% crosslinker, and 18-69% water. In an aspect, the flexible formulation is made with 10-20% wt. carrageenan, 10-20% wt. chitosan, 5-20% glycerol (hydrophilic plus hydrophobic), 5-20% calcium carbonate, 1.6-3.5% succinic anhydride, and 18-69% water.

The flexible formulation can be made with 10% carrageenan, 10% wt. chitosan, 5% glycerol (hydrophilic plus hydrophobic), 5% calcium carbonate, 1-5% crosslinker (e.g., succinic anhydride), and 65-69% water. The flexible formulation can be made with 10% carrageenan, 10% wt. chitosan, 6% glycerol (hydrophilic plus hydrophobic), 6% calcium carbonate, 1-5% crosslinker (e.g., succinic anhydride), and 63-67% water. The flexible formulation can be made with 10% carrageenan, 10% wt. chitosan, 7% glycerol (hydrophilic plus hydrophobic), 7% calcium carbonate, 1-5% crosslinker (e.g., succinic anhydride), and 61-65% water. The flexible formulation can be made with 10% carrageenan, 10% wt. chitosan, 8% glycerol (hydrophilic plus hydrophobic), 8% calcium carbonate, 1-5% crosslinker (e.g., succinic anhydride), and 59-63% water. The flexible formulation can be made with 10% carrageenan, 10% wt. chitosan, 9% glycerol (hydrophilic plus hydrophobic), 9% calcium carbonate, 1-5% crosslinker (e.g., succinic anhydride), and 57-61% water. The flexible formulation can be made with 10% carrageenan, 10% wt. chitosan, 10% glycerol (hydrophilic plus hydrophobic), 10% calcium carbonate, 1-5% crosslinker (e.g., succinic anhydride), and 55-59% water. The flexible formulation can be made with 10% carrageenan, 10% wt. chitosan, 11% glycerol (hydrophilic plus hydrophobic), 11% calcium carbonate, 1-5% crosslinker (e.g., succinic anhydride), and 53-57% water. The flexible formulation can be made with 10% carrageenan, 10% wt. chitosan, 12% glycerol (hydrophilic plus hydrophobic), 12% calcium carbonate, 1-5% crosslinker (e.g., succinic anhydride), and 51-55% water. The flexible formulation can be made with 10% carrageenan, 10% wt. chitosan, 13% glycerol (hydrophilic plus hydrophobic), 13% calcium carbonate, 1-5% crosslinker (e.g., succinic anhydride), and 49-53% water. The flexible formulation can be made with 10% carrageenan, 10% wt. chitosan, 14% glycerol (hydrophilic plus hydrophobic), 14% calcium carbonate, 1-5% crosslinker (e.g., succinic anhydride), and 47-51% water. The flexible formulation can be made with 10% carrageenan, 10% wt. chitosan, 15% glycerol (hydrophilic plus hydrophobic), 15% calcium carbonate, 1-5% crosslinker (e.g., succinic anhydride), and 45-49% water. The flexible formulation can be made with 10% carrageenan, 10% wt. chitosan, 16% glycerol (hydrophilic plus hydrophobic), 16% calcium carbonate, 1-5% crosslinker (e.g., succinic anhydride), and 43-47% water. The flexible formulation can be made with 10% carrageenan, 10% wt. chitosan, 17% glycerol (hydrophilic plus hydrophobic), 17% calcium carbonate, 1-5% crosslinker (e.g., succinic anhydride), and 41-45% water. The flexible formulation can be made with 10% carrageenan, 10% wt. chitosan, 18% glycerol (hydrophilic plus hydrophobic), 18% calcium carbonate, 1-5% crosslinker (e.g., succinic anhydride), and 39-43% water. The flexible formulation can be made with 10% carrageenan, 10% wt. chitosan, 19% glycerol (hydrophilic plus hydrophobic), 19% calcium carbonate, 1-5% crosslinker (e.g., succinic anhydride), and 37-41% water. The flexible formulation can be made with 10% carrageenan, 10% wt. chitosan, 20% glycerol (hydrophilic plus hydrophobic), 20% calcium carbonate, 1-5% crosslinker (e.g., succinic anhydride), and 35-39% water.

The flexible formulation can be made with 11% carrageenan, 11% wt. chitosan, 5% glycerol (hydrophilic plus hydrophobic), 5% calcium carbonate, 1-5% crosslinker (e.g., succinic anhydride), and 63-67% water. The flexible formulation can be made with 11% carrageenan, 11% wt. chitosan, 6% glycerol (hydrophilic plus hydrophobic), 6% calcium carbonate, 1-5% crosslinker (e.g., succinic anhydride), and 61-65% water. The flexible formulation can be made with 11% carrageenan, 11% wt. chitosan, 7% glycerol (hydrophilic plus hydrophobic), 7% calcium carbonate, 1-5% crosslinker (e.g., succinic anhydride), and 59-63% water. The flexible formulation can be made with 11% carrageenan, 11% wt. chitosan, 8% glycerol (hydrophilic plus hydrophobic), 8% calcium carbonate, 1-5% crosslinker (e.g., succinic anhydride), and 57-61% water. The flexible formulation can be made with 11% carrageenan, 11% wt. chitosan, 9% glycerol (hydrophilic plus hydrophobic), 9% calcium carbonate, 1-5% crosslinker (e.g., succinic anhydride), and 55-59% water. The flexible formulation can be made with 11% carrageenan, 11% wt. chitosan, 10% glycerol (hydrophilic plus hydrophobic), 10% calcium carbonate, 1-5% crosslinker (e.g., succinic anhydride), and 53-57% water. The flexible formulation can be made with 11% carrageenan, 11% wt. chitosan, 11% glycerol (hydrophilic plus hydrophobic), 11% calcium carbonate, 1-5% crosslinker (e.g., succinic anhydride), and 51-55% water. The flexible formulation can be made with 11% carrageenan, 11% wt. chitosan, 12% glycerol (hydrophilic plus hydrophobic), 12% calcium carbonate, 1-5% crosslinker (e.g., succinic anhydride), and 49-53% water. The flexible formulation can be made with 11% carrageenan, 11% wt. chitosan, 13% glycerol (hydrophilic plus hydrophobic), 13% calcium carbonate, 1-5% crosslinker (e.g., succinic anhydride), and 47-51% water. The flexible formulation can be made with 11% carrageenan, 11% wt. chitosan, 14% glycerol (hydrophilic plus hydrophobic), 14% calcium carbonate, 1-5% crosslinker (e.g., succinic anhydride), and 45-49% water. The flexible formulation can be made with 11% carrageenan, 11% wt. chitosan, 15% glycerol (hydrophilic plus hydrophobic), 15% calcium carbonate, 1-5% crosslinker (e.g., succinic anhydride), and 43-47% water. The flexible formulation can be made with 11% carrageenan, 11% wt. chitosan, 16% glycerol (hydrophilic plus hydrophobic), 16% calcium carbonate, 1-5% crosslinker (e.g., succinic anhydride), and 41-45% water. The flexible formulation can be made with 11% carrageenan, 11% wt. chitosan, 17% glycerol (hydrophilic plus hydrophobic), 17% calcium carbonate, 1-5% crosslinker (e.g., succinic anhydride), and 39-43% water. The flexible formulation can be made with 11% carrageenan, 11% wt. chitosan, 18% glycerol (hydrophilic plus hydrophobic), 18% calcium carbonate, 1-5% crosslinker (e.g., succinic anhydride), and 37-41% water. The flexible formulation can be made with 11% carrageenan, 11% wt. chitosan, 19% glycerol (hydrophilic plus hydrophobic), 19% calcium carbonate, 1-5% crosslinker (e.g., succinic anhydride), and 35-39% water. The flexible formulation can be made with 11% carrageenan, 11% wt. chitosan, 20% glycerol (hydrophilic plus hydrophobic), 20% calcium carbonate, 1-5% crosslinker (e.g., succinic anhydride), and 33-37% water.

The flexible formulation can be made with 12% carrageenan, 12% wt. chitosan, 5% glycerol (hydrophilic plus hydrophobic), 5% calcium carbonate, and 66% water. The flexible formulation can be made with 12% carrageenan, 12% wt. chitosan, 6% glycerol (hydrophilic plus hydrophobic), 6% calcium carbonate, 1-5% crosslinker (e.g., succinic anhydride), and 59-53% water. The flexible formulation can be made with 12% carrageenan, 12% wt. chitosan, 7% glycerol (hydrophilic plus hydrophobic), 7% calcium carbonate, 1-5% crosslinker (e.g., succinic anhydride), and 57-61% water. The flexible formulation can be made with 12% carrageenan, 12% wt. chitosan, 8% glycerol (hydrophilic plus hydrophobic), 8% calcium carbonate, 1-5% crosslinker (e.g., succinic anhydride), and 55-59% water. The flexible formulation can be made with 12% carrageenan, 12% wt. chitosan, 9% glycerol (hydrophilic plus hydrophobic), 9% calcium carbonate, 1-5% crosslinker (e.g., succinic anhydride), and 53-57% water. The flexible formulation can be made with 12% carrageenan, 12% wt. chitosan, 10% glycerol (hydrophilic plus hydrophobic), 10% calcium carbonate, 1-5% crosslinker (e.g., succinic anhydride), and 51-55% water. The flexible formulation can be made with 12% carrageenan, 12% wt. chitosan, 11% glycerol (hydrophilic plus hydrophobic), 11% calcium carbonate, 1-5% crosslinker (e.g., succinic anhydride), and 49-53% water. The flexible formulation can be made with 12% carrageenan, 12% wt. chitosan, 12% glycerol (hydrophilic plus hydrophobic), 12% calcium carbonate, 1-5% crosslinker (e.g., succinic anhydride), and 47-51% water. The flexible formulation can be made with 12% carrageenan, 12% wt. chitosan, 13% glycerol (hydrophilic plus hydrophobic), 13% calcium carbonate, 1-5% crosslinker (e.g., succinic anhydride), and 45-49% water. The flexible formulation can be made with 12% carrageenan, 12% wt. chitosan, 14% glycerol (hydrophilic plus hydrophobic), 14% calcium carbonate, 1-5% crosslinker (e.g., succinic anhydride), and 43-47% water. The flexible formulation can be made with 12% carrageenan, 12% wt. chitosan, 15% glycerol (hydrophilic plus hydrophobic), 15% calcium carbonate, 1-5% crosslinker (e.g., succinic anhydride), and 41-45% water. The flexible formulation can be made with 12% carrageenan, 12% wt. chitosan, 16% glycerol (hydrophilic plus hydrophobic), 16% calcium carbonate, 1-5% crosslinker (e.g., succinic anhydride), and 39-43% water. The flexible formulation can be made with 12% carrageenan, 12% wt. chitosan, 17% glycerol (hydrophilic plus hydrophobic), 17% calcium carbonate, 1-5% crosslinker (e.g., succinic anhydride), and 37-41% water. The flexible formulation can be made with 12% carrageenan, 12% wt. chitosan, 18% glycerol (hydrophilic plus hydrophobic), 18% calcium carbonate, 1-5% crosslinker (e.g., succinic anhydride), and 35-39% water. The flexible formulation can be made with 12% carrageenan, 12% wt. chitosan, 19% glycerol (hydrophilic plus hydrophobic), 19% calcium carbonate, 1-5% crosslinker (e.g., succinic anhydride), and 33-37% water. The flexible formulation can be made with 12% carrageenan, 12% wt. chitosan, 20% glycerol (hydrophilic plus hydrophobic), 20% calcium carbonate, 1-5% crosslinker (e.g., succinic anhydride), and 31-35% water.

The flexible formulation can be made with 13% carrageenan, 13% wt. chitosan, 5% glycerol (hydrophilic plus hydrophobic), 5% calcium carbonate, 1-5% crosslinker (e.g., succinic anhydride), and 59-63% water. The flexible formulation can be made with 13% carrageenan, 13% wt.

chitosan, 6% glycerol (hydrophilic plus hydrophobic), 6% calcium carbonate, 1-5% crosslinker (e.g., succinic anhydride), and 57-61% water. The flexible formulation can be made with 13% carrageenan, 13% wt. chitosan, 7% glycerol (hydrophilic plus hydrophobic), 7% calcium carbonate, 1-5% crosslinker (e.g., succinic anhydride), and 55-59% water. The flexible formulation can be made with 13% carrageenan, 13% wt. chitosan, 8% glycerol (hydrophilic plus hydrophobic), 8% calcium carbonate, 1-5% crosslinker (e.g., succinic anhydride), and 53-57% water. The flexible formulation can be made with 13% carrageenan, 13% wt. chitosan, 9% glycerol (hydrophilic plus hydrophobic), 9% calcium carbonate, 1-5% crosslinker (e.g., succinic anhydride), and 51-55% water. The flexible formulation can be made with 13% carrageenan, 13% wt. chitosan, 10% glycerol (hydrophilic plus hydrophobic), 10% calcium carbonate, 1-5% crosslinker (e.g., succinic anhydride), and 49-53% water. The flexible formulation can be made with 13% carrageenan, 13% wt. chitosan, 11% glycerol (hydrophilic plus hydrophobic), 11% calcium carbonate, 1-5% crosslinker (e.g., succinic anhydride), and 47-51% water. The flexible formulation can be made with 13% carrageenan, 13% wt. chitosan, 12% glycerol (hydrophilic plus hydrophobic), 12% calcium carbonate, 1-5% crosslinker (e.g., succinic anhydride), and 45-49% water. The flexible formulation can be made with 13% carrageenan, 13% wt. chitosan, 13% glycerol (hydrophilic plus hydrophobic), 13% calcium carbonate, 1-5% crosslinker (e.g., succinic anhydride), and 43-47% water. The flexible formulation can be made with 13% carrageenan, 13% wt. chitosan, 14% glycerol (hydrophilic plus hydrophobic), 14% calcium carbonate, 1-5% crosslinker (e.g., succinic anhydride), and 41-45% water. The flexible formulation can be made with 13% carrageenan, 13% wt. chitosan, 15% glycerol (hydrophilic plus hydrophobic), 15% calcium carbonate, 1-5% crosslinker (e.g., succinic anhydride), and 39-43% water. The flexible formulation can be made with 13% carrageenan, 13% wt. chitosan, 16% glycerol (hydrophilic plus hydrophobic), 16% calcium carbonate, 1-5% crosslinker (e.g., succinic anhydride), and 37-41% water. The flexible formulation can be made with 13% carrageenan, 13% wt. chitosan, 17% glycerol (hydrophilic plus hydrophobic), 17% calcium carbonate, 1-5% crosslinker (e.g., succinic anhydride), and 35-39% water. The flexible formulation can be made with 13% carrageenan, 13% wt. chitosan, 18% glycerol (hydrophilic plus hydrophobic), 18% calcium carbonate, 1-5% crosslinker (e.g., succinic anhydride), and 33-37% water. The flexible formulation can be made with 13% carrageenan, 13% wt. chitosan, 19% glycerol (hydrophilic plus hydrophobic), 19% calcium carbonate, 1-5% crosslinker (e.g., succinic anhydride), and 31-35% water. The flexible formulation can be made with 13% carrageenan, 13% wt. chitosan, 20% glycerol (hydrophilic plus hydrophobic), 20% calcium carbonate, 1-5% crosslinker (e.g., succinic anhydride), and 29-33% water.

The flexible formulation can be made with 14% carrageenan, 14% wt. chitosan, 5% glycerol (hydrophilic plus hydrophobic), 5% calcium carbonate, 1-5% crosslinker (e.g., succinic anhydride), and 57-61% water. The flexible formulation can be made with 14% carrageenan, 14% wt. chitosan, 6% glycerol (hydrophilic plus hydrophobic), 6% calcium carbonate, 1-5% crosslinker (e.g., succinic anhydride), and 55-59% water. The flexible formulation can be made with 14% carrageenan, 14% wt. chitosan, 7% glycerol (hydrophilic plus hydrophobic), 7% calcium carbonate, 1-5% crosslinker (e.g., succinic anhydride), and 53-57% water. The flexible formulation can be made with 14% carrageenan, 14% wt. chitosan, 8% glycerol (hydrophilic plus hydrophobic), 8% calcium carbonate, 1-5% crosslinker (e.g., succinic anhydride), and 51-55% water. The flexible formulation can be made with 14% carrageenan, 14% wt. chitosan, 9% glycerol (hydrophilic plus hydrophobic), 9% calcium carbonate, 1-5% crosslinker (e.g., succinic anhydride), and 49-53% water. The flexible formulation can be made with 14% carrageenan, 14% wt. chitosan, 10% glycerol (hydrophilic plus hydrophobic), 10% calcium carbonate, 1-5% crosslinker (e.g., succinic anhydride), and 47-51% water. The flexible formulation can be made with 14% carrageenan, 14% wt. chitosan, 11% glycerol (hydrophilic plus hydrophobic), 11% calcium carbonate, 1-5% crosslinker (e.g., succinic anhydride), and 45-49% water. The flexible formulation can be made with 14% carrageenan, 14% wt. chitosan, 12% glycerol (hydrophilic plus hydrophobic), 12% calcium carbonate, 1-5% crosslinker (e.g., succinic anhydride), and 43-47% water. The flexible formulation can be made with 14% carrageenan, 14% wt. chitosan, 13% glycerol (hydrophilic plus hydrophobic), 13% calcium carbonate, 1-5% crosslinker (e.g., succinic anhydride), and 41-45% water. The flexible formulation can be made with 14% carrageenan, 14% wt. chitosan, 14% glycerol (hydrophilic plus hydrophobic), 14% calcium carbonate, 1-5% crosslinker (e.g., succinic anhydride), and 39-43% water. The flexible formulation can be made with 14% carrageenan, 14% wt. chitosan, 15% glycerol (hydrophilic plus hydrophobic), 15% calcium carbonate, 1-5% crosslinker (e.g., succinic anhydride), and 37-41% water. The flexible formulation can be made with 14% carrageenan, 14% wt. chitosan, 16% glycerol (hydrophilic plus hydrophobic), 16% calcium carbonate, 1-5% crosslinker (e.g., succinic anhydride), and 35-39% water. The flexible formulation can be made with 14% carrageenan, 14% wt. chitosan, 17% glycerol (hydrophilic plus hydrophobic), 17% calcium carbonate, 1-5% crosslinker (e.g., succinic anhydride), and 33-37% water. The flexible formulation can be made with 14% carrageenan, 14% wt. chitosan, 18% glycerol (hydrophilic plus hydrophobic), 18% calcium carbonate, 1-5% crosslinker (e.g., succinic anhydride), and 31-35% water. The flexible formulation can be made with 14% carrageenan, 14% wt. chitosan, 19% glycerol (hydrophilic plus hydrophobic), 19% calcium carbonate, 1-5% crosslinker (e.g., succinic anhydride), and 29-33% water. The flexible formulation can be made with 14% carrageenan, 14% wt. chitosan, 20% glycerol (hydrophilic plus hydrophobic), 20% calcium carbonate, 1-5% crosslinker (e.g., succinic anhydride), and 27-31% water.

The flexible formulation can be made with 15% carrageenan, 15% wt. chitosan, 5% glycerol (hydrophilic plus hydrophobic), 5% calcium carbonate, 1-5% crosslinker (e.g., succinic anhydride), and 55-59% water. The flexible formulation can be made with 15% carrageenan, 15% wt. chitosan, 6% glycerol (hydrophilic plus hydrophobic), 6% calcium carbonate, 1-5% crosslinker (e.g., succinic anhydride), and 53-57% water. The flexible formulation can be made with 15% carrageenan, 15% wt. chitosan, 7% glycerol (hydrophilic plus hydrophobic), 7% calcium carbonate, 1-5% crosslinker (e.g., succinic anhydride), and 51-55% water. The flexible formulation can be made with 15% carrageenan, 15% wt. chitosan, 8% glycerol (hydrophilic plus hydrophobic), 8% calcium carbonate, 1-5% crosslinker (e.g., succinic anhydride), and 49-53% water. The flexible formulation can be made with 15% carrageenan, 15% wt. chitosan, 9% glycerol (hydrophilic plus hydrophobic), 9% calcium carbonate, 1-5% crosslinker (e.g., succinic anhydride), and 47-51% water. The flexible formulation can be made with 15% carrageenan, 15% wt. chitosan, 10% glycerol (hydrophilic plus hydrophobic), 10% calcium carbonate, 1-5% crosslinker (e.g., succinic anhydride), and 45-49% water. The flexible formulation can be made with 15% carrageenan, 15% wt. chitosan, 11% glycerol (hydrophilic plus hydrophobic), 11% calcium carbonate, 1-5% crosslinker (e.g., succinic anhydride), and 43-47% water. The flexible formulation can be made with 15% carrageenan, 15% wt. chitosan, 12% glycerol (hydrophilic plus hydrophobic), 12% calcium carbonate, 1-5% crosslinker (e.g., succinic anhydride), and 41-45% water. The flexible formulation can be made with 15% carrageenan, 15% wt. chitosan, 13% glycerol (hydrophilic plus hydrophobic), 13% calcium carbonate, 1-5% crosslinker (e.g., succinic anhydride), and 39-43% water. The flexible formulation can be made with 15% carrageenan, 15% wt. chitosan, 14% glycerol (hydrophilic plus hydrophobic), 14% calcium carbonate, 1-5% crosslinker (e.g., succinic anhydride), and 37-41% water. The flexible formulation can be made with 15% carrageenan, 15% wt. chitosan, 15% glycerol (hydrophilic plus hydrophobic), 15% calcium carbonate, 1-5% crosslinker (e.g., succinic anhydride), and 35-39% water. The flexible formulation can be made with 15% carrageenan, 15% wt. chitosan, 16% glycerol (hydrophilic plus hydrophobic), 16% calcium carbonate, 1-5% crosslinker (e.g., succinic anhydride), and 33-37% water. The flexible formulation can be made with 15% carrageenan, 15% wt. chitosan, 17% glycerol (hydrophilic plus hydrophobic), 17% calcium carbonate, 1-5% crosslinker (e.g., succinic anhydride), and 31-35% water. The flexible formulation can be made with 15% carrageenan, 15% wt. chitosan, 18% glycerol (hydrophilic plus hydrophobic), 18% calcium carbonate, 1-5% crosslinker (e.g., succinic anhydride), and 29-33% water. The flexible formulation can be made with 15% carrageenan, 15% wt. chitosan, 19% glycerol (hydrophilic plus hydrophobic), 19% calcium carbonate, 1-5% crosslinker (e.g., succinic anhydride), and 27-31% water. The flexible formulation can be made with 15% carrageenan, 15% wt. chitosan, 20% glycerol (hydrophilic plus hydrophobic), 20% calcium carbonate, 1-5% crosslinker (e.g., succinic anhydride), and 25-29% water.

The flexible formulation can be made with 16% carrageenan, 16% wt. chitosan, 5% glycerol (hydrophilic plus hydrophobic), 5% calcium carbonate, 1-5% crosslinker (e.g., succinic anhydride), and 55-59% water. The flexible formulation can be made with 16% carrageenan, 16% wt. chitosan, 6% glycerol (hydrophilic plus hydrophobic), 6% calcium carbonate, 1-5% crosslinker (e.g., succinic anhydride), and 51-55% water. The flexible formulation can be made with 16% carrageenan, 16% wt. chitosan, 7% glycerol (hydrophilic plus hydrophobic), 7% calcium carbonate, 1-5% crosslinker (e.g., succinic anhydride), and 49-53% water. The flexible formulation can be made with 16% carrageenan, 16% wt. chitosan, 8% glycerol (hydrophilic plus hydrophobic), 8% calcium carbonate, 1-5% crosslinker (e.g., succinic anhydride), and 47-51% water. The flexible formulation can be made with 16% carrageenan, 16% wt. chitosan, 9% glycerol (hydrophilic plus hydrophobic), 9% calcium carbonate, 1-5% crosslinker (e.g., succinic anhydride), and 45-49% water. The flexible formulation can be made with 16% carrageenan, 16% wt. chitosan, 10% glycerol (hydrophilic plus hydrophobic), 10% calcium carbonate, 1-5% crosslinker (e.g., succinic anhydride), and 43-47% water. The flexible formulation can be made with 16% carrageenan, 16% wt. chitosan, 11% glycerol (hydrophilic plus hydrophobic), 11% calcium carbonate, 1-5% crosslinker (e.g., succinic anhydride), and 41-45% water. The flexible formulation can be made with 16% carrageenan, 16% wt. chitosan, 12% glycerol (hydrophilic plus hydrophobic), 12% calcium carbonate, 1-5% crosslinker (e.g., succinic anhydride), and 39-43% water. The flexible formulation can be made with 16% carrageenan, 16% wt. chitosan, 13% glycerol (hydrophilic plus hydrophobic), 13% calcium carbonate, 1-5% crosslinker (e.g., succinic anhydride), and 37-41% water. The flexible formulation can be made with 16% carrageenan, 16% wt. chitosan, 14% glycerol (hydrophilic plus hydrophobic), 14% calcium carbonate, 1-5% crosslinker (e.g., succinic anhydride), and 35-39% water. The flexible formulation can be made with 16% carrageenan, 16% wt. chitosan, 15% glycerol (hydrophilic plus hydrophobic), 15% calcium carbonate, 1-5% crosslinker (e.g., succinic anhydride), and 33-37% water. The flexible formulation can be made with 16% carrageenan, 16% wt. chitosan, 16% glycerol (hydrophilic plus hydrophobic), 16% calcium carbonate, 1-5% crosslinker (e.g., succinic anhydride), and 31-35% water. The flexible formulation can be made with 16% carrageenan, 16% wt. chitosan, 17% glycerol (hydrophilic plus hydrophobic), 17% calcium carbonate, 1-5% crosslinker (e.g., succinic anhydride), and 29-33% water. The flexible formulation can be made with 16% carrageenan, 16% wt. chitosan, 18% glycerol (hydrophilic plus hydrophobic), 18% calcium carbonate, 1-5% crosslinker (e.g., succinic anhydride), and 27-31% water. The flexible formulation can be made with 16% carrageenan, 16% wt. chitosan, 19% glycerol (hydrophilic plus hydrophobic), 19% calcium carbonate, 1-5% crosslinker (e.g., succinic anhydride), and 25-29% water. The flexible formulation can be made with 16% carrageenan, 16% wt. chitosan, 20% glycerol (hydrophilic plus hydrophobic), 20% calcium carbonate, 1-5% crosslinker (e.g., succinic anhydride), and 23-27% water. The flexible formulation can be made with 16-18% carrageenan, 16-18% wt. chitosan, 5-9.5% glycerol (hydrophilic plus hydrophobic), 12.5-14% calcium carbonate, 1.5-3% succinic anhydride, and 41.5-49% water.

The flexible formulation can be made with 17% carrageenan, 17% wt. chitosan, 5% glycerol (hydrophilic plus hydrophobic), 5% calcium carbonate, 1-5% crosslinker (e.g., succinic anhydride), and 51-55% water. The flexible formulation can be made with 17% carrageenan, 17% wt. chitosan, 6% glycerol (hydrophilic plus hydrophobic), 6% calcium carbonate, 1-5% crosslinker (e.g., succinic anhydride), and 49-53% water. The flexible formulation can be made with 17% carrageenan, 17% wt. chitosan, 7% glycerol (hydrophilic plus hydrophobic), 7% calcium carbonate, 1-5% crosslinker (e.g., succinic anhydride), and 47-51% water. The flexible formulation can be made with 17% carrageenan, 17% wt. chitosan, 8% glycerol (hydrophilic plus hydrophobic), 8% calcium carbonate, 1-5% crosslinker (e.g., succinic anhydride), and 45-49% water. The flexible formulation can be made with 17% carrageenan, 17% wt. chitosan, 9% glycerol (hydrophilic plus hydrophobic), 9% calcium carbonate, 1-5% crosslinker (e.g., succinic anhydride), and 43-47% water. The flexible formulation can be made with 17% carrageenan, 17% wt. chitosan, 10% glycerol (hydrophilic plus hydrophobic), 10% calcium carbonate, 1-5% crosslinker (e.g., succinic anhydride), and 41-45% water. The flexible formulation can be made with 17% carrageenan, 17% wt. chitosan, 11% glycerol (hydrophilic plus hydrophobic), 11% calcium carbonate, 1-5% crosslinker (e.g., succinic anhydride), and 39-43% water. The flexible formulation can be made with 17% carrageenan, 17% wt. chitosan, 12% glycerol (hydrophilic plus hydrophobic), 12% calcium carbonate, 1-5% crosslinker (e.g., succinic anhydride), and 37-41% water. The flexible formulation can be made with 17% carrageenan, 17% wt. chitosan, 13% glycerol (hydrophilic plus hydrophobic), 13% calcium carbonate, 1-5% crosslinker (e.g., succinic anhydride), and 35-39% water. The flexible formulation can be made with 17% carrageenan, 17% wt. chitosan, 14% glycerol (hydrophilic plus hydrophobic), 14% calcium carbonate, 1-5% crosslinker (e.g., succinic anhydride), and 33-37% water. The flexible formulation can be made with 17% carrageenan, 17% wt. chitosan, 15% glycerol (hydrophilic plus hydrophobic), 15% calcium carbonate, 1-5% crosslinker (e.g., succinic anhydride), and 31-35% water. The flexible formulation can be made with 17% carrageenan, 17% wt. chitosan, 16% glycerol (hydrophilic plus hydrophobic), 16% calcium carbonate, 1-5% crosslinker (e.g., succinic anhydride), and 29-33% water. The flexible formulation can be made with 17% carrageenan, 17% wt. chitosan, 17% glycerol (hydrophilic plus hydrophobic), 17% calcium carbonate, 1-5% crosslinker (e.g., succinic anhydride), and 27-31% water. The flexible formulation can be made with 17% carrageenan, 17% wt. chitosan, 18% glycerol (hydrophilic plus hydrophobic), 18% calcium carbonate, 1-5% crosslinker (e.g., succinic anhydride), and 25-29% water. The flexible formulation can be made with 17% carrageenan, 17% wt. chitosan, 19% glycerol (hydrophilic plus hydrophobic), 19% calcium carbonate, 1-5% crosslinker (e.g., succinic anhydride), and 23-27% water. The flexible formulation can be made with 17% carrageenan, 17% wt. chitosan, 20% glycerol (hydrophilic plus hydrophobic), 20% calcium carbonate, 1-5% crosslinker (e.g., succinic anhydride), and 21-25% water.

The flexible formulation can be made with 18% carrageenan, 18% wt. chitosan, 5% glycerol (hydrophilic plus hydrophobic), 5% calcium carbonate, 1-5% crosslinker (e.g., succinic anhydride), and 49-53% water. The flexible formulation can be made with 18% carrageenan, 18% wt. chitosan, 6% glycerol (hydrophilic plus hydrophobic), 6% calcium carbonate, 1-5% crosslinker (e.g., succinic anhydride), and 47-51% water. The flexible formulation can be made with 18% carrageenan, 18% wt. chitosan, 7% glycerol (hydrophilic plus hydrophobic), 7% calcium carbonate, 1-5% crosslinker (e.g., succinic anhydride), and 45-49% water. The flexible formulation can be made with 18% carrageenan, 18% wt. chitosan, 8% glycerol (hydrophilic plus hydrophobic), 8% calcium carbonate, 1-5% crosslinker (e.g., succinic anhydride), and 43-47% water. The flexible formulation can be made with 18% carrageenan, 18% wt. chitosan, 9% glycerol (hydrophilic plus hydrophobic), 9% calcium carbonate, 1-5% crosslinker (e.g., succinic anhydride), and 41-45% water. The flexible formulation can be made with 18% carrageenan, 18% wt. chitosan, 10% glycerol (hydrophilic plus hydrophobic), 10% calcium carbonate, 1-5% crosslinker (e.g., succinic anhydride), and 39-43% water. The flexible formulation can be made with 18% carrageenan, 18% wt. chitosan, 11% glycerol (hydrophilic plus hydrophobic), 11% calcium carbonate, 1-5% crosslinker (e.g., succinic anhydride), and 37-41% water. The flexible formulation can be made with 18% carrageenan, 18% wt. chitosan, 12% glycerol (hydrophilic plus hydrophobic), 12% calcium carbonate, 1-5% crosslinker (e.g., succinic anhydride), and 35-39% water. The flexible formulation can be made with 18% carrageenan, 18% wt. chitosan, 13% glycerol (hydrophilic plus hydrophobic), 13% calcium carbonate, 1-5% crosslinker (e.g., succinic anhydride), and 33-37% water. The flexible formulation can be made with 18% carrageenan, 18% wt. chitosan, 14% glycerol (hydrophilic plus hydrophobic), 14% calcium carbonate, 1-5% crosslinker (e.g., succinic anhydride), and 31-35% water.

The flexible formulation can be made with 18% carrageenan, 18% wt. chitosan, 15% glycerol (hydrophilic plus hydrophobic), 15% calcium carbonate, 1-5% crosslinker (e.g., succinic anhydride), and 29-33% water. The flexible formulation can be made with 18% carrageenan, 18% wt. chitosan, 16% glycerol (hydrophilic plus hydrophobic), 16% calcium carbonate, 1-5% crosslinker (e.g., succinic anhydride), and 27-31% water. The flexible formulation can be made with 18% carrageenan, 18% wt. chitosan, 17% glycerol (hydrophilic plus hydrophobic), 17% calcium carbonate, 1-5% crosslinker (e.g., succinic anhydride), and 25-29% water. The flexible formulation can be made with 18% carrageenan, 18% wt. chitosan, 18% glycerol (hydrophilic plus hydrophobic), 18% calcium carbonate, 1-5% crosslinker (e.g., succinic anhydride), and 23-27% water. The flexible formulation can be made with 18% carrageenan, 18% wt. chitosan, 19% glycerol (hydrophilic plus hydrophobic), 19% calcium carbonate, 1-5% crosslinker (e.g., succinic anhydride), and 21-25% water. The flexible formulation can be made with 18% carrageenan, 18% wt. chitosan, 20% glycerol (hydrophilic plus hydrophobic), 20% calcium carbonate, 1-5% crosslinker (e.g., succinic anhydride), and 19-23% water.

The flexible formulation can be made with 19% carrageenan, 19% wt. chitosan, 5% glycerol (hydrophilic plus hydrophobic), 5% calcium carbonate, 1-5% crosslinker (e.g., succinic anhydride), and 47-51% water. The flexible formulation can be made with 19% carrageenan, 19% wt. chitosan, 6% glycerol (hydrophilic plus hydrophobic), 6% calcium carbonate, 1-5% crosslinker (e.g., succinic anhydride), and 45-49% water. The flexible formulation can be made with 19% carrageenan, 19% wt. chitosan, 7% glycerol (hydrophilic plus hydrophobic), 7% calcium carbonate, 1-5% crosslinker (e.g., succinic anhydride), and 43-47% water. The flexible formulation can be made with 19% carrageenan, 19% wt. chitosan, 8% glycerol (hydrophilic plus hydrophobic), 8% calcium carbonate, 1-5% crosslinker (e.g., succinic anhydride), and 41-45% water. The flexible formulation can be made with 19% carrageenan, 19% wt. chitosan, 9% glycerol (hydrophilic plus hydrophobic), 9% calcium carbonate, 1-5% crosslinker (e.g., succinic anhydride), and 39-43% water. The flexible formulation can be made with 19% carrageenan, 19% wt. chitosan, 10% glycerol (hydrophilic plus hydrophobic), 10% calcium carbonate, 1-5% crosslinker (e.g., succinic anhydride), and 37-41% water. The flexible formulation can be made with 19% carrageenan, 19% wt. chitosan, 11% glycerol (hydrophilic plus hydrophobic), 11% calcium carbonate, 1-5% crosslinker (e.g., succinic anhydride), and 35-39% water. The flexible formulation can be made with 19% carrageenan, 19% wt. chitosan, 12% glycerol (hydrophilic plus hydrophobic), 12% calcium carbonate, 1-5% crosslinker (e.g., succinic anhydride), and 33-37% water. The flexible formulation can be made with 19% carrageenan, 19% wt. chitosan, 13% glycerol (hydrophilic plus hydrophobic), 13% calcium carbonate, 1-5% crosslinker (e.g., succinic anhydride), and 31-35% water. The flexible formulation can be made with 19% carrageenan, 19% wt. chitosan, 14% glycerol (hydrophilic plus hydrophobic), 14% calcium carbonate, 1-5% crosslinker (e.g., succinic anhydride), and 29-33% water. The flexible formulation can be made with 19% carrageenan, 19% wt. chitosan, 15% glycerol (hydrophilic plus hydrophobic), 15% calcium carbonate, 1-5% crosslinker (e.g., succinic anhydride), and 27-31% water. The flexible formulation can be made with 19% carrageenan, 19% wt. chitosan, 16% glycerol (hydrophilic plus hydrophobic), 16% calcium carbonate, 1-5% crosslinker (e.g., succinic anhydride), and 25-29% water. The flexible formulation can be made with 19% carrageenan, 19% wt. chitosan, 17% glycerol (hydrophilic plus hydrophobic), 17% calcium carbonate, 1-5% crosslinker (e.g., succinic anhydride), and 23-27% water. The flexible formulation can be made with 19% carrageenan, 19% wt. chitosan, 18% glycerol (hydrophilic plus hydrophobic), 18% calcium carbonate, 1-5% crosslinker (e.g., succinic anhydride), and 21-25% water. The flexible formulation can be made with 19% carrageenan, 19% wt. chitosan, 19% glycerol (hydrophilic plus hydrophobic), 19% calcium carbonate, 1-5% crosslinker (e.g., succinic anhydride), and 19-23% water. The flexible formulation can be made with 19% carrageenan, 19% wt. chitosan, 20% glycerol (hydrophilic plus hydrophobic), 20% calcium carbonate, 1-5% crosslinker (e.g., succinic anhydride), and 17-21% water.

The flexible formulation can be made with 20% carrageenan, 20% wt. chitosan, 5% glycerol (hydrophilic plus hydrophobic), 5% calcium carbonate, 1-5% crosslinker (e.g., succinic anhydride), and 45-49% water. The flexible formulation can be made with 20% carrageenan, 20% wt. chitosan, 6% glycerol (hydrophilic plus hydrophobic), 6% calcium carbonate, 1-5% crosslinker (e.g., succinic anhydride), and 43-47% water. The flexible formulation can be made with 20% carrageenan, 20% wt. chitosan, 7% glycerol (hydrophilic plus hydrophobic), 7% calcium carbonate, 1-5% crosslinker (e.g., succinic anhydride), and 41-45% water. The flexible formulation can be made with 20% carrageenan, 20% wt. chitosan, 8% glycerol (hydrophilic plus hydrophobic), 8% calcium carbonate, 1-5% crosslinker (e.g., succinic anhydride), and 39-43% water. The flexible formulation can be made with 20% carrageenan, 20% wt. chitosan, 9% glycerol (hydrophilic plus hydrophobic), 9% calcium carbonate, 1-5% crosslinker (e.g., succinic anhydride), and 37-41% water. The flexible formulation can be made with 20% carrageenan, 20% wt. chitosan, 10% glycerol (hydrophilic plus hydrophobic), 10% calcium carbonate, 1-5% crosslinker (e.g., succinic anhydride), and 35-39% water. The flexible formulation can be made with 20% carrageenan, 20% wt. chitosan, 11% glycerol (hydrophilic plus hydrophobic), 11% calcium carbonate, 1-5% crosslinker (e.g., succinic anhydride), and 33-37% water. The flexible formulation can be made with 20% carrageenan, 20% wt. chitosan, 12% glycerol (hydrophilic plus hydrophobic), 12% calcium carbonate, 1-5% crosslinker (e.g., succinic anhydride), and 31-35% water. The flexible formulation can be made with 20% carrageenan, 20% wt. chitosan, 13% glycerol (hydrophilic plus hydrophobic), 13% calcium carbonate, 1-5% crosslinker (e.g., succinic anhydride), and 29-33% water. The flexible formulation can be made with 20% carrageenan, 20% wt. chitosan, 14% glycerol (hydrophilic plus hydrophobic), 14% calcium carbonate, 1-5% crosslinker (e.g., succinic anhydride), and 27-31% water. The flexible formulation can be made with 20% carrageenan, 20% wt. chitosan, 15% glycerol (hydrophilic plus hydrophobic), 15% calcium carbonate, 1-5% crosslinker (e.g., succinic anhydride), and 25-29% water. The flexible formulation can be made with 20% carrageenan, 20% wt. chitosan, 16% glycerol (hydrophilic plus hydrophobic), 16% calcium carbonate, 1-5% crosslinker (e.g., succinic anhydride), and 23-27% water. The flexible formulation can be made with 20% carrageenan, 20% wt. chitosan, 17% glycerol (hydrophilic plus hydrophobic), 17% calcium carbonate, 1-5% crosslinker (e.g., succinic anhydride), and 21-25% water. The flexible formulation can be made with 20% carrageenan, 20% wt. chitosan, 18% glycerol (hydrophilic plus hydrophobic), 18% calcium carbonate, 1-5% crosslinker (e.g., succinic anhydride), and 19-23% water. The flexible formulation can be made with 20% carrageenan, 20% wt. chitosan, 19% glycerol (hydrophilic plus hydrophobic), 19% calcium carbonate, 1-5% crosslinker (e.g., succinic anhydride), and 17-21% water. The flexible formulation can be made with 20% carrageenan, 20% wt. chitosan, 20% glycerol (hydrophilic plus hydrophobic), 20% calcium carbonate, 1-5% crosslinker (e.g., succinic anhydride), and 15-19% water.

In an aspect, the foregoing formulations of carrageenan, chitosan, glycerol and calcium carbonate can also include a crosslinker (e.g., at 0.1%, 1%, 2%, 3%, 4% or 5% wt.), and/or alginate (e.g., at 5-20% wt., or 5%, 10%, 15%, or 20% wt.).

The flexible formulation can be made with 10% carrageenan, 10% wt. chitosan, 5% glycerol (hydrophilic plus hydrophobic), 5% calcium carbonate, 0.5% anhydride anhydride crosslinker (e.g., succinic anhydride), and 69.5% water. The flexible formulation can be made with 10% carrageenan, 10% wt. chitosan, 6% glycerol (hydrophilic plus hydrophobic), 6% calcium carbonate, 0.5% anhydride crosslinker (e.g., succinic anhydride), and 67.5% water. The flexible formulation can be made with 10% carrageenan, 10% wt. chitosan, 7% glycerol (hydrophilic plus hydrophobic), 7% calcium carbonate, 0.5% anhydride crosslinker (e.g., succinic anhydride), and 65.5% water. The flexible formulation can be made with 10% carrageenan, 10% wt. chitosan, 8% glycerol (hydrophilic plus hydrophobic), 8% calcium carbonate, 0.5% anhydride crosslinker (e.g., succinic anhydride), and 63.5% water. The flexible formulation can be made with 10% carrageenan, 10% wt. chitosan, 9% glycerol (hydrophilic plus hydrophobic), 9% calcium carbonate, 0.5% anhydride crosslinker (e.g., succinic anhydride), and 61.5% water. The flexible formulation can be made with 10% carrageenan, 10% wt. chitosan, 10% glycerol (hydrophilic plus hydrophobic), 10% calcium carbonate, 0.5% anhydride crosslinker (e.g., succinic anhydride), and 59.5% water. The flexible formulation can be made with 10% carrageenan, 10% wt. chitosan, 11% glycerol (hydrophilic plus hydrophobic), 11% calcium carbonate, 0.5% anhydride crosslinker (e.g., succinic anhydride), and 57.5% water. The flexible formulation can be made with 10% carrageenan, 10% wt. chitosan, 12% glycerol (hydrophilic plus hydrophobic), 12% calcium carbonate, 0.5% anhydride crosslinker (e.g., succinic anhydride), and 55.5% water. The flexible formulation can be made with 10% carrageenan, 10% wt. chitosan, 13% glycerol (hydrophilic plus hydrophobic), 13% calcium carbonate, 0.5% anhydride crosslinker (e.g., succinic anhydride), and 53.5% water. The flexible formulation can be made with 10% carrageenan, 10% wt. chitosan, 14% glycerol (hydrophilic plus hydrophobic), 14% calcium carbonate, 0.5% anhydride crosslinker (e.g., succinic anhydride), and 51.5% water. The flexible formulation can be made with 10% carrageenan, 10% wt. chitosan, 15% glycerol (hydrophilic plus hydrophobic), 15% calcium carbonate, 0.5% anhydride crosslinker (e.g., succinic anhydride), and 49.5% water. The flexible formulation can be made with 10% carrageenan, 10% wt. chitosan, 16% glycerol (hydrophilic plus hydrophobic), 16% calcium carbonate, 0.5% anhydride crosslinker (e.g., succinic anhydride), and 47.5% water. The flexible formulation can be made with 10% carrageenan, 10% wt. chitosan, 17% glycerol (hydrophilic plus hydrophobic), 17% calcium carbonate, 0.5% anhydride crosslinker (e.g., succinic anhydride), and 45.5% water. The flexible formulation can be made with 10% carrageenan, 10% wt. chitosan, 18% glycerol (hydrophilic plus hydrophobic), 18% calcium carbonate, 0.5% anhydride crosslinker (e.g., succinic anhydride), and 43.5% water. The flexible formulation can be made with 10% carrageenan, 10% wt. chitosan, 19% glycerol (hydrophilic plus hydrophobic), 19% calcium carbonate, 0.5% anhydride crosslinker (e.g., succinic anhydride), and 41.5% water. The flexible formulation can be made with 10% carrageenan, 10% wt. chitosan, 20% glycerol (hydrophilic plus hydrophobic), 20% calcium carbonate, 0.5% anhydride crosslinker (e.g., succinic anhydride), and 39.5% water.

The flexible formulation can be made with 11% carrageenan, 11% wt. chitosan, 5% glycerol (hydrophilic plus hydrophobic), 5% calcium carbonate, 0.5% anhydride crosslinker (e.g., succinic anhydride), and 67.5% water. The flexible formulation can be made with 11% carrageenan, 11% wt. chitosan, 6% glycerol (hydrophilic plus hydrophobic), 6% calcium carbonate, 0.5% anhydride crosslinker (e.g., succinic anhydride), and 65.5% water. The flexible formulation can be made with 11% carrageenan, 11% wt. chitosan, 7% glycerol (hydrophilic plus hydrophobic), 7% calcium carbonate, 0.5% anhydride crosslinker (e.g., succinic anhydride), and 63.5% water. The flexible formulation can be made with 11% carrageenan, 11% wt. chitosan, 8% glycerol (hydrophilic plus hydrophobic), 8% calcium carbonate, 0.5% anhydride crosslinker (e.g., succinic anhydride), and 61.5% water. The flexible formulation can be made with 11% carrageenan, 11% wt. chitosan, 9% glycerol (hydrophilic plus hydrophobic), 9% calcium carbonate, 0.5% anhydride crosslinker (e.g., succinic anhydride), and 59.5% water. The flexible formulation can be made with 11% carrageenan, 11% wt. chitosan, 10% glycerol (hydrophilic plus hydrophobic), 10% calcium carbonate, 0.5% anhydride crosslinker (e.g., succinic anhydride), and 57.5% water. The flexible formulation can be made with 11% carrageenan, 11% wt. chitosan, 11% glycerol (hydrophilic plus hydrophobic), 11% calcium carbonate, 0.5% anhydride crosslinker (e.g., succinic anhydride), and 55.5% water. The flexible formulation can be made with 11% carrageenan, 11% wt. chitosan, 12% glycerol (hydrophilic plus hydrophobic), 12% calcium carbonate, 0.5% anhydride crosslinker (e.g., succinic anhydride), and 53.5% water. The flexible formulation can be made with 11% carrageenan, 11% wt. chitosan, 13% glycerol (hydrophilic plus hydrophobic), 13% calcium carbonate, 0.5% anhydride crosslinker (e.g., succinic anhydride), and 51.5% water. The flexible formulation can be made with 11% carrageenan, 11% wt. chitosan, 14% glycerol (hydrophilic plus hydrophobic), 14% calcium carbonate, 0.5% anhydride crosslinker (e.g., succinic anhydride), and 49.5% water. The flexible formulation can be made with 11% carrageenan, 11% wt. chitosan, 15% glycerol (hydrophilic plus hydrophobic), 15% calcium carbonate, 0.5% anhydride crosslinker (e.g., succinic anhydride), and 47.5% water. The flexible formulation can be made with 11% carrageenan, 11% wt. chitosan, 16% glycerol (hydrophilic plus hydrophobic), 16% calcium carbonate, 0.5% anhydride crosslinker (e.g., succinic anhydride), and 45.5% water. The flexible formulation can be made with 11% carrageenan, 11% wt. chitosan, 17% glycerol (hydrophilic plus hydrophobic), 17% calcium carbonate, 0.5% anhydride crosslinker (e.g., succinic anhydride), and 43.5% water. The flexible formulation can be made with 11% carrageenan, 11% wt. chitosan, 18% glycerol (hydrophilic plus hydrophobic), 18% calcium carbonate, 0.5% anhydride crosslinker (e.g., succinic anhydride), and 41.5% water. The flexible formulation can be made with 11% carrageenan, 11% wt. chitosan, 19% glycerol (hydrophilic plus hydrophobic), 19% calcium carbonate, 0.5% anhydride crosslinker (e.g., succinic anhydride), and 39.5% water. The flexible formulation can be made with 11% carrageenan, 11% wt. chitosan, 20% glycerol (hydrophilic plus hydrophobic), 20% calcium carbonate, 0.5% anhydride crosslinker (e.g., succinic anhydride), and 37.5% water.

The flexible formulation can be made with 12% carrageenan, 12% wt. chitosan, 5% glycerol (hydrophilic plus hydrophobic), 5% calcium carbonate, 0.5% anhydride crosslinker (e.g., succinic anhydride), and 65.5% water. The flexible formulation can be made with 12% carrageenan, 12% wt. chitosan, 6% glycerol (hydrophilic plus hydrophobic), 6% calcium carbonate, 0.5% anhydride crosslinker (e.g., succinic anhydride), and 63.5% water. The flexible formulation can be made with 12% carrageenan, 12% wt. chitosan, 7% glycerol (hydrophilic plus hydrophobic), 7% calcium carbonate, 0.5% anhydride crosslinker (e.g., succinic anhydride), and 61.5% water. The flexible formulation can be made with 12% carrageenan, 12% wt. chitosan, 8% glycerol (hydrophilic plus hydrophobic), 8% calcium carbonate, 0.5% anhydride crosslinker (e.g., succinic anhydride), and 59.5% water. The flexible formulation can be made with 12% carrageenan, 12% wt. chitosan, 9% glycerol (hydrophilic plus hydrophobic), 9% calcium carbonate, 0.5% anhydride crosslinker (e.g., succinic anhydride), and 57.5% water. The flexible formulation can be made with 12% carrageenan, 12% wt. chitosan, 10% glycerol (hydrophilic plus hydrophobic), 10% calcium carbonate, 0.5% anhydride crosslinker (e.g., succinic anhydride), and 55.5% water. The flexible formulation can be made with 12% carrageenan, 12% wt. chitosan, 11% glycerol (hydrophilic plus hydrophobic), 11% calcium carbonate, 0.5% anhydride crosslinker (e.g., succinic anhydride), and 53.5% water. The flexible formulation can be made with 12% carrageenan, 12% wt. chitosan, 12% glycerol (hydrophilic plus hydrophobic), 12% calcium carbonate, 0.5% anhydride crosslinker (e.g., succinic anhydride), and 51.5% water. The flexible formulation can be made with 12% carrageenan, 12% wt. chitosan, 13% glycerol (hydrophilic plus hydrophobic), 13% calcium carbonate, 0.5% anhydride crosslinker (e.g., succinic anhydride), and 49.5% water. The flexible formulation can be made with 12% carrageenan, 12% wt. chitosan, 14% glycerol (hydrophilic plus hydrophobic), 14% calcium carbonate, 0.5% anhydride crosslinker (e.g., succinic anhydride), and 47.5% water. The flexible formulation can be made with 12% carrageenan, 12% wt. chitosan, 15% glycerol (hydrophilic plus hydrophobic), 15% calcium carbonate, 0.5% anhydride crosslinker (e.g., succinic anhydride), and 45.5% water. The flexible formulation can be made with 12% carrageenan, 12% wt. chitosan, 16% glycerol (hydrophilic plus hydrophobic), 16% calcium carbonate, 0.5% anhydride crosslinker (e.g., succinic anhydride), and 43.5% water. The flexible formulation can be made with 12% carrageenan, 12% wt. chitosan, 17% glycerol (hydrophilic plus hydrophobic), 17% calcium carbonate, 0.5% anhydride crosslinker (e.g., succinic anhydride), and 41.5% water. The flexible formulation can be made with 12% carrageenan, 12% wt. chitosan, 18% glycerol (hydrophilic plus hydrophobic), 18% calcium carbonate, 0.5% anhydride crosslinker (e.g., succinic anhydride), and 39.5% water. The flexible formulation can be made with 12% carrageenan, 12% wt. chitosan, 19% glycerol (hydrophilic plus hydrophobic), 19% calcium carbonate, 0.5% anhydride crosslinker (e.g., succinic anhydride), and 37.5% water. The flexible formulation can be made with 12% carrageenan, 12% wt. chitosan, 20% glycerol (hydrophilic plus hydrophobic), 20% calcium carbonate, 0.5% anhydride crosslinker (e.g., succinic anhydride), and 35.5% water.

The flexible formulation can be made with 13% carrageenan, 13% wt. chitosan, 5% glycerol (hydrophilic plus hydrophobic), 5% calcium carbonate, 0.5% anhydride crosslinker (e.g., succinic anhydride), and 63.5% water. The flexible formulation can be made with 13% carrageenan, 13% wt. chitosan, 6% glycerol (hydrophilic plus hydrophobic), 6% calcium carbonate, 0.5% anhydride crosslinker (e.g., succinic anhydride), and 61.5% water. The flexible formulation can be made with 13% carrageenan, 13% wt. chitosan, 7% glycerol (hydrophilic plus hydrophobic), 7% calcium carbonate, 0.5% anhydride crosslinker (e.g., succinic anhydride), and 59.5% water. The flexible formulation can be made with 13% carrageenan, 13% wt. chitosan, 8% glycerol (hydrophilic plus hydrophobic), 8% calcium carbonate, 0.5% anhydride crosslinker (e.g., succinic anhydride), and 57.5% water. The flexible formulation can be made with 13% carrageenan, 13% wt. chitosan, 9% glycerol (hydrophilic plus hydrophobic), 9% calcium carbonate, 0.5% anhydride crosslinker (e.g., succinic anhydride), and 55.5% water. The flexible formulation can be made with 13% carrageenan, 13% wt. chitosan, 10% glycerol (hydrophilic plus hydrophobic), 10% calcium carbonate, 0.5% anhydride crosslinker (e.g., succinic anhydride), and 53.5% water. The flexible formulation can be made with 13% carrageenan, 13% wt. chitosan, 11% glycerol (hydrophilic plus hydrophobic), 11% calcium carbonate, 0.5% anhydride crosslinker (e.g., succinic anhydride), and 51.5% water. The flexible formulation can be made with 13% carrageenan, 13% wt. chitosan, 12% glycerol (hydrophilic plus hydrophobic), 12% calcium carbonate, 0.5% anhydride crosslinker (e.g., succinic anhydride), and 49.5% water. The flexible formulation can be made with 13% carrageenan, 13% wt. chitosan, 13% glycerol (hydrophilic plus hydrophobic), 13% calcium carbonate, 0.5% anhydride crosslinker (e.g., succinic anhydride), and 47.5% water. The flexible formulation can be made with 13% carrageenan, 13% wt. chitosan, 14% glycerol (hydrophilic plus hydrophobic), 14% calcium carbonate, 0.5% anhydride crosslinker (e.g., succinic anhydride), and 45.5% water. The flexible formulation can be made with 13% carrageenan, 13% wt. chitosan, 15% glycerol (hydrophilic plus hydrophobic), 15% calcium carbonate, 0.5% anhydride crosslinker (e.g., succinic anhydride), and 43.5% water. The flexible formulation can be made with 13% carrageenan, 13% wt. chitosan, 16% glycerol (hydrophilic plus hydrophobic), 16% calcium carbonate, 0.5% anhydride crosslinker (e.g., succinic anhydride), and 41.5% water. The flexible formulation can be made with 13% carrageenan, 13% wt. chitosan, 17% glycerol (hydrophilic plus hydrophobic), 17% calcium carbonate, 0.5% anhydride crosslinker (e.g., succinic anhydride), and 39.5% water. The flexible formulation can be made with 13% carrageenan, 13% wt. chitosan, 18% glycerol (hydrophilic plus hydrophobic), 18% calcium carbonate, 0.5% anhydride crosslinker (e.g., succinic anhydride), and 37.5% water. The flexible formulation can be made with 13% carrageenan, 13% wt. chitosan, 19% glycerol (hydrophilic plus hydrophobic), 19% calcium carbonate, 0.5% anhydride crosslinker (e.g., succinic anhydride), and 35.5% water. The flexible formulation can be made with 13% carrageenan, 13% wt. chitosan, 20% glycerol (hydrophilic plus hydrophobic), 20% calcium carbonate, 0.5% anhydride crosslinker (e.g., succinic anhydride), and 33.5% water.

The flexible formulation can be made with 14% carrageenan, 14% wt. chitosan, 5% glycerol (hydrophilic plus hydrophobic), 5% calcium carbonate, 0.5% anhydride crosslinker (e.g., succinic anhydride), and 61.5% water. The flexible formulation can be made with 14% carrageenan, 14% wt. chitosan, 6% glycerol (hydrophilic plus hydrophobic), 6% calcium carbonate, 0.5% anhydride crosslinker (e.g., succinic anhydride), and 59.5% water. The flexible formulation can be made with 14% carrageenan, 14% wt. chitosan, 7% glycerol (hydrophilic plus hydrophobic), 7% calcium carbonate, 0.5% anhydride crosslinker (e.g., succinic anhydride), and 57.5% water. The flexible formulation can be made with 14% carrageenan, 14% wt. chitosan, 8% glycerol (hydrophilic plus hydrophobic), 8% calcium carbonate, 0.5% anhydride crosslinker (e.g., succinic anhydride), and 55.5% water. The flexible formulation can be made with 14% carrageenan, 14% wt. chitosan, 9% glycerol (hydrophilic plus hydrophobic), 9% calcium carbonate, 0.5% anhydride crosslinker (e.g., succinic anhydride), and 53.5% water. The flexible formulation can be made with 14% carrageenan, 14% wt. chitosan, 10% glycerol (hydrophilic plus hydrophobic), 10% calcium carbonate, 0.5% anhydride crosslinker (e.g., succinic anhydride), and 51.5% water. The flexible formulation can be made with 14% carrageenan, 14% wt. chitosan, 11% glycerol (hydrophilic plus hydrophobic), 11% calcium carbonate, 0.5% anhydride crosslinker (e.g., succinic anhydride), and 49.5% water. The flexible formulation can be made with 14% carrageenan, 14% wt. chitosan, 12% glycerol (hydrophilic plus hydrophobic), 12% calcium carbonate, 0.5% anhydride crosslinker (e.g., succinic anhydride), and 47.5% water. The flexible formulation can be made with 14% carrageenan, 14% wt. chitosan, 13% glycerol (hydrophilic plus hydrophobic), 13% calcium carbonate, 0.5% anhydride crosslinker (e.g., succinic anhydride), and 45.5% water. The flexible formulation can be made with 14% carrageenan, 14% wt. chitosan, 14% glycerol (hydrophilic plus hydrophobic), 14% calcium carbonate, 0.5% anhydride crosslinker (e.g., succinic anhydride), and 43.5% water. The flexible formulation can be made with 14% carrageenan, 14% wt. chitosan, 15% glycerol (hydrophilic plus hydrophobic), 15% calcium carbonate, 0.5% anhydride crosslinker (e.g., succinic anhydride), and 41.5% water. The flexible formulation can be made with 14% carrageenan, 14% wt. chitosan, 16% glycerol (hydrophilic plus hydrophobic), 16% calcium carbonate, 0.5% anhydride crosslinker (e.g., succinic anhydride), and 39.5% water. The flexible formulation can be made with 14% carrageenan, 14% wt. chitosan, 17% glycerol (hydrophilic plus hydrophobic), 17% calcium carbonate, 0.5% anhydride crosslinker (e.g., succinic anhydride), and 37.5% water. The flexible formulation can be made with 14% carrageenan, 14% wt. chitosan, 18% glycerol (hydrophilic plus hydrophobic), 18% calcium carbonate, 0.5% anhydride crosslinker (e.g., succinic anhydride), and 35.5% water. The flexible formulation can be made with 14% carrageenan, 14% wt. chitosan, 19% glycerol (hydrophilic plus hydrophobic), 19% calcium carbonate, 0.5% anhydride crosslinker (e.g., succinic anhydride), and 33.5% water. The flexible formulation can be made with 14% carrageenan, 14% wt. chitosan, 20% glycerol (hydrophilic plus hydrophobic), 20% calcium carbonate, 0.5% anhydride crosslinker (e.g., succinic anhydride), and 31.5% water.

The flexible formulation can be made with 15% carrageenan, 15% wt. chitosan, 5% glycerol (hydrophilic plus hydrophobic), 5% calcium carbonate, 0.5% anhydride crosslinker (e.g., succinic anhydride), and 59.5% water. The flexible formulation can be made with 15% carrageenan, 15% wt. chitosan, 6% glycerol (hydrophilic plus hydrophobic), 6% calcium carbonate, 0.5% anhydride crosslinker (e.g., succinic anhydride), and 57.5% water. The flexible formulation can be made with 15% carrageenan, 15% wt. chitosan, 7% glycerol (hydrophilic plus hydrophobic), 7% calcium carbonate, 0.5% anhydride crosslinker (e.g., succinic anhydride), and 55.5% water. The flexible formulation can be made with 15% carrageenan, 15% wt. chitosan, 8% glycerol (hydrophilic plus hydrophobic), 8% calcium carbonate, 0.5% anhydride crosslinker (e.g., succinic anhydride), and 53.5% water. The flexible formulation can be made with 15% carrageenan, 15% wt. chitosan, 9% glycerol (hydrophilic plus hydrophobic), 9% calcium carbonate, 0.5% anhydride crosslinker (e.g., succinic anhydride), and 51.5% water. The flexible formulation can be made with 15% carrageenan, 15% wt. chitosan, 10% glycerol (hydrophilic plus hydrophobic), 10% calcium carbonate, 0.5% anhydride crosslinker (e.g., succinic anhydride), and 49.5% water. The flexible formulation can be made with 15% carrageenan, 15% wt. chitosan, 11% glycerol (hydrophilic plus hydrophobic), 11% calcium carbonate, 0.5% anhydride crosslinker (e.g., succinic anhydride), and 47.5% water. The flexible formulation can be made with 15% carrageenan, 15% wt. chitosan, 12% glycerol (hydrophilic plus hydrophobic), 12% calcium carbonate, 0.5% anhydride crosslinker (e.g., succinic anhydride), and 45.5% water. The flexible formulation can be made with 15% carrageenan, 15% wt. chitosan, 13% glycerol (hydrophilic plus hydrophobic), 13% calcium carbonate, 0.5% anhydride crosslinker (e.g., succinic anhydride), and 43.5% water. The flexible formulation can be made with 15% carrageenan, 15% wt. chitosan, 14% glycerol (hydrophilic plus hydrophobic), 14% calcium carbonate, 0.5% anhydride crosslinker (e.g., succinic anhydride), and 41.5% water. The flexible formulation can be made with 15% carrageenan, 15% wt. chitosan, 15% glycerol (hydrophilic plus hydrophobic), 15% calcium carbonate, 0.5% anhydride crosslinker (e.g., succinic anhydride), and 39.5% water. The flexible formulation can be made with 15% carrageenan, 15% wt. chitosan, 16% glycerol (hydrophilic plus hydrophobic), 16% calcium carbonate, 0.5% anhydride crosslinker (e.g., succinic anhydride), and 37.5% water. The flexible formulation can be made with 15% carrageenan, 15% wt. chitosan, 17% glycerol (hydrophilic plus hydrophobic), 17% calcium carbonate, 0.5% anhydride crosslinker (e.g., succinic anhydride), and 35.5% water. The flexible formulation can be made with 15% carrageenan, 15% wt. chitosan, 18% glycerol (hydrophilic plus hydrophobic), 18% calcium carbonate, 0.5% anhydride crosslinker (e.g., succinic anhydride), and 33.5% water. The flexible formulation can be made with 15% carrageenan, 15% wt. chitosan, 19% glycerol (hydrophilic plus hydrophobic), 19% calcium carbonate, 0.5% anhydride crosslinker (e.g., succinic anhydride), and 31.5% water. The flexible formulation can be made with 15% carrageenan, 15% wt. chitosan, 20% glycerol (hydrophilic plus hydrophobic), 20% calcium carbonate, 0.5% anhydride crosslinker (e.g., succinic anhydride), and 29.5% water.

The flexible formulation can be made with 16% carrageenan, 16% wt. chitosan, 5% glycerol (hydrophilic plus hydrophobic), 5% calcium carbonate, 0.5% anhydride crosslinker (e.g., succinic anhydride), and 59.5% water. The flexible formulation can be made with 16% carrageenan, 16% wt. chitosan, 6% glycerol (hydrophilic plus hydrophobic), 6% calcium carbonate, 0.5% anhydride crosslinker (e.g., succinic anhydride), and 55.5% water. The flexible formulation can be made with 16% carrageenan, 16% wt. chitosan, 7% glycerol (hydrophilic plus hydrophobic), 7% calcium carbonate, 0.5% anhydride crosslinker (e.g., succinic anhydride), and 53.5% water. The flexible formulation can be made with 16% carrageenan, 16% wt. chitosan, 8% glycerol (hydrophilic plus hydrophobic), 8% calcium carbonate, 0.5% anhydride crosslinker (e.g., succinic anhydride), and 51.5% water. The flexible formulation can be made with 16% carrageenan, 16% wt. chitosan, 9% glycerol (hydrophilic plus hydrophobic), 9% calcium carbonate, 0.5% anhydride crosslinker (e.g., succinic anhydride), and 49.5% water. The flexible formulation can be made with 16% carrageenan, 16% wt. chitosan, 10% glycerol (hydrophilic plus hydrophobic), 10% calcium carbonate, 0.5% anhydride crosslinker (e.g., succinic anhydride), and 47.5% water. The flexible formulation can be made with 16% carrageenan, 16% wt. chitosan, 11% glycerol (hydrophilic plus hydrophobic), 11% calcium carbonate, 0.5% anhydride crosslinker (e.g., succinic anhydride), and 45.5% water. The flexible formulation can be made with 16% carrageenan, 16% wt. chitosan, 12% glycerol (hydrophilic plus hydrophobic), 12% calcium carbonate, 0.5% anhydride crosslinker (e.g., succinic anhydride), and 43.5% water. The flexible formulation can be made with 16% carrageenan, 16% wt. chitosan, 13% glycerol (hydrophilic plus hydrophobic), 13% calcium carbonate, 0.5% anhydride crosslinker (e.g., succinic anhydride), and 41.5% water. The flexible formulation can be made with 16% carrageenan, 16% wt. chitosan, 14% glycerol (hydrophilic plus hydrophobic), 14% calcium carbonate, 0.5% anhydride crosslinker (e.g., succinic anhydride), and 39.5% water. The flexible formulation can be made with 16% carrageenan, 16% wt. chitosan, 15% glycerol (hydrophilic plus hydrophobic), 15% calcium carbonate, 0.5% anhydride crosslinker (e.g., succinic anhydride), and 37.5% water. The flexible formulation can be made with 16% carrageenan, 16% wt. chitosan, 16% glycerol (hydrophilic plus hydrophobic), 16% calcium carbonate, 0.5% anhydride crosslinker (e.g., succinic anhydride), and 35.5% water. The flexible formulation can be made with 16% carrageenan, 16% wt. chitosan, 17% glycerol (hydrophilic plus hydrophobic), 17% calcium carbonate, 0.5% anhydride crosslinker (e.g., succinic anhydride), and 33.5% water. The flexible formulation can be made with 16% carrageenan, 16% wt. chitosan, 18% glycerol (hydrophilic plus hydrophobic), 18% calcium carbonate, 0.5% anhydride crosslinker (e.g., succinic anhydride), and 31.5% water. The flexible formulation can be made with 16% carrageenan, 16% wt. chitosan, 19% glycerol (hydrophilic plus hydrophobic), 19% calcium carbonate, 0.5% anhydride crosslinker (e.g., succinic anhydride), and 29.5% water. The flexible formulation can be made with 16% carrageenan, 16% wt. chitosan, 20% glycerol (hydrophilic plus hydrophobic), 20% calcium carbonate, 0.5% anhydride crosslinker (e.g., succinic anhydride), and 27.5% water.

The flexible formulation can be made with 17% carrageenan, 17% wt. chitosan, 5% glycerol (hydrophilic plus hydrophobic), 5% calcium carbonate, 0.5% anhydride crosslinker (e.g., succinic anhydride), and 55.5% water. The flexible formulation can be made with 17% carrageenan, 17% wt. chitosan, 6% glycerol (hydrophilic plus hydrophobic), 6% calcium carbonate, 0.5% anhydride crosslinker (e.g., succinic anhydride), and 53.5% water. The flexible formulation can be made with 17% carrageenan, 17% wt. chitosan, 7% glycerol (hydrophilic plus hydrophobic), 7% calcium carbonate, 0.5% anhydride crosslinker (e.g., succinic anhydride), and 51.5% water. The flexible formulation can be made with 17% carrageenan, 17% wt. chitosan, 8% glycerol (hydrophilic plus hydrophobic), 8% calcium carbonate, 0.5% anhydride crosslinker (e.g., succinic anhydride), and 49.5% water. The flexible formulation can be made with 17% carrageenan, 17% wt. chitosan, 9% glycerol (hydrophilic plus hydrophobic), 9% calcium carbonate, 0.5% anhydride crosslinker (e.g., succinic anhydride), and 47.5% water. The flexible formulation can be made with 17% carrageenan, 17% wt. chitosan, 10% glycerol (hydrophilic plus hydrophobic), 10% calcium carbonate, 0.5% anhydride crosslinker (e.g., succinic anhydride), and 45.5% water. The flexible formulation can be made with 17% carrageenan, 17% wt. chitosan, 11% glycerol (hydrophilic plus hydrophobic), 11% calcium carbonate, 0.5% anhydride crosslinker (e.g., succinic anhydride), and 43.5% water. The flexible formulation can be made with 17% carrageenan, 17% wt. chitosan, 12% glycerol (hydrophilic plus hydrophobic), 12% calcium carbonate, 0.5% anhydride crosslinker (e.g., succinic anhydride), and 41.5% water. The flexible formulation can be made with 17% carrageenan, 17% wt. chitosan, 13% glycerol (hydrophilic plus hydrophobic), 13% calcium carbonate, 0.5% anhydride crosslinker (e.g., succinic anhydride), and 39.5% water. The flexible formulation can be made with 17% carrageenan, 17% wt. chitosan, 14% glycerol (hydrophilic plus hydrophobic), 14% calcium carbonate, 0.5% anhydride crosslinker (e.g., succinic anhydride), and 37.5% water. The flexible formulation can be made with 17% carrageenan, 17% wt. chitosan, 15% glycerol (hydrophilic plus hydrophobic), 15% calcium carbonate, 0.5% anhydride crosslinker (e.g., succinic anhydride), and 35.5% water. The flexible formulation can be made with 17% carrageenan, 17% wt. chitosan, 16% glycerol (hydrophilic plus hydrophobic), 16% calcium carbonate, 0.5% anhydride crosslinker (e.g., succinic anhydride), and 33.5% water. The flexible formulation can be made with 17% carrageenan, 17% wt. chitosan, 17% glycerol (hydrophilic plus hydrophobic), 17% calcium carbonate, 0.5% anhydride crosslinker (e.g., succinic anhydride), and 31.5% water. The flexible formulation can be made with 17% carrageenan, 17% wt. chitosan, 18% glycerol (hydrophilic plus hydrophobic), 18% calcium carbonate, 0.5% anhydride crosslinker (e.g., succinic anhydride), and 29.5% water. The flexible formulation can be made with 17% carrageenan, 17% wt. chitosan, 19% glycerol (hydrophilic plus hydrophobic), 19% calcium carbonate, 0.5% anhydride crosslinker (e.g., succinic anhydride), and 27.5% water. The flexible formulation can be made with 17% carrageenan, 17% wt. chitosan, 20% glycerol (hydrophilic plus hydrophobic), 20% calcium carbonate, 0.5% anhydride crosslinker (e.g., succinic anhydride), and 25.5% water.

The flexible formulation can be made with 18% carrageenan, 18% wt. chitosan, 5% glycerol (hydrophilic plus hydrophobic), 5% calcium carbonate, 0.5% anhydride crosslinker (e.g., succinic anhydride), and 53.5% water. The flexible formulation can be made with 18% carrageenan, 18% wt. chitosan, 6% glycerol (hydrophilic plus hydrophobic), 6% calcium carbonate, 0.5% anhydride crosslinker (e.g., succinic anhydride), and 51.5% water. The flexible formulation can be made with 18% carrageenan, 18% wt. chitosan, 7% glycerol (hydrophilic plus hydrophobic), 7% calcium carbonate, 0.5% anhydride crosslinker (e.g., succinic anhydride), and 49.5% water. The flexible formulation can be made with 18% carrageenan, 18% wt. chitosan, 8% glycerol (hydrophilic plus hydrophobic), 8% calcium carbonate, 0.5% anhydride crosslinker (e.g., succinic anhydride), and 47.5% water. The flexible formulation can be made with 18% carrageenan, 18% wt. chitosan, 9% glycerol (hydrophilic plus hydrophobic), 9% calcium carbonate, 0.5% anhydride crosslinker (e.g., succinic anhydride), and 45.5% water. The flexible formulation can be made with 18% carrageenan, 18% wt. chitosan, 10% glycerol (hydrophilic plus hydrophobic), 10% calcium carbonate, 0.5% anhydride crosslinker (e.g., succinic anhydride), and 43.5% water. The flexible formulation can be made with 18% carrageenan, 18% wt. chitosan, 11% glycerol (hydrophilic plus hydrophobic), 11% calcium carbonate, 0.5% anhydride crosslinker (e.g., succinic anhydride), and 41.5% water. The flexible formulation can be made with 18% carrageenan, 18% wt. chitosan, 12% glycerol (hydrophilic plus hydrophobic), 12% calcium carbonate, 0.5% anhydride crosslinker (e.g., succinic anhydride), and 39.5% water. The flexible formulation can be made with 18% carrageenan, 18% wt. chitosan, 13% glycerol (hydrophilic plus hydrophobic), 13% calcium carbonate, 0.5% anhydride crosslinker (e.g., succinic anhydride), and 37.5% water. The flexible formulation can be made with 18% carrageenan, 18% wt. chitosan, 14% glycerol (hydrophilic plus hydrophobic), 14% calcium carbonate, 0.5% anhydride crosslinker (e.g., succinic anhydride), and 35.5% water. The flexible formulation can be made with 18% carrageenan, 18% wt. chitosan, 15% glycerol (hydrophilic plus hydrophobic), 15% calcium carbonate, 0.5% anhydride crosslinker (e.g., succinic anhydride), and 33.5% water. The flexible formulation can be made with 18% carrageenan, 18% wt. chitosan, 16% glycerol (hydrophilic plus hydrophobic), 16% calcium carbonate, 0.5% anhydride crosslinker (e.g., succinic anhydride), and 31.5% water. The flexible formulation can be made with 18% carrageenan, 18% wt. chitosan, 17% glycerol (hydrophilic plus hydrophobic), 17% calcium carbonate, 0.5% anhydride crosslinker (e.g., succinic anhydride), and 29.5% water. The flexible formulation can be made with 18% carrageenan, 18% wt. chitosan, 18% glycerol (hydrophilic plus hydrophobic), 18% calcium carbonate, 0.5% anhydride crosslinker (e.g., succinic anhydride), and 27.5% water. The flexible formulation can be made with 18% carrageenan, 18% wt. chitosan, 19% glycerol (hydrophilic plus hydrophobic), 19% calcium carbonate, 0.5% anhydride crosslinker (e.g., succinic anhydride), and 25.5% water. The flexible formulation can be made with 18% carrageenan, 18% wt. chitosan, 20% glycerol (hydrophilic plus hydrophobic), 20% calcium carbonate, 0.5% anhydride crosslinker (e.g., succinic anhydride), and 23.5% water.

The flexible formulation can be made with 19% carrageenan, 19% wt. chitosan, 5% glycerol (hydrophilic plus hydrophobic), 5% calcium carbonate, 0.5% crosslinker, and 51.5% water. The flexible formulation can be made with 19% carrageenan, 19% wt. chitosan, 6% glycerol (hydrophilic plus hydrophobic), 6% calcium carbonate, 0.5% anhydride crosslinker (e.g., succinic anhydride), and 49.5% water. The flexible formulation can be made with 19% carrageenan, 19% wt. chitosan, 7% glycerol (hydrophilic plus hydrophobic), 7% calcium carbonate, 0.5% anhydride crosslinker (e.g., succinic anhydride), and 47.5% water. The flexible formulation can be made with 19% carrageenan, 19% wt. chitosan, 8% glycerol (hydrophilic plus hydrophobic), 8% calcium carbonate, 0.5% anhydride crosslinker (e.g., succinic anhydride), and 45.5% water. The flexible formulation can be made with 19% carrageenan, 19% wt. chitosan, 9% glycerol (hydrophilic plus hydrophobic), 9% calcium carbonate, 0.5% anhydride crosslinker (e.g., succinic anhydride), and 43.5% water. The flexible formulation can be made with 19% carrageenan, 19% wt. chitosan, 10% glycerol (hydrophilic plus hydrophobic), 10% calcium carbonate, 0.5% anhydride crosslinker (e.g., succinic anhydride), and 41.5% water. The flexible formulation can be made with 19% carrageenan, 19% wt. chitosan, 11% glycerol (hydrophilic plus hydrophobic), 11% calcium carbonate, 0.5% anhydride crosslinker (e.g., succinic anhydride), and 39.5% water. The flexible formulation can be made with 19% carrageenan, 19% wt. chitosan, 12% glycerol (hydrophilic plus hydrophobic), 12% calcium carbonate, 0.5% anhydride crosslinker (e.g., succinic anhydride), and 37.5% water. The flexible formulation can be made with 19% carrageenan, 19% wt. chitosan, 13% glycerol (hydrophilic plus hydrophobic), 13% calcium carbonate, 0.5% anhydride crosslinker (e.g., succinic anhydride), and 35.5% water. The flexible formulation can be made with 19% carrageenan, 19% wt. chitosan, 14% glycerol (hydrophilic plus hydrophobic), 14% calcium carbonate, 0.5% anhydride crosslinker (e.g., succinic anhydride), and 33.5% water. The flexible formulation can be made with 19% carrageenan, 19% wt. chitosan, 15% glycerol (hydrophilic plus hydrophobic), 15% calcium carbonate, 0.5% anhydride crosslinker (e.g., succinic anhydride), and 31.5% water. The flexible formulation can be made with 19% carrageenan, 19% wt. chitosan, 16% glycerol (hydrophilic plus hydrophobic), 16% calcium carbonate, 0.5% anhydride crosslinker (e.g., succinic anhydride), and 29.5% water. The flexible formulation can be made with 19% carrageenan, 19% wt. chitosan, 17% glycerol (hydrophilic plus hydrophobic), 17% calcium carbonate, 0.5% anhydride crosslinker (e.g., succinic anhydride), and 27.5% water. The flexible formulation can be made with 19% carrageenan, 19% wt. chitosan, 18% glycerol (hydrophilic plus hydrophobic), 18% calcium carbonate, 0.5% anhydride crosslinker (e.g., succinic anhydride), and 25.5% water. The flexible formulation can be made with 19% carrageenan, 19% wt. chitosan, 19% glycerol (hydrophilic plus hydrophobic), 19% calcium carbonate, 0.5% anhydride crosslinker (e.g., succinic anhydride), and 23.5% water. The flexible formulation can be made with 19% carrageenan, 19% wt. chitosan, 20% glycerol (hydrophilic plus hydrophobic), 20% calcium carbonate, 0.5% anhydride crosslinker (e.g., succinic anhydride), and 21.5% water.

The flexible formulation can be made with 20% carrageenan, 20% wt. chitosan, 5% glycerol (hydrophilic plus hydrophobic), 5% calcium carbonate, 0.5% anhydride crosslinker (e.g., succinic anhydride), and 49.5% water. The flexible formulation can be made with 20% carrageenan, 20% wt. chitosan, 6% glycerol (hydrophilic plus hydrophobic), 6% calcium carbonate, 0.5% anhydride crosslinker (e.g., succinic anhydride), and 47.5% water. The flexible formulation can be made with 20% carrageenan, 20% wt. chitosan, 7% glycerol (hydrophilic plus hydrophobic), 7% calcium carbonate, 0.5% anhydride crosslinker (e.g., succinic anhydride), and 45.5% water. The flexible formulation can be made with 20% carrageenan, 20% wt. chitosan, 8% glycerol (hydrophilic plus hydrophobic), 8% calcium carbonate, 0.5% anhydride crosslinker (e.g., succinic anhydride), and 43.5% water. The flexible formulation can be made with 20% carrageenan, 20% wt. chitosan, 9% glycerol (hydrophilic plus hydrophobic), 9% calcium carbonate, 0.5% anhydride crosslinker (e.g., succinic anhydride), and 41.5% water. The flexible formulation can be made with 20% carrageenan, 20% wt. chitosan, 10% glycerol (hydrophilic plus hydrophobic), 10% calcium carbonate, 0.5% anhydride crosslinker (e.g., succinic anhydride), and 39.5% water. The flexible formulation can be made with 20% carrageenan, 20% wt. chitosan, 11% glycerol (hydrophilic plus hydrophobic), 11% calcium carbonate, 0.5% anhydride crosslinker (e.g., succinic anhydride), and 37.5% water. The flexible formulation can be made with 20% carrageenan, 20% wt. chitosan, 12% glycerol (hydrophilic plus hydrophobic), 12% calcium carbonate, 0.5% anhydride crosslinker (e.g., succinic anhydride), and 35.5% water. The flexible formulation can be made with 20% carrageenan, 20% wt. chitosan, 13% glycerol (hydrophilic plus hydrophobic), 13% calcium carbonate, 0.5% anhydride crosslinker (e.g., succinic anhydride), and 33.5% water. The flexible formulation can be made with 20% carrageenan, 20% wt. chitosan, 14% glycerol (hydrophilic plus hydrophobic), 14% calcium carbonate, 0.5% anhydride crosslinker (e.g., succinic anhydride), and 31.5% water. The flexible formulation can be made with 20% carrageenan, 20% wt. chitosan, 15% glycerol (hydrophilic plus hydrophobic), 15% calcium carbonate, 0.5% anhydride crosslinker (e.g., succinic anhydride), and 29.5% water. The flexible formulation can be made with 20% carrageenan, 20% wt. chitosan, 16% glycerol (hydrophilic plus hydrophobic), 16% calcium carbonate, 0.5% anhydride crosslinker (e.g., succinic anhydride), and 27.5% water. The flexible formulation can be made with 20% carrageenan, 20% wt. chitosan, 17% glycerol (hydrophilic plus hydrophobic), 17% calcium carbonate, 0.5% anhydride crosslinker (e.g., succinic anhydride), and 25.5% water. The flexible formulation can be made with 20% carrageenan, 20% wt. chitosan, 18% glycerol (hydrophilic plus hydrophobic), 18% calcium carbonate, 0.5% anhydride crosslinker (e.g., succinic anhydride), and 23.5% water. The flexible formulation can be made with 20% carrageenan, 20% wt. chitosan, 19% glycerol (hydrophilic plus hydrophobic), 19% calcium carbonate, 0.5% anhydride crosslinker (e.g., succinic anhydride), and 21.5% water. The flexible formulation can be made with 20% carrageenan, 20% wt. chitosan, 20% glycerol (hydrophilic plus hydrophobic), 20% calcium carbonate, 0.5% anhydride crosslinker (e.g., succinic anhydride), and 19.5% water.

The flexible formulation can be made with 10% carrageenan, 10% wt. chitosan, 5% glycerol (hydrophilic plus hydrophobic), 5% calcium carbonate, 1% anhydride crosslinker (e.g., succinic anhydride), and 69% water. The flexible formulation can be made with 10% carrageenan, 10% wt. chitosan, 6% glycerol (hydrophilic plus hydrophobic), 6% calcium carbonate, 1% anhydride crosslinker (e.g., succinic anhydride), and 67% water. The flexible formulation can be made with 10% carrageenan, 10% wt. chitosan, 7% glycerol (hydrophilic plus hydrophobic), 7% calcium carbonate, 1% anhydride crosslinker (e.g., succinic anhydride), and 65% water. The flexible formulation can be made with 10% carrageenan, 10% wt. chitosan, 8% glycerol (hydrophilic plus hydrophobic), 8% calcium carbonate, 1% anhydride crosslinker (e.g., succinic anhydride), and 63% water. The flexible formulation can be made with 10% carrageenan, 10% wt. chitosan, 9% glycerol (hydrophilic plus hydrophobic), 9% calcium carbonate, 1% anhydride crosslinker (e.g., succinic anhydride), and 61% water. The flexible formulation can be made with 10% carrageenan, 10% wt. chitosan, 10% glycerol (hydrophilic plus hydrophobic), 10% calcium carbonate, 1% anhydride crosslinker (e.g., succinic anhydride), and 59% water. The flexible formulation can be made with 10% carrageenan, 10% wt. chitosan, 11% glycerol (hydrophilic plus hydrophobic), 11% calcium carbonate, 1% anhydride crosslinker (e.g., succinic anhydride), and 57% water. The flexible formulation can be made with 10% carrageenan, 10% wt. chitosan, 12% glycerol (hydrophilic plus hydrophobic), 12% calcium carbonate, 1% anhydride crosslinker (e.g., succinic anhydride), and 55% water. The flexible formulation can be made with 10% carrageenan, 10% wt. chitosan, 13% glycerol (hydrophilic plus hydrophobic), 13% calcium carbonate, 1% anhydride crosslinker (e.g., succinic anhydride), and 53% water. The flexible formulation can be made with 10% carrageenan, 10% wt. chitosan, 14% glycerol (hydrophilic plus hydrophobic), 14% calcium carbonate, 1% anhydride crosslinker (e.g., succinic anhydride), and 51% water. The flexible formulation can be made with 10% carrageenan, 10% wt. chitosan, 15% glycerol (hydrophilic plus hydrophobic), 15% calcium carbonate, 1% anhydride crosslinker (e.g., succinic anhydride), and 49% water. The flexible formulation can be made with 10% carrageenan, 10% wt. chitosan, 16% glycerol (hydrophilic plus hydrophobic), 16% calcium carbonate, 1% anhydride crosslinker (e.g., succinic anhydride), and 47% water. The flexible formulation can be made with 10% carrageenan, 10% wt. chitosan, 17% glycerol (hydrophilic plus hydrophobic), 17% calcium carbonate, 1% anhydride crosslinker (e.g., succinic anhydride), and 45% water. The flexible formulation can be made with 10% carrageenan, 10% wt. chitosan, 18% glycerol (hydrophilic plus hydrophobic), 18% calcium carbonate, 1% anhydride crosslinker (e.g., succinic anhydride), and 43% water. The flexible formulation can be made with 10% carrageenan, 10% wt. chitosan, 19% glycerol (hydrophilic plus hydrophobic), 19% calcium carbonate, 1% anhydride crosslinker (e.g., succinic anhydride), and 41% water. The flexible formulation can be made with 10% carrageenan, 10% wt. chitosan, 20% glycerol (hydrophilic plus hydrophobic), 20% calcium carbonate, 1% anhydride crosslinker (e.g., succinic anhydride), and 39% water.

The flexible formulation can be made with 11% carrageenan, 11% wt. chitosan, 5% glycerol (hydrophilic plus hydrophobic), 5% calcium carbonate, 1% anhydride crosslinker (e.g., succinic anhydride), and 67% water. The flexible formulation can be made with 11% carrageenan, 11% wt. chitosan, 6% glycerol (hydrophilic plus hydrophobic), 6% calcium carbonate, 1% anhydride crosslinker (e.g., succinic anhydride), and 65% water. The flexible formulation can be made with 11% carrageenan, 11% wt. chitosan, 7% glycerol (hydrophilic plus hydrophobic), 7% calcium carbonate, 1% anhydride crosslinker (e.g., succinic anhydride), and 63% water. The flexible formulation can be made with 11% carrageenan, 11% wt. chitosan, 8% glycerol (hydrophilic plus hydrophobic), 8% calcium carbonate, 1% anhydride crosslinker (e.g., succinic anhydride), and 61% water. The flexible formulation can be made with 11% carrageenan, 11% wt. chitosan, 9% glycerol (hydrophilic plus hydrophobic), 9% calcium carbonate, 1% anhydride crosslinker (e.g., succinic anhydride), and 59% water. The flexible formulation can be made with 11% carrageenan, 11% wt. chitosan, 10% glycerol (hydrophilic plus hydrophobic), 10% calcium carbonate, 1% anhydride crosslinker (e.g., succinic anhydride), and 57% water. The flexible formulation can be made with 11% carrageenan, 11% wt. chitosan, 11% glycerol (hydrophilic plus hydrophobic), 11% calcium carbonate, 1% anhydride crosslinker (e.g., succinic anhydride), and 55% water. The flexible formulation can be made with 11% carrageenan, 11% wt. chitosan, 12% glycerol (hydrophilic plus hydrophobic), 12% calcium carbonate, 1% anhydride crosslinker (e.g., succinic anhydride), and 53% water. The flexible formulation can be made with 11% carrageenan, 11% wt. chitosan, 13% glycerol (hydrophilic plus hydrophobic), 13% calcium carbonate, 1% anhydride crosslinker (e.g., succinic anhydride), and 51% water. The flexible formulation can be made with 11% carrageenan, 11% wt. chitosan, 14% glycerol (hydrophilic plus hydrophobic), 14% calcium carbonate, 1% anhydride crosslinker (e.g., succinic anhydride), and 49% water. The flexible formulation can be made with 11% carrageenan, 11% wt. chitosan, 15% glycerol (hydrophilic plus hydrophobic), 15% calcium carbonate, 1% anhydride crosslinker (e.g., succinic anhydride), and 47% water. The flexible formulation can be made with 11% carrageenan, 11% wt. chitosan, 16% glycerol (hydrophilic plus hydrophobic), 16% calcium carbonate, 1% anhydride crosslinker (e.g., succinic anhydride), and 45% water. The flexible formulation can be made with 11% carrageenan, 11% wt. chitosan, 17% glycerol (hydrophilic plus hydrophobic), 17% calcium carbonate, 1% anhydride crosslinker (e.g., succinic anhydride), and 43% water. The flexible formulation can be made with 11% carrageenan, 11% wt. chitosan, 18% glycerol (hydrophilic plus hydrophobic), 18% calcium carbonate, 1% anhydride crosslinker (e.g., succinic anhydride), and 41% water. The flexible formulation can be made with 11% carrageenan, 11% wt. chitosan, 19% glycerol (hydrophilic plus hydrophobic), 19% calcium carbonate, 1% anhydride crosslinker (e.g., succinic anhydride), and 39% water. The flexible formulation can be made with 11% carrageenan, 11% wt. chitosan, 20% glycerol (hydrophilic plus hydrophobic), 20% calcium carbonate, 1% anhydride crosslinker (e.g., succinic anhydride), and 37% water.

The flexible formulation can be made with 12% carrageenan, 12% wt. chitosan, 5% glycerol (hydrophilic plus hydrophobic), 5% calcium carbonate, 1% anhydride crosslinker (e.g., succinic anhydride), and 65% water. The flexible formulation can be made with 12% carrageenan, 12% wt. chitosan, 6% glycerol (hydrophilic plus hydrophobic), 6% calcium carbonate, 1% anhydride crosslinker (e.g., succinic anhydride), and 63% water. The flexible formulation can be made with 12% carrageenan, 12% wt. chitosan, 7% glycerol (hydrophilic plus hydrophobic), 7% calcium carbonate, 1% anhydride crosslinker (e.g., succinic anhydride), and 61% water. The flexible formulation can be made with 12% carrageenan, 12% wt. chitosan, 8% glycerol (hydrophilic plus hydrophobic), 8% calcium carbonate, 1% anhydride crosslinker (e.g., succinic anhydride), and 59% water. The flexible formulation can be made with 12% carrageenan, 12% wt. chitosan, 9% glycerol (hydrophilic plus hydrophobic), 9% calcium carbonate, 1% anhydride crosslinker (e.g., succinic anhydride), and 57% water. The flexible formulation can be made with 12% carrageenan, 12% wt. chitosan, 10% glycerol (hydrophilic plus hydrophobic), 10% calcium carbonate, 1% anhydride crosslinker (e.g., succinic anhydride), and 55% water. The flexible formulation can be made with 12% carrageenan, 12% wt. chitosan, 11% glycerol (hydrophilic plus hydrophobic), 11% calcium carbonate, 1% anhydride crosslinker (e.g., succinic anhydride), and 53% water. The flexible formulation can be made with 12% carrageenan, 12% wt. chitosan, 12% glycerol (hydrophilic plus hydrophobic), 12% calcium carbonate, 1% anhydride crosslinker (e.g., succinic anhydride), and 51% water. The flexible formulation can be made with 12% carrageenan, 12% wt. chitosan, 13% glycerol (hydrophilic plus hydrophobic), 13% calcium carbonate, 1% anhydride crosslinker (e.g., succinic anhydride), and 49% water. The flexible formulation can be made with 12% carrageenan, 12% wt. chitosan, 14% glycerol (hydrophilic plus hydrophobic), 14% calcium carbonate, 1% anhydride crosslinker (e.g., succinic anhydride), and 47% water. The flexible formulation can be made with 12% carrageenan, 12% wt. chitosan, 15% glycerol (hydrophilic plus hydrophobic), 15% calcium carbonate, 1% anhydride crosslinker (e.g., succinic anhydride), and 45% water. The flexible formulation can be made with 12% carrageenan, 12% wt. chitosan, 16% glycerol (hydrophilic plus hydrophobic), 16% calcium carbonate, 1% anhydride crosslinker (e.g., succinic anhydride), and 43% water. The flexible formulation can be made with 12% carrageenan, 12% wt. chitosan, 17% glycerol (hydrophilic plus hydrophobic), 17% calcium carbonate, 1% anhydride crosslinker (e.g., succinic anhydride), and 41% water. The flexible formulation can be made with 12% carrageenan, 12% wt. chitosan, 18% glycerol (hydrophilic plus hydrophobic), 18% calcium carbonate, 1% anhydride crosslinker (e.g., succinic anhydride), and 39% water. The flexible formulation can be made with 12% carrageenan, 12% wt. chitosan, 19% glycerol (hydrophilic plus hydrophobic), 19% calcium carbonate, 1% anhydride crosslinker (e.g., succinic anhydride), and 37% water. The flexible formulation can be made with 12% carrageenan, 12% wt. chitosan, 20% glycerol (hydrophilic plus hydrophobic), 20% calcium carbonate, 1% anhydride crosslinker (e.g., succinic anhydride), and 35% water.

The flexible formulation can be made with 13% carrageenan, 13% wt. chitosan, 5% glycerol (hydrophilic plus hydrophobic), 5% calcium carbonate, 1% anhydride crosslinker (e.g., succinic anhydride), and 63% water. The flexible formulation can be made with 13% carrageenan, 13% wt. chitosan, 6% glycerol (hydrophilic plus hydrophobic), 6% calcium carbonate, 1% anhydride crosslinker (e.g., succinic anhydride), and 61% water. The flexible formulation can be made with 13% carrageenan, 13% wt. chitosan, 7% glycerol (hydrophilic plus hydrophobic), 7% calcium carbonate, 1% anhydride crosslinker (e.g., succinic anhydride), and 59% water. The flexible formulation can be made with 13% carrageenan, 13% wt. chitosan, 8% glycerol (hydrophilic plus hydrophobic), 8% calcium carbonate, 1% anhydride crosslinker (e.g., succinic anhydride), and 57% water. The flexible formulation can be made with 13% carrageenan, 13% wt. chitosan, 9% glycerol (hydrophilic plus hydrophobic), 9% calcium carbonate, 1% anhydride crosslinker (e.g., succinic anhydride), and 55% water. The flexible formulation can be made with 13% carrageenan, 13% wt. chitosan, 10% glycerol (hydrophilic plus hydrophobic), 10% calcium carbonate, 1% anhydride crosslinker (e.g., succinic anhydride), and 53% water. The flexible formulation can be made with 13% carrageenan, 13% wt. chitosan, 11% glycerol (hydrophilic plus hydrophobic), 11% calcium carbonate, 1% anhydride crosslinker (e.g., succinic anhydride), and 51% water. The flexible formulation can be made with 13% carrageenan, 13% wt. chitosan, 12% glycerol (hydrophilic plus hydrophobic), 12% calcium carbonate, 1% anhydride crosslinker (e.g., succinic anhydride), and 49% water. The flexible formulation can be made with 13% carrageenan, 13% wt. chitosan, 13% glycerol (hydrophilic plus hydrophobic), 13% calcium carbonate, 1% anhydride crosslinker (e.g., succinic anhydride), and 47% water. The flexible formulation can be made with 13% carrageenan, 13% wt. chitosan, 14% glycerol (hydrophilic plus hydrophobic), 14% calcium carbonate, 1% anhydride crosslinker (e.g., succinic anhydride), and 45% water. The flexible formulation can be made with 13% carrageenan, 13% wt. chitosan, 15% glycerol (hydrophilic plus hydrophobic), 15% calcium carbonate, 1% anhydride crosslinker (e.g., succinic anhydride), and 43% water. The flexible formulation can be made with 13% carrageenan, 13% wt. chitosan, 16% glycerol (hydrophilic plus hydrophobic), 16% calcium carbonate, 1% anhydride crosslinker (e.g., succinic anhydride), and 41% water. The flexible formulation can be made with 13% carrageenan, 13% wt. chitosan, 17% glycerol (hydrophilic plus hydrophobic), 17% calcium carbonate, 1% anhydride crosslinker (e.g., succinic anhydride), and 39% water. The flexible formulation can be made with 13% carrageenan, 13% wt. chitosan, 18% glycerol (hydrophilic plus hydrophobic), 18% calcium carbonate, 1% anhydride crosslinker (e.g., succinic anhydride), and 37% water. The flexible formulation can be made with 13% carrageenan, 13% wt. chitosan, 19% glycerol (hydrophilic plus hydrophobic), 19% calcium carbonate, 1% anhydride crosslinker (e.g., succinic anhydride), and 35% water. The flexible formulation can be made with 13% carrageenan, 13% wt. chitosan, 20% glycerol (hydrophilic plus hydrophobic), 20% calcium carbonate, 1% anhydride crosslinker (e.g., succinic anhydride), and 33% water.

The flexible formulation can be made with 14% carrageenan, 14% wt. chitosan, 5% glycerol (hydrophilic plus hydrophobic), 5% calcium carbonate, 1% anhydride crosslinker (e.g., succinic anhydride), and 61% water. The flexible formulation can be made with 14% carrageenan, 14% wt. chitosan, 6% glycerol (hydrophilic plus hydrophobic), 6% calcium carbonate, 1% anhydride crosslinker (e.g., succinic anhydride), and 59% water. The flexible formulation can be made with 14% carrageenan, 14% wt. chitosan, 7% glycerol (hydrophilic plus hydrophobic), 7% calcium carbonate, 1% anhydride crosslinker (e.g., succinic anhydride), and 57% water. The flexible formulation can be made with 14% carrageenan, 14% wt. chitosan, 8% glycerol (hydrophilic plus hydrophobic), 8% calcium carbonate, 1% anhydride crosslinker (e.g., succinic anhydride), and 55% water. The flexible formulation can be made with 14% carrageenan, 14% wt. chitosan, 9% glycerol (hydrophilic plus hydrophobic), 9% calcium carbonate, 1% anhydride crosslinker (e.g., succinic anhydride), and 53% water. The flexible formulation can be made with 14% carrageenan, 14% wt. chitosan, 10% glycerol (hydrophilic plus hydrophobic), 10% calcium carbonate, 1% anhydride crosslinker (e.g., succinic anhydride), and 51% water. The flexible formulation can be made with 14% carrageenan, 14% wt. chitosan, 11% glycerol (hydrophilic plus hydrophobic), 11% calcium carbonate, 1% anhydride crosslinker (e.g., succinic anhydride), and 49% water. The flexible formulation can be made with 14% carrageenan, 14% wt. chitosan, 12% glycerol (hydrophilic plus hydrophobic), 12% calcium carbonate, 1% anhydride crosslinker (e.g., succinic anhydride), and 47% water. The flexible formulation can be made with 14% carrageenan, 14% wt. chitosan, 13% glycerol (hydrophilic plus hydrophobic), 13% calcium carbonate, 1% anhydride crosslinker (e.g., succinic anhydride), and 45% water. The flexible formulation can be made with 14% carrageenan, 14% wt. chitosan, 14% glycerol (hydrophilic plus hydrophobic), 14% calcium carbonate, 1% anhydride crosslinker (e.g., succinic anhydride), and 43% water. The flexible formulation can be made with 14% carrageenan, 14% wt. chitosan, 15% glycerol (hydrophilic plus hydrophobic), 15% calcium carbonate, 1% anhydride crosslinker (e.g., succinic anhydride), and 41% water. The flexible formulation can be made with 14% carrageenan, 14% wt. chitosan, 16% glycerol (hydrophilic plus hydrophobic), 16% calcium carbonate, 1% anhydride crosslinker (e.g., succinic anhydride), and 39% water. The flexible formulation can be made with 14% carrageenan, 14% wt. chitosan, 17% glycerol (hydrophilic plus hydrophobic), 17% calcium carbonate, 1% anhydride crosslinker (e.g., succinic anhydride), and 37% water. The flexible formulation can be made with 14% carrageenan, 14% wt. chitosan, 18% glycerol (hydrophilic plus hydrophobic), 18% calcium carbonate, 1% anhydride crosslinker (e.g., succinic anhydride), and 35% water. The flexible formulation can be made with 14% carrageenan, 14% wt. chitosan, 19% glycerol (hydrophilic plus hydrophobic), 19% calcium carbonate, 1% anhydride crosslinker (e.g., succinic anhydride), and 33% water. The flexible formulation can be made with 14% carrageenan, 14% wt. chitosan, 20% glycerol (hydrophilic plus hydrophobic), 20% calcium carbonate, 1% anhydride crosslinker (e.g., succinic anhydride), and 31% water.

The flexible formulation can be made with 15% carrageenan, 15% wt. chitosan, 5% glycerol (hydrophilic plus hydrophobic), 5% calcium carbonate, 1% anhydride crosslinker (e.g., succinic anhydride), and 59% water. The flexible formulation can be made with 15% carrageenan, 15% wt. chitosan, 6% glycerol (hydrophilic plus hydrophobic), 6% calcium carbonate, 1% anhydride crosslinker (e.g., succinic anhydride), and 57% water. The flexible formulation can be made with 15% carrageenan, 15% wt. chitosan, 7% glycerol (hydrophilic plus hydrophobic), 7% calcium carbonate, 1% anhydride crosslinker (e.g., succinic anhydride), and 55% water. The flexible formulation can be made with 15% carrageenan, 15% wt. chitosan, 8% glycerol (hydrophilic plus hydrophobic), 8% calcium carbonate, 1% anhydride crosslinker (e.g., succinic anhydride), and 53% water. The flexible formulation can be made with 15% carrageenan, 15% wt. chitosan, 9% glycerol (hydrophilic plus hydrophobic), 9% calcium carbonate, 1% anhydride crosslinker (e.g., succinic anhydride), and 51% water. The flexible formulation can be made with 15% carrageenan, 15% wt. chitosan, 10% glycerol (hydrophilic plus hydrophobic), 10% calcium carbonate, 1% anhydride crosslinker (e.g., succinic anhydride), and 49% water. The flexible formulation can be made with 15% carrageenan, 15% wt. chitosan, 11% glycerol (hydrophilic plus hydrophobic), 11% calcium carbonate, 1% anhydride crosslinker (e.g., succinic anhydride), and 47% water. The flexible formulation can be made with 15% carrageenan, 15% wt. chitosan, 12% glycerol (hydrophilic plus hydrophobic), 12% calcium carbonate, 1% anhydride crosslinker (e.g., succinic anhydride), and 45% water. The flexible formulation can be made with 15% carrageenan, 15% wt. chitosan, 13% glycerol (hydrophilic plus hydrophobic), 13% calcium carbonate, 1% anhydride crosslinker (e.g., succinic anhydride), and 43% water. The flexible formulation can be made with 15% carrageenan, 15% wt. chitosan, 14% glycerol (hydrophilic plus hydrophobic), 14% calcium carbonate, 1% anhydride crosslinker (e.g., succinic anhydride), and 41% water. The flexible formulation can be made with 15% carrageenan, 15% wt. chitosan, 15% glycerol (hydrophilic plus hydrophobic), 15% calcium carbonate, 1% anhydride crosslinker (e.g., succinic anhydride), and 39% water. The flexible formulation can be made with 15% carrageenan, 15% wt. chitosan, 16% glycerol (hydrophilic plus hydrophobic), 16% calcium carbonate, 1% anhydride crosslinker (e.g., succinic anhydride), and 37% water. The flexible formulation can be made with 15% carrageenan, 15% wt. chitosan, 17% glycerol (hydrophilic plus hydrophobic), 17% calcium carbonate, 1% anhydride crosslinker (e.g., succinic anhydride), and 35% water. The flexible formulation can be made with 15% carrageenan, 15% wt. chitosan, 18% glycerol (hydrophilic plus hydrophobic), 18% calcium carbonate, 1% anhydride crosslinker (e.g., succinic anhydride), and 33% water. The flexible formulation can be made with 15% carrageenan, 15% wt. chitosan, 19% glycerol (hydrophilic plus hydrophobic), 19% calcium carbonate, 1% anhydride crosslinker (e.g., succinic anhydride), and 31% water. The flexible formulation can be made with 15% carrageenan, 15% wt. chitosan, 20% glycerol (hydrophilic plus hydrophobic), 20% calcium carbonate, 1% anhydride crosslinker (e.g., succinic anhydride), and 29% water.

The flexible formulation can be made with 16% carrageenan, 16% wt. chitosan, 5% glycerol (hydrophilic plus hydrophobic), 5% calcium carbonate, 1% anhydride crosslinker (e.g., succinic anhydride), and 59% water. The flexible formulation can be made with 16% carrageenan, 16% wt. chitosan, 6% glycerol (hydrophilic plus hydrophobic), 6% calcium carbonate, 1% anhydride crosslinker (e.g., succinic anhydride), and 55% water. The flexible formulation can be made with 16% carrageenan, 16% wt. chitosan, 7% glycerol (hydrophilic plus hydrophobic), 7% calcium carbonate, 1% anhydride crosslinker (e.g., succinic anhydride), and 53% water. The flexible formulation can be made with 16% carrageenan, 16% wt. chitosan, 8% glycerol (hydrophilic plus hydrophobic), 8% calcium carbonate, 1% anhydride crosslinker (e.g., succinic anhydride), and 51% water. The flexible formulation can be made with 16% carrageenan, 16% wt. chitosan, 9% glycerol (hydrophilic plus hydrophobic), 9% calcium carbonate, 1% anhydride crosslinker (e.g., succinic anhydride), and 49% water. The flexible formulation can be made with 16% carrageenan, 16% wt. chitosan, 10% glycerol (hydrophilic plus hydrophobic), 10% calcium carbonate, 1% anhydride crosslinker (e.g., succinic anhydride), and 47% water. The flexible formulation can be made with 16% carrageenan, 16% wt. chitosan, 11% glycerol (hydrophilic plus hydrophobic), 11% calcium carbonate, 1% anhydride crosslinker (e.g., succinic anhydride), and 45% water. The flexible formulation can be made with 16% carrageenan, 16% wt. chitosan, 12% glycerol (hydrophilic plus hydrophobic), 12% calcium carbonate, 1% anhydride crosslinker (e.g., succinic anhydride), and 43% water. The flexible formulation can be made with 16% carrageenan, 16% wt. chitosan, 13% glycerol (hydrophilic plus hydrophobic), 13% calcium carbonate, 1% anhydride crosslinker (e.g., succinic anhydride), and 41% water. The flexible formulation can be made with 16% carrageenan, 16% wt. chitosan, 14% glycerol (hydrophilic plus hydrophobic), 14% calcium carbonate, 1% anhydride crosslinker (e.g., succinic anhydride), and 39% water. The flexible formulation can be made with 16% carrageenan, 16% wt. chitosan, 15% glycerol (hydrophilic plus hydrophobic), 15% calcium carbonate, 1% anhydride crosslinker (e.g., succinic anhydride), and 37% water. The flexible formulation can be made with 16% carrageenan, 16% wt. chitosan, 16% glycerol (hydrophilic plus hydrophobic), 16% calcium carbonate, 1% anhydride crosslinker (e.g., succinic anhydride), and 35% water. The flexible formulation can be made with 16% carrageenan, 16% wt. chitosan, 17% glycerol (hydrophilic plus hydrophobic), 17% calcium carbonate, 1% anhydride crosslinker (e.g., succinic anhydride), and 33% water. The flexible formulation can be made with 16% carrageenan, 16% wt. chitosan, 18% glycerol (hydrophilic plus hydrophobic), 18% calcium carbonate, 1% anhydride crosslinker (e.g., succinic anhydride), and 31% water. The flexible formulation can be made with 16% carrageenan, 16% wt. chitosan, 19% glycerol (hydrophilic plus hydrophobic), 19% calcium carbonate, 1% anhydride crosslinker (e.g., succinic anhydride), and 29% water. The flexible formulation can be made with 16% carrageenan, 16% wt. chitosan, 20% glycerol (hydrophilic plus hydrophobic), 20% calcium carbonate, 1% anhydride crosslinker (e.g., succinic anhydride), and 27% water.

The flexible formulation can be made with 17% carrageenan, 17% wt. chitosan, 5% glycerol (hydrophilic plus hydrophobic), 5% calcium carbonate, 1% anhydride crosslinker (e.g., succinic anhydride), and 55% water. The flexible formulation can be made with 17% carrageenan, 17% wt. chitosan, 6% glycerol (hydrophilic plus hydrophobic), 6% calcium carbonate, 1% anhydride crosslinker (e.g., succinic anhydride), and 53% water. The flexible formulation can be made with 17% carrageenan, 17% wt. chitosan, 7% glycerol (hydrophilic plus hydrophobic), 7% calcium carbonate, 1% anhydride crosslinker (e.g., succinic anhydride), and 51% water. The flexible formulation can be made with 17% carrageenan, 17% wt. chitosan, 8% glycerol (hydrophilic plus hydrophobic), 8% calcium carbonate, 1% anhydride crosslinker (e.g., succinic anhydride), and 49% water. The flexible formulation can be made with 17% carrageenan, 17% wt. chitosan, 9% glycerol (hydrophilic plus hydrophobic), 9% calcium carbonate, 1% anhydride crosslinker (e.g., succinic anhydride), and 47% water. The flexible formulation can be made with 17% carrageenan, 17% wt. chitosan, 10% glycerol (hydrophilic plus hydrophobic), 10% calcium carbonate, 1% anhydride crosslinker (e.g., succinic anhydride), and 45% water. The flexible formulation can be made with 17% carrageenan, 17% wt. chitosan, 11% glycerol (hydrophilic plus hydrophobic), 11% calcium carbonate, 1% anhydride crosslinker (e.g., succinic anhydride), and 43% water. The flexible formulation can be made with 17% carrageenan, 17% wt. chitosan, 12% glycerol (hydrophilic plus hydrophobic), 12% calcium carbonate, 1% anhydride crosslinker (e.g., succinic anhydride), and 41% water. The flexible formulation can be made with 17% carrageenan, 17% wt. chitosan, 13% glycerol (hydrophilic plus hydrophobic), 13% calcium carbonate, 1% anhydride crosslinker (e.g., succinic anhydride), and 39% water. The flexible formulation can be made with 17% carrageenan, 17% wt. chitosan, 14% glycerol (hydrophilic plus hydrophobic), 14% calcium carbonate, 1% anhydride crosslinker (e.g., succinic anhydride), and 37% water. The flexible formulation can be made with 17% carrageenan, 17% wt. chitosan, 15% glycerol (hydrophilic plus hydrophobic), 15% calcium carbonate, 1% anhydride crosslinker (e.g., succinic anhydride), and 35% water. The flexible formulation can be made with 17% carrageenan, 17% wt. chitosan, 16% glycerol (hydrophilic plus hydrophobic), 16% calcium carbonate, 1% anhydride crosslinker (e.g., succinic anhydride), and 33% water. The flexible formulation can be made with 17% carrageenan, 17% wt. chitosan, 17% glycerol (hydrophilic plus hydrophobic), 17% calcium carbonate, 1% anhydride crosslinker (e.g., succinic anhydride), and 31% water. The flexible formulation can be made with 17% carrageenan, 17% wt. chitosan, 18% glycerol (hydrophilic plus hydrophobic), 18% calcium carbonate, 1% anhydride crosslinker (e.g., succinic anhydride), and 29% water. The flexible formulation can be made with 17% carrageenan, 17% wt. chitosan, 19% glycerol (hydrophilic plus hydrophobic), 19% calcium carbonate, 1% anhydride crosslinker (e.g., succinic anhydride), and 27% water. The flexible formulation can be made with 17% carrageenan, 17% wt. chitosan, 20% glycerol (hydrophilic plus hydrophobic), 20% calcium carbonate, 1% anhydride crosslinker (e.g., succinic anhydride), and 25% water.

The flexible formulation can be made with 18% carrageenan, 18% wt. chitosan, 5% glycerol (hydrophilic plus hydrophobic), 5% calcium carbonate, 1% anhydride crosslinker (e.g., succinic anhydride), and 53% water. The flexible formulation can be made with 18% carrageenan, 18% wt. chitosan, 6% glycerol (hydrophilic plus hydrophobic), 6% calcium carbonate, 1% anhydride crosslinker (e.g., succinic anhydride), and 51% water. The flexible formulation can be made with 18% carrageenan, 18% wt. chitosan, 7% glycerol (hydrophilic plus hydrophobic), 7% calcium carbonate, 1% anhydride crosslinker (e.g., succinic anhydride), and 49% water. The flexible formulation can be made with 18% carrageenan, 18% wt. chitosan, 8% glycerol (hydrophilic plus hydrophobic), 8% calcium carbonate, 1% anhydride crosslinker (e.g., succinic anhydride), and 47% water. The flexible formulation can be made with 18% carrageenan, 18% wt. chitosan, 9% glycerol (hydrophilic plus hydrophobic), 9% calcium carbonate, 1% anhydride crosslinker (e.g., succinic anhydride), and 45% water. The flexible formulation can be made with 18% carrageenan, 18% wt. chitosan, 10% glycerol (hydrophilic plus hydrophobic), 10% calcium carbonate, 1% anhydride crosslinker (e.g., succinic anhydride), and 43% water. The flexible formulation can be made with 18% carrageenan, 18% wt. chitosan, 11% glycerol (hydrophilic plus hydrophobic), 11% calcium carbonate, 1% anhydride crosslinker (e.g., succinic anhydride), and 41% water. The flexible formulation can be made with 18% carrageenan, 18% wt. chitosan, 12% glycerol (hydrophilic plus hydrophobic), 12% calcium carbonate, 1% anhydride crosslinker (e.g., succinic anhydride), and 39% water. The flexible formulation can be made with 18% carrageenan, 18% wt. chitosan, 13% glycerol (hydrophilic plus hydrophobic), 13% calcium carbonate, 1% anhydride crosslinker (e.g., succinic anhydride), and 37% water. The flexible formulation can be made with 18% carrageenan, 18% wt. chitosan, 14% glycerol (hydrophilic plus hydrophobic), 14% calcium carbonate, 1% anhydride crosslinker (e.g., succinic anhydride), and 35% water. The flexible formulation can be made with 18% carrageenan, 18% wt. chitosan, 15% glycerol (hydrophilic plus hydrophobic), 15% calcium carbonate, 1% anhydride crosslinker (e.g., succinic anhydride), and 33% water. The flexible formulation can be made with 18% carrageenan, 18% wt. chitosan, 16% glycerol (hydrophilic plus hydrophobic), 16% calcium carbonate, 1% anhydride crosslinker (e.g., succinic anhydride), and 31% water. The flexible formulation can be made with 18% carrageenan, 18% wt. chitosan, 17% glycerol (hydrophilic plus hydrophobic), 17% calcium carbonate, 1% anhydride crosslinker (e.g., succinic anhydride), and 29% water. The flexible formulation can be made with 18% carrageenan, 18% wt. chitosan, 18% glycerol (hydrophilic plus hydrophobic), 18% calcium carbonate, 1% anhydride crosslinker (e.g., succinic anhydride), and 27% water. The flexible formulation can be made with 18% carrageenan, 18% wt. chitosan, 19% glycerol (hydrophilic plus hydrophobic), 19% calcium carbonate, 1% anhydride crosslinker (e.g., succinic anhydride), and 25% water. The flexible formulation can be made with 18% carrageenan, 18% wt. chitosan, 20% glycerol (hydrophilic plus hydrophobic), 20% calcium carbonate, 1% anhydride crosslinker (e.g., succinic anhydride), and 23% water.

The flexible formulation can be made with 19% carrageenan, 19% wt. chitosan, 5% glycerol (hydrophilic plus hydrophobic), 5% calcium carbonate, 1% anhydride crosslinker (e.g., succinic anhydride), and 51% water. The flexible formulation can be made with 19% carrageenan, 19% wt. chitosan, 6% glycerol (hydrophilic plus hydrophobic), 6% calcium carbonate, 1% anhydride crosslinker (e.g., succinic anhydride), and 49% water. The flexible formulation can be made with 19% carrageenan, 19% wt. chitosan, 7% glycerol (hydrophilic plus hydrophobic), 7% calcium carbonate, 1% anhydride crosslinker (e.g., succinic anhydride), and 47% water. The flexible formulation can be made with 19% carrageenan, 19% wt. chitosan, 8% glycerol (hydrophilic plus hydrophobic), 8% calcium carbonate, 1% anhydride crosslinker (e.g., succinic anhydride), and 45% water. The flexible formulation can be made with 19% carrageenan, 19% wt. chitosan, 9% glycerol (hydrophilic plus hydrophobic), 9% calcium carbonate, 1% anhydride crosslinker (e.g., succinic anhydride), and 43% water. The flexible formulation can be made with 19% carrageenan, 19% wt. chitosan, 10% glycerol (hydrophilic plus hydrophobic), 10% calcium carbonate, 1% anhydride crosslinker (e.g., succinic anhydride), and 41% water. The flexible formulation can be made with 19% carrageenan, 19% wt. chitosan, 11% glycerol (hydrophilic plus hydrophobic), 11% calcium carbonate, 1% anhydride crosslinker (e.g., succinic anhydride), and 39% water. The flexible formulation can be made with 19% carrageenan, 19% wt. chitosan, 12% glycerol (hydrophilic plus hydrophobic), 12% calcium carbonate, 1% anhydride crosslinker (e.g., succinic anhydride), and 37% water. The flexible formulation can be made with 19% carrageenan, 19% wt. chitosan, 13% glycerol (hydrophilic plus hydrophobic), 13% calcium carbonate, 1% anhydride crosslinker (e.g., succinic anhydride), and 35% water. The flexible formulation can be made with 19% carrageenan, 19% wt. chitosan, 14% glycerol (hydrophilic plus hydrophobic), 14% calcium carbonate, 1% anhydride crosslinker (e.g., succinic anhydride), and 33% water. The flexible formulation can be made with 19% carrageenan, 19% wt. chitosan, 15% glycerol (hydrophilic plus hydrophobic), 15% calcium carbonate, 1% anhydride crosslinker (e.g., succinic anhydride), and 31% water. The flexible formulation can be made with 19% carrageenan, 19% wt. chitosan, 16% glycerol (hydrophilic plus hydrophobic), 16% calcium carbonate, 1% anhydride crosslinker (e.g., succinic anhydride), and 29% water. The flexible formulation can be made with 19% carrageenan, 19% wt. chitosan, 17% glycerol (hydrophilic plus hydrophobic), 17% calcium carbonate, 1% anhydride crosslinker (e.g., succinic anhydride), and 27% water. The flexible formulation can be made with 19% carrageenan, 19% wt. chitosan, 18% glycerol (hydrophilic plus hydrophobic), 18% calcium carbonate, 1% anhydride crosslinker (e.g., succinic anhydride), and 25% water. The flexible formulation can be made with 19% carrageenan, 19% wt. chitosan, 19% glycerol (hydrophilic plus hydrophobic), 19% calcium carbonate, 1% anhydride crosslinker (e.g., succinic anhydride), and 23% water. The flexible formulation can be made with 19% carrageenan, 19% wt. chitosan, 20% glycerol (hydrophilic plus hydrophobic), 20% calcium carbonate, 1% anhydride crosslinker (e.g., succinic anhydride), and 21% water.

The flexible formulation can be made with 20% carrageenan, 20% wt. chitosan, 5% glycerol (hydrophilic plus hydrophobic), 5% calcium carbonate, 1% anhydride crosslinker (e.g., succinic anhydride), and 49% water. The flexible formulation can be made with 20% carrageenan, 20% wt. chitosan, 6% glycerol (hydrophilic plus hydrophobic), 6% calcium carbonate, 1% anhydride crosslinker (e.g., succinic anhydride), and 47% water. The flexible formulation can be made with 20% carrageenan, 20% wt. chitosan, 7% glycerol (hydrophilic plus hydrophobic), 7% calcium carbonate, 1% anhydride crosslinker (e.g., succinic anhydride), and 45% water. The flexible formulation can be made with 20% carrageenan, 20% wt. chitosan, 8% glycerol (hydrophilic plus hydrophobic), 8% calcium carbonate, 1% anhydride crosslinker (e.g., succinic anhydride), and 43% water. The flexible formulation can be made with 20% carrageenan, 20% wt. chitosan, 9% glycerol (hydrophilic plus hydrophobic), 9% calcium carbonate, 1% anhydride crosslinker (e.g., succinic anhydride), and 41% water. The flexible formulation can be made with 20% carrageenan, 20% wt. chitosan, 10% glycerol (hydrophilic plus hydrophobic), 10% calcium carbonate, 1% anhydride crosslinker (e.g., succinic anhydride), and 39% water. The flexible formulation can be made with 20% carrageenan, 20% wt. chitosan, 11% glycerol (hydrophilic plus hydrophobic), 11% calcium carbonate, 1% anhydride crosslinker (e.g., succinic anhydride), and 37% water. The flexible formulation can be made with 20% carrageenan, 20% wt. chitosan, 12% glycerol (hydrophilic plus hydrophobic), 12% calcium carbonate, 1% anhydride crosslinker (e.g., succinic anhydride), and 35% water. The flexible formulation can be made with 20% carrageenan, 20% wt. chitosan, 13% glycerol (hydrophilic plus hydrophobic), 13% calcium carbonate, 1% anhydride crosslinker (e.g., succinic anhydride), and 33% water. The flexible formulation can be made with 20% carrageenan, 20% wt. chitosan, 14% glycerol (hydrophilic plus hydrophobic), 14% calcium carbonate, 1% anhydride crosslinker (e.g., succinic anhydride), and 31% water. The flexible formulation can be made with 20% carrageenan, 20% wt. chitosan, 15% glycerol (hydrophilic plus hydrophobic), 15% calcium carbonate, 1% anhydride crosslinker (e.g., succinic anhydride), and 29% water. The flexible formulation can be made with 20% carrageenan, 20% wt. chitosan, 16% glycerol (hydrophilic plus hydrophobic), 16% calcium carbonate, 1% anhydride crosslinker (e.g., succinic anhydride), and 27% water. The flexible formulation can be made with 20% carrageenan, 20% wt. chitosan, 17% glycerol (hydrophilic plus hydrophobic), 17% calcium carbonate, 1% anhydride crosslinker (e.g., succinic anhydride), and 25% water. The flexible formulation can be made with 20% carrageenan, 20% wt. chitosan, 18% glycerol (hydrophilic plus hydrophobic), 18% calcium carbonate, 1% anhydride crosslinker (e.g., succinic anhydride), and 23% water. The flexible formulation can be made with 20% carrageenan, 20% wt. chitosan, 19% glycerol (hydrophilic plus hydrophobic), 19% calcium carbonate, 1% anhydride crosslinker (e.g., succinic anhydride), and 21% water. The flexible formulation can be made with 20% carrageenan, 20% wt. chitosan, 20% glycerol (hydrophilic plus hydrophobic), 20% calcium carbonate, 1% anhydride crosslinker (e.g., succinic anhydride), and 19% water.

In some aspects, the article, pellet, or pre-process mixture comprises one or more coloring agents (sometimes referred to herein as colorants). The coloring agent may be added as an optional ingredient in the pre-processing mixture, may be applied to the article as an edible coating, or may be infused into the article or pellet. In some aspects, the coloring agent is derived from a plant source and is present in the article, pellet, or pre-process mixture in the amount of about 0.1% to about 10% by weight, or about 0.1 to about 0.3% by weight. Representative coloring agents are available from DDW Color House, Food Ingredient Solutions, GNT, Natural Flavors Inc., SunChemical, FireDots and Sensient Food Colors. Depending on the coloring agent or agents chosen, the articles (e.g., edible articles) may be translucent, opaque, or clear. In some aspects the coloring agent is a pigment, for example, cyan, red, blue, yellow, green, purple, or any other desired color, which can be in any form, such as an aqueous solution. In some aspects the coloring agent is a photonic flake, for example titania coated mica, carbon black coated mica or self-assembled polymer flake ranging in color from violet to red and supplied in a powdered form. In some aspects, the article, pellet, or pre-process mixture is devoid of any coloring agent. The coloring agent may be applied to provide a particular appearance, for example striated, color blocked, faded from one color to another, changing in color throughout, tie-dye, marble swirls, or any combination thereof.

In some aspects, the article, pellet, or pre-process mixture comprises one or more preservatives (e.g., natural preservatives). In some aspects, the preservative comprises an anti-oxidant such as a tocopherol. In some aspects, the preservative comprises citric acid. In some aspects, the preservative comprises lemon juice, lemon powder, ascorbic acid, tartaric acid, malic acid, sour salt, or any combination thereof. In some aspects, any combination of preservatives may be employed.

In some aspects, the article or pellet comprises a coating, for example, to enhance the waterproofing, to extend shelf life (e.g., acting as a preservative), or a combination thereof. In some aspects, the coating is edible. In some aspects coating improves gas and water vapor barrier properties of the article. In some aspects, the coating reduces the stickiness of the article and/or pellet. In some aspects, the coating (or coating component) comprises vegetable oils, including but not limited to coconut oil, palm oil, beechnut oil, castor oil, cottonseed oil, groundnut oil, hazelnut oil, olive oil, palm kernel oil, peanut oil, peel oil, poppy oil, black current seed oil, flaxseed oil, amaranth oil, apricot oil, raisin seed oil, rapeseed oil, rice bran oil, safflower oil, sesame oil, sunflower seed oil, tucum oil, soybean oil, almond oil, brazil nut oil, cashew oil, macadamia oil, mongongo nut oil, pine nut oil, pistachio oil, walnut oil, or any combination thereof; short or medium or long chain triglycerides, monoglycerides, diglycerides, or any combination thereof; confectioner's glaze; acetylated monoglycerides; waxes such as beeswax, soy wax, rice bran wax, shellac; or any combination of any coating material or coating component listed herein. In some aspects, the coating or coating component comprises a wax such as beeswax, rice bran wax, carnauba wax, soy wax, shellac or any combination of thereof. In some aspects, the wax is an edible wax. In some aspects, the coating is applied to an article or pellet by way of a coating solution comprising a coating component (e.g., the coating component is or comprises any of the coatings or coating materials described herein). For example, in some aspects the coating solution comprises a coating component (e.g., an oil, an edible wax, a combination of edible waxes, or a combination of one or more oils and one or more edible waxes) in an amount (wt. %) of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35, based on the total weight of the coating solution. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the coating solution comprises a coating component in an amount (wt. %) of 0 to 15, 10 to 20, less than 18, 30, 25 to 35, 28 to 33, about 5, or 2 to 8. In some aspects coating solution comprises a coating component (e.g., edible wax) dissolved in a 1:1, 1:2, 1:3, or 1:4 mixture of water:acetone. In some aspects, the coating (e.g., coating solution) is applied to the article after the article has been molded and dried, or extruded and dried. In some aspects, the coating (e.g., coating solution) is applied to the article during the drying process. In some aspects, the coating (e.g., coating solution) is applied by spraying, immersing, dipping, brushing, edible ink-jet printing, co-extrusion or any combination thereof, or otherwise applied to the inner and/or outer surfaces of the article. In some aspects, coating articles or pellets can be performed as known in the art to coat the articles (e.g., straws) using any known coating agent, such as those coating agents/materials/components described herein. In some aspects, a process comprises optionally applying a coating to the pellet by spraying, immersion, dipping, brushing, edible ink jet printing, co-extrusion, or any combination thereof, wherein the coating comprises an oil coating, a wax coating, confectioner's glaze, or any combination thereof, or any other coating disclosed herein.

In some aspects, a coated article has any suitable contact angle when measured using Rame-Hart Model 90 CA edition with DropImage software and using water as a liquid. For example, in some aspects, the static contact angle (°) is 95, 96, 97, 98, 99, 100, 101, 102, 103, 104, 105, 106, 107, 108, 109, 110, 111, 112, 113, 114, or 115. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the static contact angle is 95 to 115, 100, about 100, 98 to 105, 97 to 110, 100 to 115, 100 to 110, or 105 to 112. In some aspects, an article can have such static contact angles when any suitable coating disclosed herein is present on the article, including, for example, beeswax, a combination of beeswax and carnauba, carnauba, oil, confectioner's glaze, soy wax, and so forth, or any combination thereof.

In some aspects, the pellets and/or articles herein do not include a coating, e.g., a coating comprising rubber.

Aspects of the Invention

Various aspects are contemplated herein, several of which are set forth in the paragraphs below. It is explicitly contemplated that any aspect or portion thereof can be combined to form an aspect. In addition, it is explicitly contemplated that any aspect (e.g., Aspect A13) that references an aspect (e.g., Aspect A1) for which there are sub-aspects having the same top level number (e.g., Aspect A1a, A1b, A1c, and so forth) necessarily includes reference to those sub-aspects A1a, A1b, A1c, and so forth. In other words, if Aspect A13 refers to Aspect A1, and there are Aspects A1a and A1b present, then Aspect A13 refers to Aspects A1a or A1b. Furthermore, although the aspects below are subdivided into aspects A, B, C, D, and so forth, it is explicitly contemplated that aspects in each of subdivisions A, B, C, D, etc. can be combined in any manner. Moreover, the term "any preceding aspect" means any aspect that appears prior to the aspect that contains such phrase (in other words, the sentence "Aspect B13: The method of any one of aspects B1-B12, or any preceding aspect, . . . " means that any aspect prior to aspect B13 is referenced, including aspects B1-B12 and all of the "A" aspects). For example, it is contemplated that, optionally, any method or composition of any of the below aspects may be useful with or combined with any other aspect provided below. Further, for example, it is contemplated that any embodiment described elsewhere herein, including above this paragraph, may optionally be combined with any of the below listed aspects. In some instances in the aspects below, or elsewhere herein, two open ended ranges are disclosed to be combinable into a range. For example, "at least X" is disclosed to be combinable with "less than Y" to form a range, in which X and Y are numeric values. For the purposes of forming ranges herein, it is explicitly contemplated that "at least X" combined with "less than Y" forms a range of X-Y inclusive of value X and value Y, even though "less than Y" in isolation does not include Y.

Aspect A1: An article, pellet, or pre-process mixture comprising:
at least one hydrocolloid,
at least one plasticizer,
at least one filler,
at least one cross-linker, and at least one flowing agent.

Aspect A2: The article, pellet, or pre-process mixture of aspect A1, wherein the at least one hydrocolloid is derived from a biological source.

Aspect A3: The article, pellet, or pre-process mixture of aspect A1 or aspect A2, wherein the at least one hydrocolloid comprises alginate, chitin, chitosan, carrageenan, pectin, gelatin, isomalt, konjac, lecithin, maltodextrin, methylcellulose, a natural gum, or any combination thereof.

Aspect A3a: The article, pellet, or pre-process mixture of any one of aspects A1-A3, wherein the at least one hydrocolloid comprises at least one natural gum, such as guar gum, gum arabic, locust bean gum, or xanthan gum.

Aspect A4: The article, pellet, or pre-process mixture of any one of aspects A1-A3a, wherein the at least one hydrocolloid comprises carrageenan.

Aspect A4a: The article, pellet, or pre-process mixture of any one of aspects A1-A4, wherein the at least one hydrocolloid comprises kappa-carrageenan, iota-carrageenan, lambda-carrageenan, or any combination thereof.

Aspect A5: The article, pellet, or pre-process mixture of any one of aspects A1-A4a, wherein the at least one hydrocolloid comprises kappa-carrageenan.

Aspect A6: The article, pellet, or pre-process mixture of any one of aspects A1-A5, wherein the at least one hydrocolloid comprises carrageenan in combination with at least one of chitosan or chitin.

Aspect A7: The article, pellet, or pre-process mixture of aspect A6, or any preceding aspect, wherein the chitosan and/or chitin are low molecular weight crustacean chitosan and/or chitin.

Aspect A8: The article, pellet, or pre-process mixture of any one of aspects A1-A7 comprising hydrocolloids in a total amount of 10 wt. % to 70 wt. % (e.g., 10 wt. % to 70 wt. %, 10 wt. % to 60 wt. %, 10 wt. % to 50 wt. %, 10 wt. % to 40 wt. %, 10 wt. % to 30 wt. %, 10 wt. % to 20 wt. %, 20 wt. % to 70 wt. %, 20 wt. % to 60 wt. %, 20 wt. % to 50 wt. %, 20 wt. % to 40 wt. %, 20 wt. % to 30 wt. %, 30 wt. % to 70 wt. %, 30 wt. % to 60 wt. %, 30 wt. % to 50 wt. %, 30 wt. % to 40 wt. %, 40 wt. % to 70 wt. %, 40 wt. % to 60 wt. %, 40 wt. % to 50 wt. %, 50 wt. % to 70 wt. %, or 50 wt. % to 60 wt. %) based on total weight of the article, pellet, or pre-process mixture, as appropriate.

Aspect A9: The article, pellet, or pre-process mixture of any one of aspects A1-A8, wherein the at least one hydrocolloid comprises:
carrageenan in an amount of 20 wt. % to 60 wt. % (e.g., 20 wt. % to 60 wt. %, 20 wt. % to 55 wt. %, 20 wt. % to 50 wt. %, 20 wt. % to 40 wt. %, 20 wt. % to 30 wt. %, 25 wt. % to 60 wt. %, 25 wt. % to 55 wt. %, 25 wt. % to 50 wt. %, 25 wt. % to 40 wt. %, 25 wt. % to 30 wt. %, 30 wt. % to 60 wt. %, 30 wt. % to 55 wt. %, 30 wt. % to 50 wt. %, 30 wt. % to 40 wt. %, 40 wt. % to 60 wt. %, 40 wt. % to 55 wt. %, 40 wt. % to 50 wt. %, or 50 wt. % to 60 wt. %), and
chitin or chitosan or a mixture thereof in an amount of 1 wt. % to 30 wt. % (e.g., 1 wt. % to 30 wt. %, 1 wt. % to 25 wt. %, 1 wt. % to 20 wt. %, 1 wt. % to 16 wt. %, 1 wt. % to 12 wt. %, 1 wt. % to 8 wt. %, 1 wt. % to 5 wt. %, 1 wt. % to 4 wt. %, 1 wt. % to 3 wt. %, 2 wt. % to 30 wt. %, 2 wt. % to 25 wt. %, 2 wt. % to 20 wt. %, 2 wt. % to 16 wt. %, 2 wt. % to 12 wt. %, 2 wt. % to 8 wt. %, 2 wt. % to 5 wt. %, 2 wt. % to 4 wt. %, 3 wt. % to 30 wt. %, 3 wt. % to 25 wt. %, 3 wt. % to 20 wt. %, 3 wt. % to 16 wt. %, 3 wt. % to 12 wt. %, 3 wt. % to 8 wt. %, 3 wt. % to 5 wt. %, 3 wt. % to 4 wt. %, 4 wt. % to 30 wt. %, 4 wt. % to 25 wt. %, 4 wt. % to 20 wt. %, 4 wt. % to 16 wt. %, 4 wt. % to 12 wt. %, 4 wt. % to 8 wt. %, 5 wt. % to 30 wt. %, 5 wt. % to 25 wt. %, 5 wt. % to 20 wt. %, 5 wt. % to 16 wt. %, 5 wt. % to 15 wt. %, 5 wt. % to 12 wt. %, 5 wt. % to 10 wt. %, 5 wt. % to 8 wt. %, 6 wt. % to 30 wt. %, 6 wt. % to 25 wt. %, 6 wt. % to 20 wt. %, 6 wt. % to 16 wt. %, 6 wt. % to 12 wt. %, 6 wt. % to 8 wt. %, 7 wt. % to 30 wt. %, 7 wt. % to 25 wt. %, 7 wt. % to 20 wt. %, 7 wt. % to 16 wt. %, 7 wt. % to 14 wt. %, 7 wt. % to 12 wt. %, 7 wt. % to 8 wt. %; 8 wt. % to 30 wt. %, 8 wt. % to 25 wt. %, 8 wt. % to 20 wt. %, 8 wt. % to 16 wt. %, 8 wt. % to 12 wt. %, 8 wt. % to 10 wt. %, 9 wt. % to 30 wt. %, 9 wt. % to 25 wt. %, 9 wt. % to 20 wt. %, 9 wt. % to 18 wt. %, 9 wt. % to 16 wt. %, 9 wt. % to 12 wt. %, 9 wt. % to 10 wt. %, 10 wt. % to 30 wt. %, 10 wt. % to 25 wt. %, 10 wt. % to 20 wt. %, 10 wt. % to 18 wt. %, 10 wt. % to 16 wt. %, 10 wt. % to 15 wt. %, 10 wt. % to 14 wt. %, 10 wt. % to 13 wt. %, 10 wt. % to 12 wt. %, or 10 wt. % to 11 wt. %), based on total weight of the article, pellet, or pre-process mixture, as appropriate.

Aspect A10: The article, pellet, or pre-process mixture of any one of aspects A1-A9, wherein the at least one hydrocolloid comprises:
a. carrageenan in an amount of 30 wt. % to 50 wt. % (e.g., 30 wt. % to 50 wt. %, 30 wt. % to 40 wt. %, 35 wt. % to 50 wt. %, 35 wt. % to 40 wt. %, 40 wt. % to 60 wt. %, 40 wt. % to 55 wt. %, 40 wt. % to 50 wt. %, or 45 wt. % to 50 wt. %), and
b. chitin or chitosan or a mixture thereof in an amount of 1 wt. % to 25 wt. % (e.g., 1 wt. % to 25 wt. %, 1 wt. % to 20 wt. %, 1 wt. % to 16 wt. %, 1 wt. % to 12 wt. %, 1 wt. % to 10 wt. %, 1 wt. % to 8 wt. %, 1 wt. % to 5 wt. %, 1 wt. % to 4 wt. %, 1 wt. % to 3 wt. %, 2 wt. % to 25 wt. %, 2 wt. % to 20 wt. %, 2 wt. % to 16 wt. %, 2 wt. % to 12 wt. %, 2 wt. % to 8 wt. %, 2 wt. % to 5 wt. %, 2 wt. % to 4 wt. %, 3 wt. % to 25 wt. %, 3 wt. % to 20 wt. %, 3 wt. % to 16 wt. %, 3 wt. % to 12 wt. %, 3 wt. % to 8 wt. %, 3 wt. % to 5 wt. %, 3 wt. % to 4 wt. %, 4 wt. % to 25 wt. %, 4 wt. % to 20 wt. %, 4 wt. % to 16 wt. %, 4 wt. % to 12 wt. %, 4 wt. % to 8 wt. %, 5 wt. % to 25 wt. %, 5 wt. % to 20 wt. %, 5 wt. % to 16 wt. %, 5 wt. % to 15 wt. %, 5 wt. % to 12 wt. %, 5 wt. % to 10 wt. %, 5 wt. % to 8 wt. %, 6 wt. % to 25 wt. %, 6 wt. % to 20 wt. %, 6 wt. % to 16 wt. %, 6 wt. % to 12 wt. %, 6 wt. % to 8 wt. %, 7 wt. % to 25 wt. %, 7 wt. % to 20 wt. %, 7 wt. % to 16 wt. %, 7 wt. % to 14 wt. %, 7 wt. % to 12 wt. %, 7 wt. % to 8 wt. %; 8 wt. % to 25 wt. %, 8 wt. % to 20 wt. %, 8 wt. % to 16 wt. %, 8 wt. % to 12 wt. %, 8 wt. % to 10 wt. %, 9 wt. % to 25 wt. %, 9 wt. % to 20 wt. %, 9 wt. % to 18 wt. %, 9 wt. % to 16 wt. %, 9 wt. % to 12 wt. %, 9 wt. % to 10 wt. %, 10 wt. % to 25 wt. %, 10 wt. % to 20 wt. %, 10 wt. % to 18 wt. %, 10 wt. % to 16 wt. %, 10 wt. % to 15 wt. %, 10 wt. % to 14 wt. %, 10 wt. % to 13 wt. %, 10 wt. % to 12 wt. %, or 10 wt. % to 11 wt. %), based on total weight of the article, pellet, or pre-process mixture, as appropriate.

Aspect A11: The article, pellet, or pre-process mixture of any one of aspects A1-A10, wherein the at least one plasticizer comprises a sugar alcohol (e.g., glycerol, mannitol, sorbitol), microcrystalline cellulose, acacia gum, genepin, nano emulsions, algae oil, coconut oils, processed shea butter, ester gums, palm stearin, thermoplastic cellulose ethers, zein, citrate esters, phthalate esters, adipate esters, fatty acids, or any alkylated or esterified version thereof, or any combination thereof.

Aspect A12: The article, pellet, or pre-process mixture of any one of aspects A1-A11, wherein the at least one plasticizer comprises a combination of: a hydrophilic plasticizer, and a hydrophobic plasticizer.

Aspect A13: The article, pellet, or pre-process mixture of any one of aspects A1-A12 comprising plasticizers in a total amount of 1 wt. % to 40 wt. % based on total weight of the article, pellet, or pre-process mixture, as appropriate. For example, the article, pellet, or pre-process mixture may comprise plasticizers in a total amount of 1 wt. % to 40 wt. %, 1 wt. % to 30 wt. %, 1 wt. % to 25 wt. %, 1 wt. % to 20 wt. %, 1 wt. % to 16 wt. %, 1 wt. % to 12 wt. %, 1 wt. % to 8 wt. %, 1 wt. % to 5 wt. %, 1 wt. % to 4 wt. %, 1 wt. % to 3 wt. %, 2 wt. % to 40 wt. %, 2 wt. % to 30 wt. %, 2 wt. % to 25 wt. %, 2 wt. % to 20 wt. %, 2 wt. % to 16 wt. %, 2 wt. % to 12 wt. %, 2 wt. % to 8 wt. %, 2 wt. % to 5 wt. %, 2 wt. % to 4 wt. %, 3 wt. % to 40 wt. %, 3 wt. % to 30 wt. %, 3 wt. % to 25 wt. %, 3 wt. % to 20 wt. %, 3 wt. % to 16 wt. %, 3 wt. % to 12 wt. %, 3 wt. % to 8 wt. %, 3 wt. % to 5 wt. %, 3 wt. % to 4 wt. %, 4 wt. % to 40 wt. %, 4 wt. % to 30 wt. %, 4 wt. % to 25 wt. %, 4 wt. % to 20 wt. %, 4 wt. % to 16 wt. %, 4 wt. % to 12 wt. %, 4 wt. % to 8 wt. %, 5 wt. % to 40 wt. %, 5 wt. % to 30 wt. %, 5 wt. % to 25 wt. %, 5 wt. % to 20 wt. %, 5 wt. % to 16 wt. %, 5 wt. % to 15 wt. %, 5 wt. % to 12 wt. %, 5 wt. % to 10 wt. %, 5 wt. % to 8 wt. %, 6 wt. % to 40 wt. %, 6 wt. % to 30 wt. %, 6 wt. % to 25 wt. %, 6 wt. % to 20 wt. %, 6 wt. % to 16 wt. %, 6 wt. % to 12 wt. %, 6 wt. % to 8 wt. %, 7 wt. % to 40 wt. %, 7 wt. % to 30 wt. %, 7 wt. % to 25 wt. %, 7 wt. % to 20 wt. %, 7 wt. % to 16 wt. %, 7 wt. % to 14 wt. %, 7 wt. % to 12 wt. %, 7 wt. % to 8 wt. %, 8 wt. % to 40 wt. %, 8 wt. % to 30 wt. %, 8 wt. % to 25 wt. %, 8 wt. % to 20 wt. %, 8 wt. % to 16 wt. %, 8 wt. % to 12 wt. %, 8 wt. % to 10 wt. %, 9 wt. % to 40 wt. %, 9 wt. % to 30 wt. %, 9 wt. % to 25 wt. %, 9 wt. % to 20 wt. %, 9 wt. % to 18 wt. %, 9 wt. % to 16 wt. %, 9 wt. % to 12 wt. %, 9 wt. % to 10 wt. %, 10 wt. % to 40 wt. %, 10 wt. % to 30 wt. %, 10 wt. % to 25 wt. %, 10 wt. % to 20 wt. %, 10 wt. % to 18 wt. %, 10 wt. % to 16 wt. %, 10 wt. % to 15 wt. %, 10 wt. % to 14 wt. %, 10 wt. % to 13 wt. %, 10 wt. % to 12 wt. %, or 10 wt. % to 11 wt. %, based on total weight of the article, pellet, or pre-process mixture, as appropriate.

Aspect A14: The article, pellet, or pre-process mixture of any one of aspects A1-A13, wherein the at least one filler comprises starch, microcrystalline cellulose (MCC), guar gum, carboxymethyl cellulose, citrus fiber, a mineral salt, calcium carbonate or a hydrate thereof, sodium sulfate or a hydrate thereof, barium sulfate or a hydrate thereof, talc, a salt or compound which is a hydroxide, a sulfate, a chloride, a carbonate, an oxide, an aluminate, a silicate, an acetate, silica, pentasodium triphosphate, sepiolite, silicone dioxide, zeolite, or any hydrate thereof, or any combination thereof.

Aspect A15: The article, pellet, or pre-process mixture of any one of aspects A1-A14 comprising fillers in a total amount of 5 wt. % to 40 wt. % based on total weight of the article, pellet, or pre-process mixture, as appropriate. For example, the article, pellet, or pre-process mixture may comprise fillers in a total amount of 5 wt. % to 40 wt. %, 5 wt. % to 30 wt. %, 5 wt. % to 25 wt. %, 5 wt. % to 20 wt. %, 5 wt. % to 16 wt. %, 5 wt. % to 15 wt. %, 5 wt. % to 12 wt. %, 5 wt. % to 10 wt. %, 5 wt. % to 8 wt. %, 6 wt. % to 40 wt. %, 6 wt. % to 30 wt. %, 6 wt. % to 25 wt. %, 6 wt. % to 20 wt. %, 6 wt. % to 16 wt. %, 6 wt. % to 12 wt. %, 6 wt. % to 8 wt. %, 7 wt. % to 40 wt. %, 7 wt. % to 30 wt. %, 7 wt. % to 25 wt. %, 7 wt. % to 20 wt. %, 7 wt. % to 16 wt. %, 7 wt. % to 14 wt. %, 7 wt. % to 12 wt. %, 7 wt. % to 8 wt. %, 8 wt. % to 40 wt. %, 8 wt. % to 30 wt. %, 8 wt. % to 25 wt. %, 8 wt. % to 20 wt. %, 8 wt. % to 16 wt. %, 8 wt. % to 12 wt. %, 8 wt. % to 10 wt. %, 9 wt. % to 40 wt. %, 9 wt. % to 30 wt. %, 9 wt. % to 25 wt. %, 9 wt. % to 20 wt. %, 9 wt. % to 18 wt. %, 9 wt. % to 16 wt. %, 9 wt. % to 12 wt. %, 9 wt. % to 10 wt. %, 10 wt. % to 40 wt. %, 10 wt. % to 30 wt. %, 10 wt. % to 25 wt. %, 10 wt. % to 20 wt. %, 10 wt. % to 18 wt. %, 10 wt. % to 16 wt. %, 10 wt. % to 15 wt. %, 10 wt. % to 14 wt. %, 10 wt. % to 13 wt. %, 10 wt. % to 12 wt. %, or 10 wt. % to 11 wt. %, based on total weight of the article, pellet, or pre-process mixture, as appropriate.

Aspect A16: The article, pellet, or pre-process mixture of any one of aspects A1-A15, wherein the at least one cross-linker comprises an organic acid.

Aspect A17: The article, pellet, or pre-process mixture of any one of aspects A1-A16, wherein the at least one cross-linker comprises esters, imines, vinylogous urethanes, anhydrides (e.g., Succinic anhydride (SA); Octenyl succinic anhydride (OSA); Itaconic anhydride (IA); Maleic anhydride (MA)), vinylogous ureas, Dialdehyde starch (DAS); tBu-3-oxobutanoate (t-BAA); Diketene acetone adduct (TMDO), and 1,2-bis(triethoxysilyl) ethane. Collectively, Succinic anhydride (SA); Octenyl succinic anhydride (OSA); Itaconic anhydride (IA); Maleic anhydride (MA) are referred to as anhydride cross-linkers.

Aspect A18: The article, pellet, or pre-process mixture of any one of aspects A1-A17 comprising anhydride cross-linkers in a total amount of 0.5 wt. % to 10 wt. % based on total weight of the article, pellet, or pre-process mixture, as appropriate. For example, the article, pellet, or pre-process mixture may comprise anhydride cross-linkers in a total amount of 0.5 wt. % to 10 wt. %, 0.5 wt. % to 8 wt. %, 0.5 wt. % to 5 wt. %, 0.5 wt. % to 4 wt. %, 0.5 wt. % to 3 wt. %, 0.5 wt. % to 2 wt. %, 0.5 wt. % to 1 wt. %, 1 wt. % to 10 wt. %, 1 wt. % to 8 wt. %, 1 wt. % to 5 wt. %, 1 wt. % to 4 wt. %, 1 wt. % to 3 wt. %, 2 wt. % to 10 wt. %, 2 wt. % to 8 wt. %, 2 wt. % to 5 wt. %, 2 wt. % to 4 wt. %, 2 wt. % to 3 wt. %, 3 wt. % to 10 wt. %, 3 wt. % to 8 wt. %, 3 wt. % to 5 wt. %, 3 wt. % to 4 wt. %, 4 wt. % to 10 wt. %, 4 wt. % to 8 wt. %, or 4 wt. % to 5 wt. %, based on total weight of the article, pellet, or pre-process mixture, as appropriate.

Aspect A19: The article, pellet, or pre-process mixture of any one of aspects A1-A18, wherein the at least one flowing agent comprises calcium stearate, zinc stearate, or a combination thereof.

Aspect A20: The article, pellet, or pre-process mixture of any one of aspects A1-A19 comprising flowing agents in a total amount of 0.5 wt. % to 5 wt. % (e.g., 0.5 wt. % to 5 wt. %, 0.5 wt. % to 4 wt. %, 0.5 wt. % to 3 wt. %, 0.5 wt. % to 2 wt. %, 0.5 wt. % to 1 wt. %, 1 wt. % to 5 wt. %, 1 wt. % to 4 wt. %, 1 wt. % to 3 wt. %, 1 wt. % to 2 wt. %, or 2 wt. % to 5 wt. %), based on total weight of the article, pellet, or pre-process mixture, as appropriate.

Aspect A21: The article, pellet, or pre-process mixture of any one of aspects A1-A20, further comprising a coloring agent.

Aspect A22: The article, pellet, or pre-process mixture of any one of aspects A1-A21, further comprising a preservative.

Aspect A23: The pre-process mixture of any one of aspects A1-A22 comprising a water content of 30 wt. % to 70 wt. % (e.g., 30 wt. % to 70 wt. %, 30 wt. % to 60 wt. %, 30 wt. % to 50 wt. %, 30 wt. % to 40 wt. %, 40 wt. % to 70 wt. %, 40 wt. % to 60 wt. %, 40 wt. % to 50 wt. %, 50 wt. % to 70 wt. %, 50 wt. % to 60 wt. %, or 60 wt. % to 70 wt. %).

Aspect A24: The article, pellet, or pre-process mixture of any one of aspects A1-A23 exhibiting a tensile strength of at least 10 MPa (e.g., at least any of the following: 10 MPa, 12 MPa, 15 MPa, 20 MPa, 25 MPa, or 30 MPa, optionally at least any of the following: 35 MPa, 40 MPa, 45 MPa, 50 MPa, 55 MPa, 60 MPa, 65 MPa, 70 MPa, 75 MPa, 80 MPa, 85 MPa, or 90 MPa, optionally, at least any of the following: 100 MPa, 150 MPa, 200 MPa, 250 MPa, 300 MPa, 350 MPa, 400 MPa, 450 MPa, or 500 MPa, optionally less than any of the following: 1000 MPa, 950 MPa, 900 MPa, 850 MPa, 800 MPa, 750 MPa, 700 MPa, 650 MPa, 600 MPa, or 550 MPa).

Aspect A25: The article, pellet, or pre-process mixture of any one of aspects A1-A24 exhibiting a Young's modulus of at least 2000 MPa. For example, the article, pellet, or pre-process mixture may exhibit a Young's modulus of 2000 MPa to 2200 MPa, 2000 MPa to 2400 MPa, 2000 MPa to 2600 MPa, 2000 MPa to 2800 MPa, 2000 MPa to 3000 MPa, 2000 MPa to 3200 MPa, 2000 MPa to 3400 MPa, 2000 MPa to 3600 MPa, 2000 MPa to 3800 MPa, 2000 MPa to 4000 MPa, 2400 MPa to 2600 MPa, 2400 MPa to 2800 MPa, 2400 MPa to 3000 MPa, 2400 MPa to 3200 MPa, 2400 MPa to 3400 MPa, 2400 MPa to 3600 MPa, 2400 MPa to 3800 MPa, 2400 MPa to 4000 MPa, 2800 MPa to 3000 MPa, 2800 MPa to 3200 MPa, 2800 MPa to 3400 MPa, 2800 MPa to 3600 MPa, 2800 MPa to 3800 MPa, 2800 MPa to 4000 MPa, 3000 MPa to 3200 MPa, 3000 MPa to 3400 MPa, 3000 MPa to 3600 MPa, 3000 MPa to 3800 MPa, or 3000 MPa to 4000 MPa, and optionally less than any of the following: 10000 MPa, 9500 MPa, 9000 MPa, 8500 MPa, or 8000 MPa.

Aspect A26: The article, pellet, or pre-process mixture of any one of aspects A1-A25 comprising carrageenan in an amount of 40 wt. % to 60 wt. % (e.g., 30 wt. % to 60 wt. %, 30 wt. % to 55 wt. %, 30 wt. % to 50 wt. %, 30 wt. % to 40 wt. %, 40 wt. % to 60 wt. %, 40 wt. % to 55 wt. %, 40 wt. % to 50 wt. %, or 50 wt. % to 60 wt. %), chitin or chitosan or a mixture thereof in a total amount of 1 wt. % to 10 wt. % (e.g., 1 wt. % to 10 wt. %, 1 wt. % to 8 wt. %, 1 wt. % to 5 wt. %, 1 wt. % to 4 wt. %, 1 wt. % to 3 wt. %, 2 wt. % to 10 wt. %, 2 wt. % to 8 wt. %, 2 wt. % to 5 wt. %, 2 wt. % to 4 wt. %, 2 wt. % to 3 wt. %, 3 wt. % to 10 wt. %, 3 wt. % to 8 wt. %, 3 wt. % to 5 wt. %, 3 wt. % to 4 wt. %, 4 wt. % to 10 wt. %, 4 wt. % to 8 wt. %, or 4 wt. % to 5 wt. %), at least one plasticizer in an amount of 10 wt. % to 35 wt. % (e.g., 10 wt. % to 35 wt. %, 15 wt. % to 35 wt. %, 20 wt. % to 35 wt. %, 25 wt. % to 35 wt. %, or 30 wt. % to 35 wt. %), at least one filler in an amount of 15 wt. % to 30 wt. % (e.g., 15 wt. % to 30 wt. %, 20 wt. % to 30 wt. %, or 25 wt. % to 30 wt. %), at least one anhydride cross-linker in an amount of 1 wt. % to 5 wt. % (e.g., 1 wt. % to 5 wt. %, 1 wt. % to 4 wt. %, 1 wt. % to 3 wt. %, 1 wt. % to 2 wt. %, 2 wt. % to 5 wt. %, 2 wt. % to 4 wt. %), and at least one flowing agent in an amount of 0.5 wt. % to 5 wt. % (e.g., 0.5 wt. % to 5 wt. %, 0.5 wt. % to 4 wt. %, 0.5 wt. % to 3 wt. %, 0.5 wt. % to 2 wt. %, 0.5 wt. % to 1 wt. %, 1 wt. % to 5 wt. %, 1 wt. % to 4 wt. %, 1 wt. % to 3 wt. %, 1 wt. % to 2 wt. %, or 2 wt. % to 5 wt. %), based on total weight of the article, pellet, or pre-process mixture, as appropriate.

Aspect A26a: The article, pellet, or pre-process mixture of aspect A26, or any one of the preceding aspects, wherein the carrageenan comprises kappa-carrageenan.

Aspect A26b: The article, pellet, or pre-process mixture of aspect A26 or aspect A26a, or any one of the preceding aspects, wherein the chitin and/or chitosan are low molecular weight crustacean chitosan and/or chitin.

Aspect A27: The article, pellet, or pre-process mixture of any one of aspects A1-A26b, wherein the at least one plasticizer comprises glycerol.

Aspect A28: The article, pellet, or pre-process mixture of any one of aspects A1-A27, wherein the at least one plasticizer comprises a mixture of glycerol and esterified or alkylated glycerol, wherein the esterified or alkylated glycerol has 4 to 15 carbon atoms in the ester or alkyl group (e.g., 4, 5, 6, 7, 8, 9, 10, 11, 12, 13, 14, or 15 carbon atoms in the ester or alkyl group).

Aspect A29: The article, pellet, or pre-process mixture of any one of aspects A1-A28, wherein the at least one filler comprises calcium carbonate or a hydrate thereof, or sodium sulfate or a hydrate thereof.

Aspect A30: The article, pellet, or pre-process mixture of any one of aspects A1-A29, wherein the at least one anhydride cross-linker comprises succinic anhydride.

Aspect A31: The article, pellet, or pre-process mixture of any one of aspects A1-A30, wherein the at least one flowing agent comprises calcium stearate.

Aspect A32: The pre-process mixture of any one of aspects A1-A31, comprising a water content of 40 wt. % to 60 wt. % (e.g., a water content of 40 wt. % to 60 wt. %, 45 wt. % to 60 wt. %, 50 wt. % to 60 wt. %, 55 wt. % to 60 wt. %, 40 wt. % to 50 wt. %, or 40 wt. % to 55 wt. %).

Aspect B1: A process to make a biodegradable article, the process comprising:
combining (i) at least one hydrocolloid, (ii) at least one plasticizer, (iii) at least one filler, (iv) at least one anhydride cross-linker, and (v) at least one flowing agent, so as to make a pre-process mixture; and
optionally, blending the pre-process mixture;
optionally, compounding the pre-process mixture into a pellet;
forming the pre-process mixture or pellet into a shape; and
drying the shape to form the article,
wherein the at least one hydrocolloid, the at least one plasticizer, the at least one filler, the at least one anhydride cross-linker, and the at least one flowing agent are as defined in any one of the preceding claims.

Aspect B2: The process of aspect B1, or any one of the preceding aspects, wherein the compounding is performed and said compounding comprises extrusion.

Aspect B3: The process of aspect B2, or any one of the preceding aspects, wherein the extrusion comprises a twin screw extruder with co-rotating screws.

Aspect B4: The process of aspect B2 or B3, or any one of the preceding aspects, wherein the extrusion is a continuous hot-melt extrusion process.

Aspect B5: The process of any one of aspects B1-B4, or any one of the preceding aspects, wherein the pre-process mixture is compounded into a pellet and the pellet is formed into the shape.

Aspect B6: The process of aspect B5, or any one of the preceding aspects, wherein the pellet is characterized by a diameter between the range of 2 to 10 mm.

Aspect B7: The process of aspect B5 or B6, or any one of the preceding aspects, wherein the pellet is characterized by a thickness between the range of 2 to 10 mm.

Aspect B8: The process of any one of aspects B1-B7, or any one of the preceding aspects, wherein the forming comprises injection molding.

Aspect B9: The process of any one of aspects B1-B8, or any one of the preceding aspects, wherein the forming comprises thermoplastic injection molding.

Aspect B10: The process of aspect B8 or B9, or any one of the preceding aspects, wherein the injection molding comprises a 50-150 ton injection molding machine.

Aspect B11: The process of any one of aspects B1-B10, or any one of the preceding aspects, further comprising a post-processing step after the forming the pre-process mixture or pellet into a shape.

Aspect B12: The process of aspect B11, or any one of the preceding aspects, wherein the post-processing step comprises annealing the shape for a time period between 1 to 12 hours (e.g., 1, 2, 3, 4, 5, 6, 7, 8, 9, 10, 11, or 12 hours) with a temperature between the range of 50 to 150° C.

Aspect B13: The process of any one of aspects B1-B12, or any one of the preceding aspects, wherein the drying the shape to form the article comprises exposing the shape to environmental conditions for a time period between 24 to 48 hours (e.g., 24, 25, 26, 27, 28, 29, 30, 31, 32, 33, 34, 35, 36, 37, 38, 39, 40, 41, 42, 43, 44, 45, 46, 47, or 48 hours).

Aspect B14: The process of aspect B13, or any one of the preceding aspects, wherein the environmental conditions comprise an ambient temperature between the range of 15 to 25° C. (e.g., 15, 16, 17, 18, 19, 20, 21, 22, 23, 24, or 25° C.) and an ambient relative humidity between the range of 30 to 50% (e.g., 30 to 50%, 35 to 50%, 40 to 50%, or 45 to 50%).

Aspect B15: The process of any one of aspects B1-B14, or any one of the preceding aspects, wherein the blending is performed and said blending comprises the use of a ribbon blender.

Aspect B16: The process of any one of aspects B1-B15, or any one of the preceding aspects, wherein the combining step further comprises a coloring agent.

Aspect B17: The process of any one of aspects B1-B16, or any one of the preceding aspects, wherein the combining step further comprises a preservative.

FIG. 1 depicts a flow chart illustrating exemplary methods of the present disclosure for forming exemplary compositions for injection molding. The exemplary flow chart provides a process for generating articles with desirable mechanical and thermal properties through injection molding. In some embodiments, all ingredients (components), including at least one hydrocolloid, at least one filler, at least one plasticizer, at least one anhydride, at least one flowing agent, and optionally any coloring agents or preservatives or other additives are combined to form a pre-process mixture. In embodiments, all components are in a non-liquid state (i.e., dry ingredients), such as a powder form or a crystalline form. In other embodiments, one or more of the components of the composition are in a liquid form. In some embodiments, the components of the composition are combined using a ribbon blender or similar mixing device to form the pre-process mixture.

As shown in FIG. 1, in some embodiments, the pre-process mixture is compounded. In some aspects, the pre-process mixture comprises both liquid components and solid components. In aspects where the pre-process mixture consists of only dry ingredients, water is introduced to facilitate compounding the pre-process mixture into a pellet. In some aspects, the dry pre-process mixture is compounded with various amounts of water, such as 30, 40, 50, 60, or 70 wt. %. As shown in the flow chart, in some aspects, the compounding is performed by a twin screw extruder. In other aspects, the compounding is performed by a single screw extruder. In aspects, the extruder may be a continuous, hot-melt extrusion machine. After compounding, in some aspects, the pre-process mixture is compounded into a filament. In aspects, the filament is cut into pellets. In aspects, the pellet is characterized by a diameter within the range of 2 mm and 10 mm. In some aspects, the pellet is characterized by a thickness within the range of 2 mm and 10 mm.

Further in FIG. 1, the pellets are shown being introduced into an injection molding machine. In aspects of the invention, said injection molding machine is a 50 to 150 ton injection molding machine. In some aspects, the injection molding machine is a thermoplastic injection molding machine. In some aspects, the injection molding results in the formation of an article. In aspects of the invention, the shape of the article is determined by a custom mold. In embodiments, the custom mold comprises pre-hardened steel, aluminum, beryllium copper alloy, or any combination thereof. In embodiments, the custom mold comprises a mold for single-use food service industry products, such as utensils and take-out containers.

The flow chart of FIG. 1 exemplifies an aspect where the resulting article is subject to testing for mechanical and thermal properties. In some aspects, the mechanical and thermal properties include biodegradability, flexibility, tensile strength, and water resistance.

FIG. 2 provides components of pre-process mixtures/pellets evaluated in Examples 1-4 below. Exemplary parameters and equipment for the optional compounding step in the processes of the present disclosure are also shown. FIG. 2 also portrays exemplary pellets of the compositions and processes of the present disclosure.

The invention can be further understood by the following non-limiting examples.

EXAMPLES

The following examples are provided to illustrate some of the concepts described within this disclosure. While each example is considered to provide specific individual embodiments of composition, methods of preparation and use, none of the examples should be considered to limit the more general embodiments described herein.

In the following examples, efforts have been made to ensure accuracy with respect to numbers used (e.g. amounts, temperature, etc.) but some experimental error and deviation should be accounted for.

Instrumentation/Methods:

Experimental Process Overview: The following experiments were performed using the exemplary process flowchart illustrated in FIG. 1. All pre-measured dry ingredients of the compositions, including K-carrageenan, chitosan, calcium carbonate, glycerin, glycerin trioctanoate, anhydride crosslinker, and optional additive(s), were combined and subsequently blended with a Ross Ribbon Blender to form a pre-process mixture. As described in further detail below, the pre-process mixture was introduced to a twin screw extruder where the pre-process mixtures were compounded into filaments. The filaments produced by the twin screw extruder were cut into pellets. The obtained pellets were then processed by a 50-150 ton thermoplastic injection molding machine in order to form articles. Said articles were then subject to various mechanical tests wherein the results were analyzed using a Universal Tester.

Twin Screw Extruder: Pre-process mixtures were compounded using a Theysohn 21 mm co-rotating twin screw extruder. In said examples, the pre-process compositions were processed to form pellets at a temperature of 130-250°

F., a screw speed of 150-350 rpm, and a melt pressure of 20-80 psi, with a feed ratio of liquid to solid as indicated in the examples below. In these examples, DI (deionized) $H_2O$ is the referenced liquid in said feed ratio of liquid to solid. In the following examples, 1:1 ratio indicates that 50 wt. % of DI $H_2O$ based on the total wt, % of the DI $H_2O$ and the solid components of the pre-process mixture was added during the compounding and extrusion process. Furthermore, 2:3 ratio indicates that 40 wt. % of DI $H_2O$ based on the total wt, % of the DI $H_2O$ and the solid components of the pre-process mixture was added during the compounding and extrusion process. Similarly, in the following examples, 3:2 ratio indicates that 60 wt. % of DI $H_2O$ based on the total wt, % of the DI $H_2O$ and the solid components of the pre-process mixture was added during the compounding and extrusion process.

Injection Molding Machine: The pre-process mixtures and/or pellets were processed using a 50-150 ton thermoplastic injection molding machine to form articles. The examples provided herein describe the following exemplary parameters for processing of the pre-process mixtures and/or pellets via injection molding: zone temperature: 150 to 350° F.; set maximum pressure: 5000 to 50000 psi; peak pressure: 2000 to 20000 psi; hold pressure: 2000 to 10000 psi; hold time: 1 to 60 seconds; and clamping tonnage: 20 to 100 t.

Young's Modulus Measurements: Young's Modulus values were determined using a Universal Tester (34SC-1, Instron, Norwood, MA, USA) with a load cell rated for 1 kN. In order to meet the structural integrity requirements for single-use food service industry products, such as utensils, take-out containers, trays, caps, etc., acceptable formulations were expected to have a tensile strength of at least 10 MPa, a moduli of at least 2000 MPa, and a strain at maximum force percentage of at least 2%, optionally selected from the range of 2-15%.

Tensile Strength Measurement: Tensile Strength values were determined using a a Universal Testing System Instron 68 SC-1 with 1000 N load cell following ASTM D882-12 guidelines.

Room Temperature Swell Measurements: RT Swell values were determined gravimetrically, by recording the weight of the test article before and after exposure to room temperature water for 1 hour.

Elevated Temperature Stability Measurements: ET Swell values were determined gravimetrically, by recording the weight of the test article before and after exposure to 70 C temperature water for 1 hour.

Materials/Components:

Table 1 demonstrates the components of the pre-process mixtures tested in the below-described Experiments. The crosslinker used in each Example is also set-out below.

TABLE 1

Components of the pre-process mixtures.

| Formulation | Components | Amount wt. % |
|---|---|---|
| SA | κ-Carrageenan | 15.5-17.5 |
| | Chitosan | 15.5-17.5 |
| | Calcium Carbonate | 12.0-13.7 |
| | Glycerol | 4.5-8.1 |
| | Glycerol Trioctanoate | 0.6-1.1 |
| | Succinic Anhydride | 0.8-3.4 |

TABLE 1-continued

Components of the pre-process mixtures.

| Formulation | Components | Amount wt. % |
|---|---|---|
| IA | κ-Carrageenan | 16.0-17.5 |
| | Chitosan | 16.0-17.5 |
| | Calcium Carbonate | 12.4-13.7 |
| | Glycerol | 4.7-8.1 |
| | Glycerol Trioctanoate | 0.7-1.1 |
| | Itaconic anhydride | 0.8-1.7 |
| MA | κ-Carrageenan | 15.5-17.3 |
| | Chitosan | 15.5-17.3 |
| | Calcium Carbonate | 12.0-13.4 |
| | Glycerol | 4.5-8.0 |
| | Glycerol Trioctanoate | 0.6-1.1 |
| | Maleic Anhydride | 1.6-3.5 |
| OSA | κ-Carrageenan | 15.5-17.5 |
| | Chitosan | 15.5-17.5 |
| | Calcium Carbonate | 12.0-13.7 |
| | Glycerol | 4.5-8.1 |
| | Glycerol Trioctanoate | 0.6-1.1 |
| | Octenyl Succinic Anhydride | 0.8-3.4 |
| Sodium trimetaphosphate (STMP) | κ-Carrageenan | 14.7-17.7 |
| | Chitosan | 14.7-17.7 |
| | Calcium Carbonate | 11.4-13.8 |
| | Glycerol | 4.3-8.1 |
| | Glycerol Trioctanoate | 0.6-1.2 |
| | STMP | 0.4-6.3 |
| Alkoxy silane | κ-Carrageenan | 15.7-17.7 |
| | Chitosan | 15.7-17.7 |
| | Calcium Carbonate | 12.2-13.8 |
| | Glycerol | 4.6-8.1 |
| | Glycerol Trioctanoate | 0.7-1.2 |
| | Alkoxy silane | 0.4-2.6 |
| Dialdehyde Starch (DAS) | κ-Carrageenan | 16.0-17.3 |
| | Chitosan | 16.0-17.3 |
| | Calcium Carbonate | 12.4-13.4 |
| | Glycerol | 4.7-8.0 |
| | Glycerol Trioctanoate | 0.7-1.1 |
| | DAS | 1.6-1.7 |
| tBu-3-oxobutanoate (t-BAA) | κ-Carrageenan | 15.5-17.3 |
| | Chitosan | 15.5-17.3 |
| | Calcium Carbonate | 12.0-13.4 |
| | Glycerol | 4.6-8.0 |
| | Glycerol Trioctanoate | 0.6-1.1 |
| | t-BAA | 1.2-3.4 |
| Diketene acetone adduct (TMDO) | κ-Carrageenan | 16.0-17.5 |
| | Chitosan | 16.0-17.5 |
| | Calcium Carbonate | 12.4-13.7 |
| | Glycerol | 4.7-8.1 |
| | Glycerol Trioctanoate | 0.7-1.1 |
| | TMDO | 0.8-1.7 |
| Polyethylenimine (PEI) | κ-Carrageenan | 16.0-17.3 |
| | Chitosan | 16.0-17.3 |
| | Calcium Carbonate | 12.4-13.4 |
| | Glycerol | 4.7-8.0 |
| | Glycerol Trioctanoate | 0.7-1.1 |
| | PEI | 1.6-1.7 |
| Priamine | κ-Carrageenan | 15.5-17.3 |
| | Chitosan | 15.5-17.3 |
| | Calcium Carbonate | 12.0-13.4 |
| | Glycerol | 4.5-8.0 |
| | Glycerol Trioctanoate | 0.6-1.1 |
| | Priamine | 1.6-3.4 |

Example 1: Testing of Flexible Formulations

The formulations of Table 1 were tested for RT Swell, ET Swell, Young's Modulus and Tensile Strength. The results are shown in Table 2 below.

TABLE 2

Test Results for Flexible Formulations

| Additive | RT Swell | ET Swell | Young's Modulus (MPa) | Tensile Strength (MPa) |
|---|---|---|---|---|
| None | 49.1% | Severe degradation | 924.8 ± 19.10 | 9.94 ± 0.58 |
| STMP (0.4%) | 76.4% | n/a | 22031.33 ± 4748.94 | 17.87 ± 2.22 |
| STMP (0.8-0.9%) | 31.4% | n/a | 21808.60 ± 1859.31 | 17.04 ± 6.11 |
| STMP (1.2-1.3%) | 67.2% | n/a | 20659.51 ± 3173.68 | 17.06 ± 3.23 |
| STMP (1.6-1.7%) | 14.5% | severe desintegration | 16007.60 ± 474.02 | 12.13 ± 0.60 |
| STMP (3.1-3.4%) | 21.0% | n/a | 16549.77 ± 1415.60 | 12.79 ± 0.70 |
| STMP (5.9-6.3%) | Significant desintegration | n/a | 17181.43 ± 991.57 | 11.04 ± 0.56 |
| Alkoxy silane (0.4%) | 35.3% | n/a | 15027.55 ± 487.32 | 10.00 ± 0.90 |
| Alkoxy silane (0.8-0.9%) | 16.3% | severe desintegration | 15375.35 ± 107.65 | 11.14 ± 0.44 |
| Alkoxy silane (1.6-1.7%) | 29.5% | n/a | 13603.57 ± 405.15 | 7.88 ± 0.65 |
| Alkoxy silane (2.4-2.6%) | 52.3% | n/a | 14760.55 ± 1614.64 | 10.20 ± 1.84 |
| Succinic anhydride (0.8-0.9%) | 17.3% | minor desintegration 63.3% | 12066.65 ± 1043.25 | 9.92 ± 1.73 |
| Succinic anhydride (1.2-1.3%) | 19.0% | severe desintegration | 21566.95 ± 1218.42 | 13.69 ± 3.18 |
| Succinic anhydride (1.6-1.7%) | 12.9% | no desintegration 45.7% | 14457.88 ± 2471.44 | 15.90 ± 1.42 |
| Succinic anhydride (3.1-3.3%) | 14.0% | no desintegration 20.6% | 8059.76 ± 1144.14 | 10.24 ± 0.39 |
| Itaconic anhydride (0.8-0.9%) | 19.3% | minor desintegration 79.7% | 16859.05 ± 1134.46 | 10.19 ± 1.46 |
| Itaconic anhydride (1.2-1.3%) | 20% | n/a | 13491.85 ± 1605.29 | 13.09 ± 3.93 |
| Itaconic anhydride (1.6-1.7%) | 18.2% | n/a | 12319.41 ± 566.21 | 7.35 ± 0.13 |
| Maleic anhydride (1.6-1.7%) | 17.1% | minor desintegration 61.1% | 13446.28 ± 2428.16 | 15.11 ± 0.88 |
| Maleic anhydride (3.3-3.5%) | n/a | n/a | 876.96 ± 37.20 | 13.38 ± 0.35 |
| Octenyl succinic anhydride (0.81-0.88%) | 22.2% | desintegration 25% | 20917.61 ± 2301.90 | 15.83 ± 2.22 |
| Octenyl succinic anhydride (1.60-1.73%) | 21.2% | desintegration | 16961.82 ± 3738.38 | 12.81 ± 0.76 |
| Octenyl succinic anhydride (1.6-1.7%) | 18.8% | desintegration 35.4% | 17897.17 ± 2613.71 | 11.95 ± 0.72 |
| Dialdehyde starch (3.10-3.35%) | 25.7% | n/a | 17257.60 ± 352.39 | 15.80 ± 0.33 |
| tBu-3-oxobutanoate (0.8-0.9%) | 23.1% | severe desintegration | 18447.21 ± 1457.80 | 13.69 ± 1.95 |
| tBu-3-oxobutanoate (1.6-1.7%) | 23.4% | severe desintegration | 16823.32 ± 1537.49 | 15.27 ± 0.84 |
| Polyethylenimine (0.8-0.9%) | 23.4% | severe desintegration | 16823.32 ± 1537.49 | 15.27 ± 0.84 |
| Priamine (0.8-0.9%) | 17.5% | severe desintegration | 20008.12 ± 1613.78 | 14.14 ± 1.17 |
| Priamine (1.6-1.7%) | 19.3% | severe desintegration | 21778.25 ± 764.45 | 14.50 ± 0.84 |
| Diketene acetone adduct (0.8%-0.9%) | 20.5% | severe desintegration | 19970.80 ± 3611.22 | 13.09 ± 2.21 | n/a = not measured usually because of too much disintegration

Table 2 shows that the formulation producing the best results for RT Swell and ET swell were made with the anhydride crosslinkers (e.g., succinic anhydride, octenyl succinic anhydride, maleic anhydride, and itaconic anhydride). The flexible formulations of 16.0-17.3 wt % carrageenan, 16.0-17.3 wt % chitosan, 12.7-13.8 wt % calcium carbonate, 4.8-8.1 wt % glycerol, 0.7-1.2 wt % glycerol trioctanoate, and 1.6-1.7 wt % succinic anhydride, and/or 15.5-16.7 wt % carrageenan, 15.5-16.7 wt % chitosan, 12.0-13.0 wt % calcium carbonate, 4.5-7.7 wt % glycerol, 0.6-1.1 wt % glycerol trioctanoate, and 3.1-3.4 wt % succinic anhydride. The 1.6-1.7 wt % succinic anhydride formulations had higher Young's modulus (14,500 MPa) and Tensile Strength (15.9 MPa) compared to the 3.1-3.4 wt % succinic anhydride (Young's modulus 8,060 MPa, Tensile Strength 10.2 MPa). The 1.6-1.7 wt % formulations can be used for disposable articles in which rigidity and composition strength are important such as, for example, containers (e.g., Tupperware type containers), certain types of packaging, candy sticks, other sticks, etc. The 3.1-3.4 wt % formulations can be used for more flexible end products such as, for example, container lids, food packaging lids, flexible containers for food products (or other products), etc.

In aqueous environments at 70° C. (ET Swell), seaweed resins without dynamic covalent linkages swell significantly and eventually disintegrate. Under the same elevated temperature conditions, seaweed-based covalent CANs (e.g., anhydride crosslinker) retain their shape with swelling under 50%. Mechanical properties are also improved by including dynamic covalent linkages in seaweed-based resins.

Also as shown in Table 2, all the samples using the different crosslinkers demonstrated acceptable tensile strength and moduli for single-use food service industry products (i.e., tensile strength of at least 10 MPa and a moduli of at least 2000 MPa).

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and sub-combinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A process to make a biodegradable article that is water stable, the process comprising:
   a. combining (i) a carrageenan and a chitosan or a chitin, (ii) at least one plasticizer, (iii) at least one filler, and (iv) at least one anhydride crosslinker, so as to make a pre-process mixture; and
   b. optionally, blending the pre-process mixture;
   c. optionally, compounding the pre-process mixture into a pellet;
   d. forming the pre-process mixture or pellet into a shape; and
   e. drying the shape to form the water stable article having a covalent adaptable network,
   wherein the carrageenan and the chitosan or the chitin form an electrostatic network, and the anhydride crosslinker reacts with the carrageenan and the chitosan or the chitin to form a network of covalent bonds,
   wherein the carrageenan is present in an amount of 10 wt. % to 20 wt. % of the pre-process mixture, the chitosan or the chitin is present in an amount of 10 wt. % to 20 wt. % of the pre-process mixture, the at least one plasticizer is a glycerol and the glycerol is present in an amount of 5 wt. % to 20 wt. % of the pre-process mixture, the at least one filler is a calcium carbonate and the calcium carbonate is present in an amount of 5 wt. % to 20 wt. % of the pre-process mixture, and the at least one anhydride crosslinker is a succinic anhydride present in an amount of 1.5 wt. % to 3.5 wt % of the pre-process mixture.

2. The process of claim 1, wherein the forming comprises injection molding.

3. The process of claim 1, further comprising, annealing the shape for a time period between 1 to 12 hours with a temperature between the range of 50 to 150° C.

4. The process of claim 1, wherein the drying the shape to form the article comprises exposing the shape to environmental conditions for a time period between 24 to 48 hours.

5. The process of claim 4, wherein the environmental conditions comprise an ambient temperature between the range of 15 to 25° C. and an ambient relative humidity between the range of 30 to 50%.

6. The process of claim 1, wherein the blending is performed and said blending comprises the use of a ribbon blender.

7. The process of claim 1, wherein the combining step further comprises a coloring agent.

8. The process of claim 1, wherein the combining step further comprises a preservative.

* * * * *